(12) United States Patent
Limberg

(10) Patent No.: US 8,179,980 B2
(45) Date of Patent: May 15, 2012

(54) ROBUST DTV SIGNALS THAT CAN OVERCOME BURST ERRORS UP TO 1040 BYTES OR MORE IN LENGTH

(75) Inventor: Allen LeRoy Limberg, Port Charlotte, FL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1430 days.

(21) Appl. No.: 11/724,364

(22) Filed: Mar. 15, 2007

(65) Prior Publication Data

US 2007/0217499 A1    Sep. 20, 2007

Related U.S. Application Data

(60) Provisional application No. 60/782,481, filed on Mar. 15, 2006, provisional application No. 60/861,507, filed on Nov. 28, 2007.

(51) Int. Cl.
*H04N 7/12* (2006.01)

(52) U.S. Cl. .................................. 375/240.27

(58) Field of Classification Search .................. 375/240, 375/240.27, 240.01, 509, 536, 341, 265; 348/726; 370/509, 536
See application file for complete search history.

(56) References Cited

U.S. PATENT DOCUMENTS

| | | | |
|---|---|---|---|
| 7,215,714 B2 * | 5/2007 | Bretl et al. | 375/262 |
| 7,447,984 B2 * | 11/2008 | Cameron et al. | 714/800 |
| 7,945,844 B2 * | 5/2011 | Limberg | 714/784 |

* cited by examiner

*Primary Examiner* — Nirav B. Patel
(74) *Attorney, Agent, or Firm* — Sughrue Mion, PLLC

(57) ABSTRACT

Electromagnetic signals for transmitting television and other information more robustly have amplitudes modulated in accordance with a digital signal generated by convolutional interleaving and trellis coding of segments of successive data fields, each of which segments contains a prescribed number of bytes. In improvements of these signals, respective fractional portions of a Reed-Solomon forward-error-correction codeword are transmitted in respective ones of a plurality of the segments of the successive data fields. The respective ones of the plurality of segments are separated from each other within the successive data fields, such that their individual bytes do not interleave with each other after the convolutional interleaving and trellis coding are completed.

18 Claims, 24 Drawing Sheets

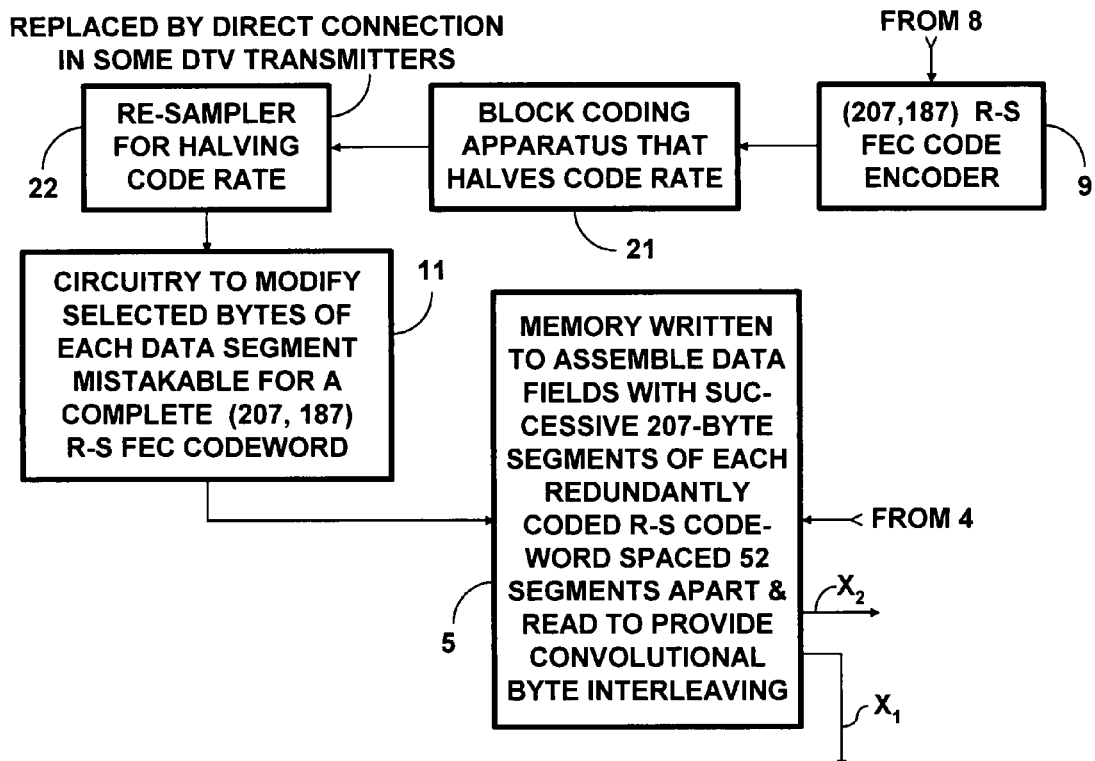

Fig. 5

| 1ST 1/4 OF DATA SEGMENT | 46.75 DATA BYTES FROM 1ST QUARTER OF MPEG-2-COMPLIANT DATA PACKET | 5 R-S PARITY BYTES |
|---|---|---|
| 2ND 1/4 OF DATA SEGMENT | 46.75 DATA BYTES FROM 2ND QUARTER OF MPEG-2-COMPLIANT DATA PACKET | 5 R-S PARITY BYTES |
| 3RD 1/4 OF DATA SEGMENT | 46.75 DATA BYTES FROM 3RD QUARTER OF MPEG-2-COMPLIANT DATA PACKET | 5 R-S PARITY BYTES |
| 4TH 1/4 OF DATA SEGMENT | 46.75 DATA BYTES FROM 4TH QUARTER OF MPEG-2-COMPLIANT DATA PACKET | 5 R-S PARITY BYTES |

TIME ADVANCES TO THE RIGHT WITHIN EACH SUCCESSIVE QUARTER SEGMENT OF DATA

Fig. 6

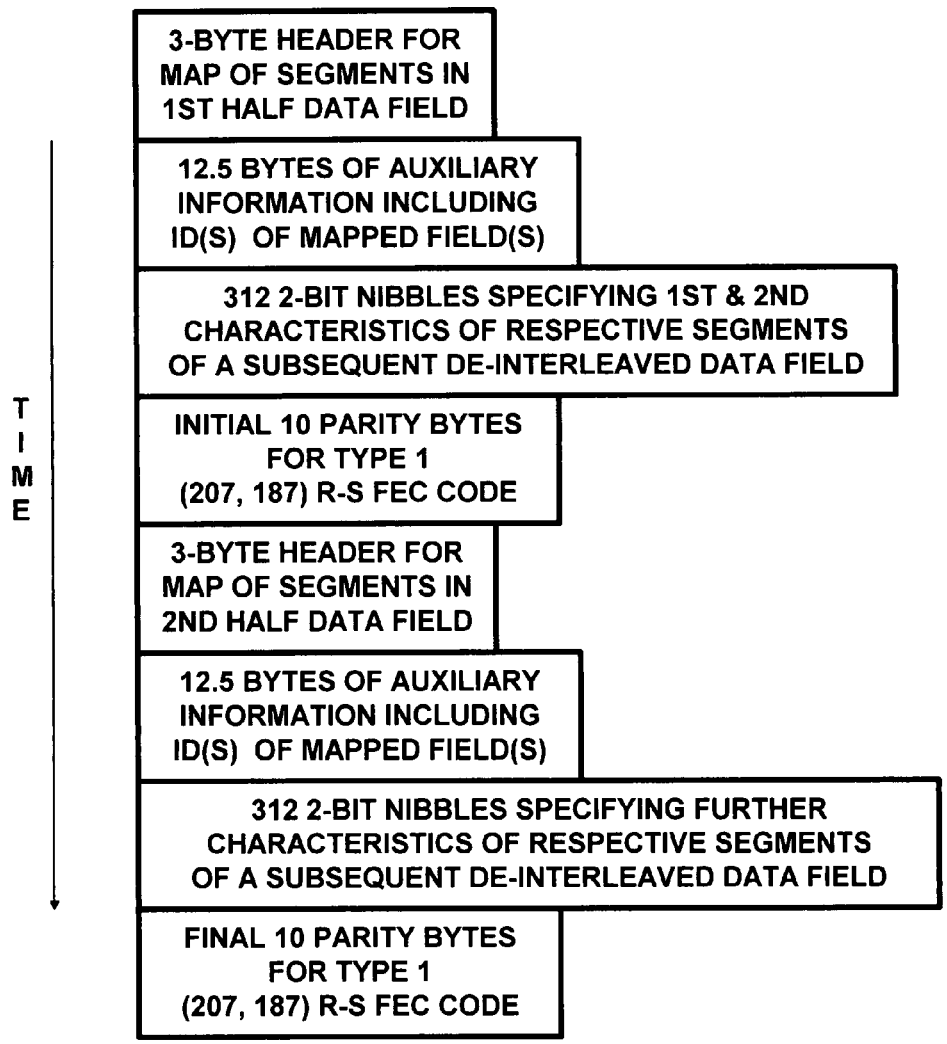
Fig. 10
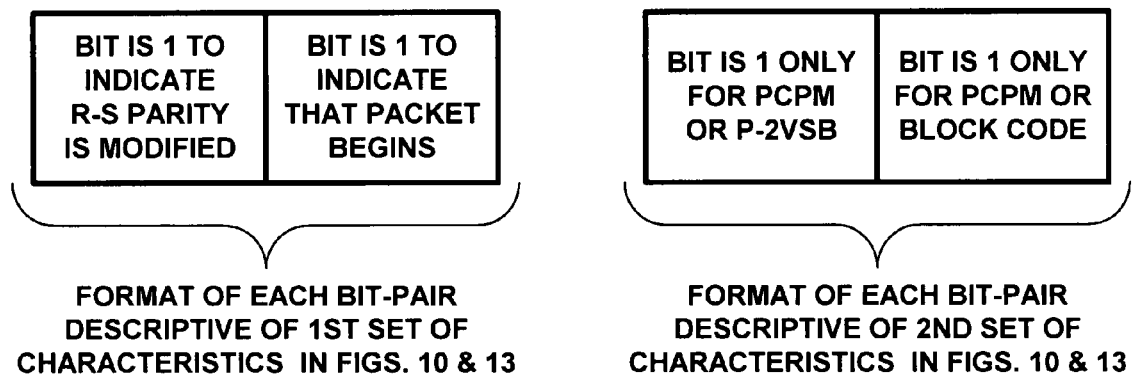
Fig. 11
Fig. 12

FORMAT OF EACH of 312 HALF BYTES SHOWN IN FIG. 14

92 "RESERVED" SYMBOLS

ROBUST DTV SIGNALS THAT CAN OVERCOME BURST ERRORS UP TO 1040 BYTES OR MORE IN LENGTH

This application filed under 35 U.S.C. 111(a) claims pursuant to 35 U.S.C. 119(e)(1) the benefit of the filing dates of U.S. Pat. App. Ser. No. 60/782,481 filed 15 Mar. 2006 and of U.S. Pat. App. Ser. No. 60/861,507 filed 28 Nov. 2007, each of which provisional patent applications was filed pursuant to 35 U.S.C. 111(b).

This invention relates to the coding of digital signals, such as those used for broadcasting digital television.

BACKGROUND OF THE INVENTION

Annex D of the "ATSC Digital Television Standard" was published by the Advanced Television Systems Committee (ATSC) in September 1995 as its document A/53. This standard defined the broadcasting of digital television (DTV) signals within the United States of America and is referred to in this specification simply as "A/53". A/53 specifies the transmission of DTV signals in MPEG-2-compliant data packets the bits of which are randomized by being exclusive-ORed with bits of a prescribed pseudo-random binary sequence before being subjected to (207, 187) Reed-Solomon forward error correction coding. A/53 specifies that the resulting (207, 187) R-S FEC codewords are then subjected to convolutional byte interleaving that spreads their bytes to occur at 52 byte intervals. A/53 specifies that the resulting byte-interleaved codestream is then subjected to 12-phase ⅔ trellis coding. A/53 specifies that the resulting symbols are mapped to a vestigial-sideband amplitude-modulation signal in which the digital symbols are transmitted by 8-level modulation. This 8-level modulation, known as 8VSB, has +7, +5, +3, +1, −1, −3, −5 and −7 normalized modulation signal values.

The transmission of more robust DTV signals became a subject of interest at the beginning of the twenty-first century. Any robust DTV signal transmission had to be of such nature as to permit time-division interleaving with ordinary 8VSB signal transmissions, so as not completely to obsolete legacy DTV receivers. Accordingly, any robust DTV signal transmission had to be susceptible to convolutional byte interleaving and subsequent 12-phase ⅔ trellis coding together with any accompanying ordinary 8VSB signal transmission.

One approach to improving the robustness of DTV transmissions by reducing code rate is to increase the amount of forward-error-correction coding of the digital data. An approach which introduces further Reed-Solomon coding and further trellis coding of the less significant bits of each symbol is described in a "ATSC Digital Television Standard, Revision C" published by the Advanced Television Systems Committee (ATSC) in July 2004. This revised standard is referred to as ATSC document A/53C with Amendment No. 1. This revised standard describes code rate being further reduced by applying trellis coding to the most significant bit of each symbol. An alternative approach to improving the robustness of DTV transmissions is to restrict the symbol alphabet to increase the distance between the levels of amplitude modulation used to form the symbols. Still another approach is to provide further inner coding following the outer (207, 187) Reed-Solomon forward-error-correction coding prescribed by A/53.

U.S. patent application Ser. No. 10/955,212 filed 30 Sep. 2004 by A. L. R. Limberg and titled "TIME-DEPENDENT TRELLIS CODING FOR MORE ROBUST DIGITAL TELEVISION SIGNALS" was published Apr. 7, 2005 with publication No. 2005-0074074. That application describes a previously known first type of robust modulation called "pseudo-2VSB", or "P2VSB" and a previously known second type of robust modulation called "enhanced 4VSB", or "E4VSB". In P2VSB the digital symbols are restricted to +7, +5, −5 and −7 normalized modulation signal values, but sustain trellis coding. In E4VSB the digital symbols are restricted to +7, +1, −3 and −5 normalized modulation signal values, but sustain trellis coding. U.S. patent application Ser. No. 10/955,212 discloses a third type of modulation in which the symbol alphabet of a digital television signal is restricted in either of two alternative ways. In accordance with a prescribed pattern, a ZERO or a ONE is inserted after each bit in a data segment to be incorporated into a data field for randomization, R-S FEC coding, convolutional interleaving, and trellis coding. Inserting a ONE after each bit in a stream of randomized data causes the trellis coding procedure to generate a restricted-alphabet signal which excludes the −7, −5, +1 and +3 symbol values of the full 8VSB alphabet. Inserting a ZERO after each bit in a stream of randomized data causes the trellis coding procedure to generate a restricted-alphabet signal which excludes the −3, −1, +5 and +7 symbol values of the full 8VSB alphabet. This third type of modulation has been called "prescribed-coset-pattern modulation", or "PCPM". Each of these three types of robust modulation that restrict the symbol alphabet halves the code rate of ordinary 8VSB.

U.S. patent application Ser. No. 11/119,662 filed 2 May 2005 by A. L. R. Limberg and titled "DIGITAL TELEVISION SIGNALS USING LINEAR BLOCK CODING" teaches that halving the code rate again to achieve still more robust "super-robust" signal transmission by further restricting the symbol alphabet is infeasible. This is because the pattern of trellis coding A/53 prescribed for the less significant bits of 8VSB symbols has to be preserved within the data segments of each field of convolutionally interleaved data. Otherwise, legacy DTV receivers designed to receive 8VSB transmitted as prescribed by A/53 will not be able to receive 8VSB data segments successfully if those segments have been convolutionally interleaved with segments of robust data. So, further reduction of the code rate has to be done by additional coding that extends over a plurality of 8VSB symbol epochs.

U.S. patent application Ser. No. 10/955,212 further teaches that this additional coding should be such that it does not involve data transmitted at normal 8VSB code rate, nor robust data transmitted at one-half 8VSB code rate, which data are apt to be convolutionally interleaved with super-robust data transmitted at one-quarter 8VSB code rate or so. A binary linear block code can provide for such additional coding. To facilitate time-division multiplexing with data segments of ordinary 8VSB and data segments of restricted-alphabet symbols, it would be preferable that an integral number of blocks of the additional coding fall within an interval equal to a multiple of 828 symbol epochs of 8VSB. A (23, 12) binary Golay code and a (24, 12) extended binary Golay code are specifically considered in application Ser. No. 10/955,212. Shorter-length linear block codes of (16, 8), (15, 8), and (8, 4) types are also specifically considered. The (16, 8) and (8, 4) linear block codes are well-suited to providing an inner code for locating errors for an outer (207, 187) Reed-Solomon forward-error-correction code.

Early proposals for more robust DTV signals retained a three-byte header and twenty parity-check bytes of (207, 187) Reed-Solomon forward-error-correction coding in data segments containing reduced-code-rate information. The halving or quartering of code rate was confined just to the 184- byte portions of the 207-byte data segments in those early proposals. Accordingly, the robust transmission of an MPEG-2 data packet could not be completed within just two data segments, but required somewhat more than two data segments, complicating time-division multiplexing of the robust transmissions with transmissions of other code rate(s). Also, an even more robust "super-robust" transmission of an MPEG-2 data packet could not be completed within just four data segments, but required somewhat more than four data segments, complicating the time-division multiplexing of these more robust transmissions with transmissions of other code rate(s).

In 2006 engineers of Samsung Electronics Company, Ltd. proposed that robust DTV signals use turbo coding. More particularly, Samsung engineers proposed turbo coding that subsumed ⅔ trellis coding, to achieve a code rate nominally one-half that of ordinary 8VSB as prescribed by A/53. The Samsung engineers also proposed other turbo coding that further reduced code rate to nominally one-quarter that of ordinary 8VSB. These two types of turbo coding used by the Samsung engineers are referred to as "halved-code-rate A-VSB turbo coding" and "quartered-code-rate A-VSB turbo coding", respectively. The Samsung engineers designed their turbo coding to be disposed within adaptation fields of the MPEG-2-compliant data packets subsequently transmitted according to the methods used for transmitting ordinary 8VSB. I.e., the turbo coding took the form of a so-called "private" data transmission.

Turbo coding appears to be gaining favor over other forms of redundant coding for use in robust DTV transmissions. In part this is because turbo coding can achieve performance under reception conditions for all-white Gaussian noise (AWGN) that approaches the Shannon limit more closely than many other forms of redundant coding. Another factor in its favor is that receiver complexity, while appreciable, is less than for competing types of coding that achieve similar or only slightly better performance under AWGN reception conditions.

Recapitulating, a general feature of many of the forms of robust DTV data that have been proposed is that each of them redundantly codes randomized MPEG-2-compliant data packets to reduce their code rate to 1/N that of ordinary 8VSB signal, N being a small whole number such as 2, 3, 4 or 5. In some proposals 184-byte chunks of the robust DTV data are included as payloads of MPEG-2-compliant data packets within (207, 187) R-S FEC codewords. In other proposals, such as that of Samsung Electronics Co., Ltd., smaller chunks of the robust DTV data are inserted into application fields of MPEG-2-compliant data packets within (207, 187) R-S FEC codewords.

U.S. patent application Ser. No. 10/955,212 teaches that the halving or quartering of code rate need not be confined just to the 184-byte portions of 207-byte data segments, but usefully extends over all 207 bytes of data segments. This is part of a more general concept of the inventor that chunks of robust DTV data preferably should completely fill 207-byte segments, which then are time-division multiplexed with 207-byte segments of ordinary 8VSB signal of the sort prescribed by A/53 as originally published in 1995. U.S. patent application Ser. No. 10/955,212 describes the following preferred succession of 207-byte segments of robust data in the data field offered for convolutional byte interleaving. The 207-byte segment transmitting one of the two halves of a (207, 187) R-S FEC codeword redundantly coded to a halved code rate is immediately succeeded by the 207-byte segment transmitting the other of those two halves. The successive four 207-byte segments transmitting quarters of a (207, 187) R-S FEC codeword redundantly coded to a quartered code rate are contiguous in the data field(s) offered for convolutional byte interleaving. Such arrangements of the portions of a (207, 187) R-S FEC codewords redundantly coded to a reduced code rate do not result in those codewords having substantially improved capability of withstanding sustained burst error. Indeed, the capability of withstanding sustained burst error may in fact be compromised.

Grouping the portions of redundantly coded (207, 187) R-S FEC codewords together in a prescribed way does simplify decoding the redundant coding. It also simplifies the task of describing the locations of redundantly coded (207, 187) R-S FEC codewords within data fields.

SUMMARY OF THE INVENTION

An aspect of the invention is improvement in electromagnetic signal for transmitting television and other information, the amplitude of which electromagnetic signal is modulated in accordance with a digital signal generated by convolutional interleaving and trellis coding of segments of successive data fields, each of which segments contains a prescribed number of bytes. In this improvement, respective fractional portions of a Reed-Solomon forward-error-correction codeword are transmitted in respective ones of a plurality of the segments of the successive data fields. The respective ones of the plurality of segments are separated from each other within the successive data fields, such that their individual bytes do not interleave with each other after the convolutional interleaving and trellis coding are completed. Accordingly, the capability of Reed-Solomon forward-error-correction codewords to withstand sustained burst error is substantially improved.

A principal aspect of the invention is transmitting (207, 187) Reed-Solomon forward-error-correction codewords at one-half the code rate of ordinary 8VSB data in a pair of data segments separated by fifty-one intervening data segments. This doubles the capability of the (207, 187) Reed-Solomon forward-error-correction coding to withstand burst error. Another principal aspect of the invention is transmitting (207, 187) Reed-Solomon forward-error-correction codewords at essentially one-quarter the code rate of ordinary 8VSB data in four data segments successively transmitted at intervals of fifty-two data segments. This quadruples the capability of the (207, 187) Reed-Solomon forward-error-correction coding to withstand burst error. Generally stated, transmitting (207, 187) Reed-Solomon forward-error-correction codewords at 1/N times the code rate of ordinary 8VSB data in N data segments that are successively transmitted at intervals of fifty-two data segments increases the capability of the (207, 187) Reed-Solomon forward-error-correction coding to withstand burst error N-fold. N is here a small integer greater than one. This procedure also facilitates describing the locations of redundantly coded (207, 187) R-S FEC codewords within data fields.

BRIEF DESCRIPTION OF THE DRAWING

FIG. 5 is a schematic diagram showing in more detail a species of the FIG. 1 DTV transmitter apparatus that provides for the transmission of more robust signals of quartered code rate in time-division multiplex with ordinary 8VSB signals, which robust signals in accordance with an aspect of the invention are provided with capability for overcoming burst errors as long as 2080 bytes.

FIG. 6 is a diagram showing the preferred placement of parity bytes in Reed-Solomon forward-error-correction codewords that will be redundantly coded to occupy four separated segments of data transmitted at one-quarter of ordinary 8VSB code rate.

FIG. 10 is a depiction of a halved-code-rate future-field-description signal that the FIG. 9 modification of DTV transmitter apparatus uses for supplying DTV receivers with advance information concerning the nature of robust transmissions.

FIGS. 11 and 12 are depictions of the formats of bit-pairs that the FIG. 10 and FIG. 13 future-field-description signals use for describing first and second sets of characteristics, respectively, of each of the 312 data segments in each future field of data.

In the schematic diagrams the connections shown in dashed line are used for conveying control signals. Those skilled in the art will understand shim delays may be necessary in some connections, even though for sake of more easily understanding the figures these shim delays are sometimes not explicitly shown. Those skilled in the art will also understand that re-clocking of samples may be necessary before making some connections, even though apparatuses for performing such re-clocking are for sake of more easily understanding the figures sometimes not explicitly shown.

DETAILED DESCRIPTION

Figure 1:
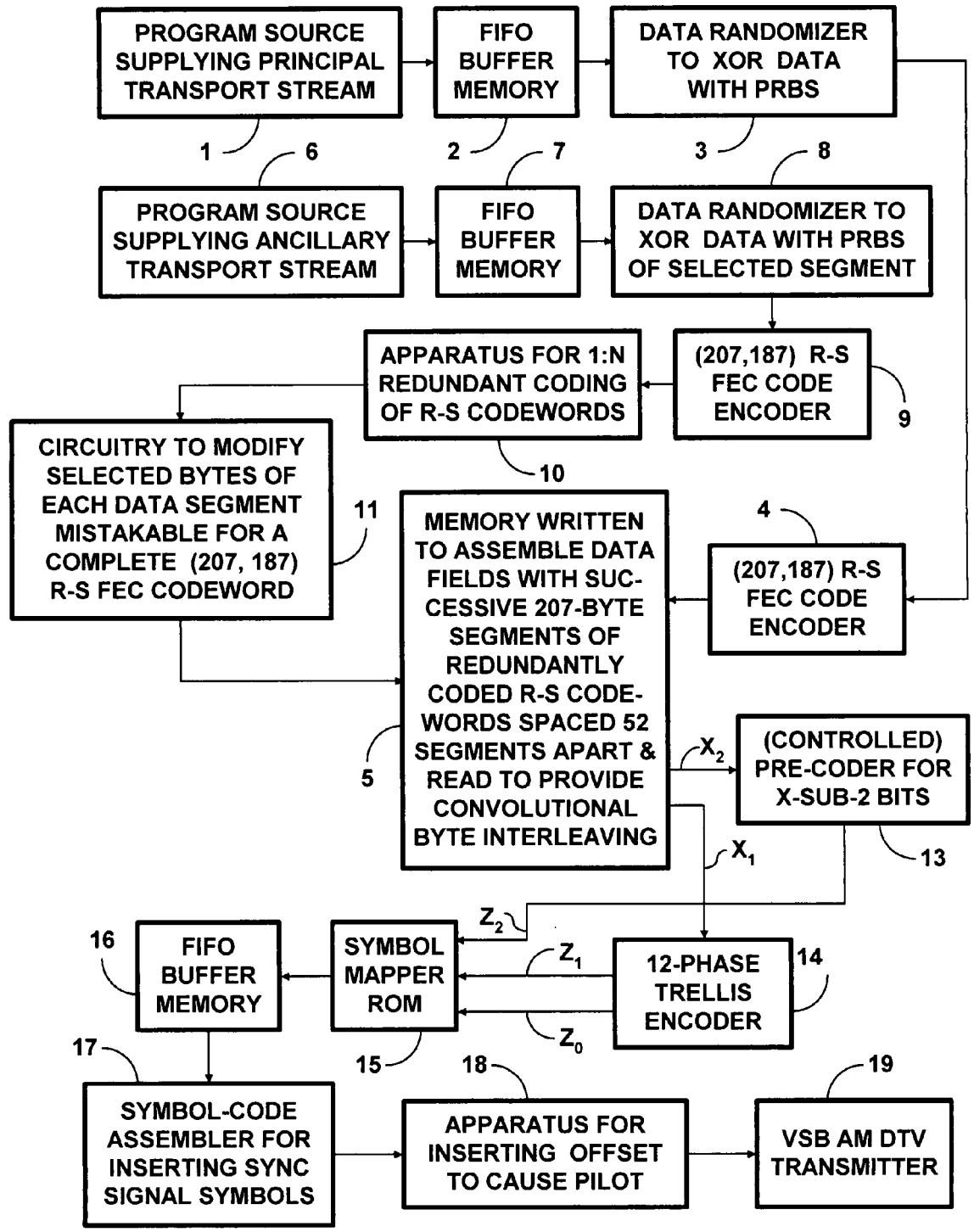
FIG. 1 is a generic schematic diagram of DTV transmitter apparatus that provides for the transmission of ordinary 8VSB signals in time-division multiplex with more robust signals having a code rate 1/N times that of ordinary 8VSB, which robust signals in accordance with the invention are provided with capability for overcoming burst errors as long as N times 520 bytes, N being an integer more than one.

FIG. 1 shows DTV transmitter apparatus for transmitting ordinary 8VSB signals in time-division multiplex with more robust signals of halved code rate. In FIG. 1 a program source 1 is connected to supply the successive 187-byte data packets of a principal transport stream for being written into a first-in/first-out buffer memory 2 for temporary storage therein. A data randomizer 3 is connected for receiving data packets read from the FIFO buffer memory 2 and randomizing the bits in those data packets by exclusive-ORing those bits with the bits of a $2^{16}$-bit maximal length pseudo-random binary sequence (PRBS). The PRBS, which is initialized at the beginning of each data field, is that specified in A/53, Annex D, §§4.2.2 titled "Data randomizer". The portion of the PRBS used in exclusive-ORing each data segment is that portion which is suitable for the location of that data segment in the non-interleaved data field that will be assembled for subsequent (207, 187) R-S FEC coding, convolutional interleaving and trellis coding. An encoder 4 for generating (207, 187) Reed-Solomon forward-error-correction code is connected for receiving the randomized 187-byte data packets of the principal transport stream from the data randomizer 3. The encoder 4 converts these randomized 187-byte data packets to respective 207-byte segments of (207, 187) Reed-Solomon forward-error-correction coding that appends the respective twenty parity bytes of the coding of each randomized 187-byte data packet after the conclusion thereof. The encoder 4 is of the type specified in A/53, Annex D, §§4.2.3 titled "Reed-Solomon encoder". A memory 5 used to assemble data fields is connected for receiving at a first of its input ports the 207-byte segments of (207, 187) R-S FEC coding that the encoder 4 generates.

FIG. 1 shows a program source 6 connected for supplying the successive 187-byte data packets of an ancillary transport stream to be written into a first-in/first-out buffer memory 7 for temporary storage therein. A data randomizer 8 is connected for receiving data packets read from the FIFO buffer memory 7. The data randomizer 8 is operated for randomizing the bits in each of those data packets. This is done by exclusive-ORing them with the bits of the PRBS for a selected data segment. Generally, it is preferred to use the PRBS for the final one of the group of data segments in the non-interleaved data field that will contain the data packet after it is encoded to increase redundancy and reduce code rate. In accordance with a primary aspect of the invention, each successive one of the group of data segments appears fifty-two data segments after the preceding one of that group of data segments in the data field supplied for convolutional interleaving before trellis coding.

An encoder 9 for generating (207, 187) Reed-Solomon forward-error-correction code is connected for receiving the randomized 187-byte data packets of the ancillary transport stream from the data randomizer 8. The encoder 9 converts these randomized 187-byte data packets to respective 207-byte segments of (207, 187) R-S FEC coding. The (207, 187) R-S FEC coding algorithm is the same as that employed by the encoder 4. However, preferably, the construction of the encoder 9 differs from the construction of the encoder 4 in that the encoder 9 does not append the respective twenty parity bytes of the (207, 187) R-S FEC coding of each randomized 187-byte data packet after the conclusion thereof. Instead, the encoder 9 positions a respective (20/N) portion of the twenty parity bytes following each 1/Nth portion of the original MPEG-2-compliant data packet in the 207-byte codeword being generated.

Figure 2:
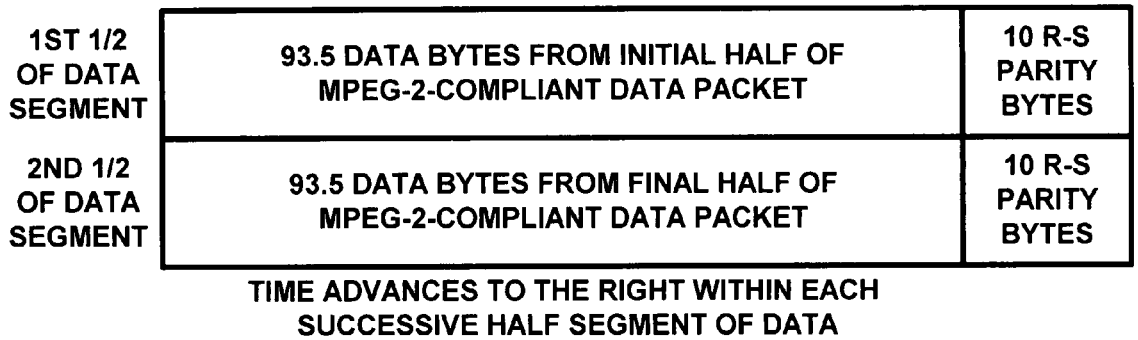
FIG. 2 is a diagram showing the preferred placement of parity bytes in a Reed-Solomon forward-error-correction codeword that will be redundantly coded to occupy two separated segments of data transmitted at one-half of ordinary 8VSB code rate.

FIG. 2 depicts the form of each (207, 187) R-S FEC codeword generated by the encoder 9 in a construction preferred for transmitting robust data at one-half the code rate of ordinary 8VSB data, in which the encoder 9 breaks the twenty parity bytes into two 10-byte groups. One 10-byte group is inserted after the initial half of the randomized 187-byte data packet, and the other 10-byte group is inserted after the final half of the randomized 187-byte data packet. More particularly, the initial ten parity bytes of the (207, 187) R-S FEC codeword are inserted immediately after the initial 43.5 data bytes of the randomized 187-byte data packet. The final ten parity bytes of the codeword are inserted immediately after the final 43.5 data bytes of the randomized 187-byte data packet.

FIG. 1 shows apparatus 10 for 1:N redundant coding of (207, 187) R-S FEC codewords connected for receiving such codewords from the encoder 9. In response to each of these 207-byte segments from the encoder 9, the 1:N redundant coding apparatus 10 generates a respective group of N consecutive 207-byte segments at 1/N times the code rate of ordinary 8VSB. The 1:N redundant coding apparatus 10 is connected for supplying each of the (1/N)-code-rate 207-byte segments to circuitry 11 for conditionally modifying selected ones of the bytes of that segment. The circuitry 11 modifies the selected bytes if, and only if, a legacy DTV receiver would mistake that 207-byte segment for a correct or correctable (207, 187) R-S FEC codeword. The circuitry 11 is connected for supplying the selectively modified 207-byte segments to a second input port of the memory 5 used to assemble data fields.

The field-assembly memory 5 is designed to be written so as to delay each succeeding one of data segments in the non-interleaved data field that contain portions of redundantly coded (207, 187) R-S FEC codewords. The delays are such that each succeeding data segment of such redundant coding appears fifty-two data segment intervals later than the preceding data segment of such redundant coding in the data field before convolutional byte interleaving. In a purposeful departure from the practice that U.S. patent application Ser. Nos. 10/955,212 and 11/119,662 describe, each succeeding data segment of such redundant coding is not supplied just one data segment interval later than the preceding data segment of such redundant coding. The field-assembly memory 5 is designed to be read to supply the successive data segments of an interleaved data field as results from convolutional byte interleaving as prescribed by A/53, Annex D, §§4.2.4 titled "Interleaving". The data stream read from the memory 5 comprises 2-bit nibbles each consisting of a respective $X_2$ bit and a respective $X_1$ bit.

A precoder 13 is connected for receiving the $X_2$ bits read from the field-assembly memory 5 and generating $Z_2$ bits by adding modulo-2 the $X_2$ bits with those bits from twelve symbol epochs previous. A 12-phase trellis encoder 14 is connected for receiving the $X_1$ bits read from the memory 5 and supplying them as $Z_1$ bits. The trellis encoder 14 is connected for supplying $Z_0$ bits that it generates dependent on previously received $X_1$ bits. A symbol mapper read-only memory 15 is connected for receiving $Z_2$ bits from the precoder 13 as a portion of its addressing input signal and for receiving the $Z_1$ and $Z_0$ bits from the trellis encoder 14 as the remaining portion of its addressing input signal. The trellis encoder 14, the precoder 13 and the symbol mapper ROM 15 conform with the 8VSB trellis encoder, precoder and symbol mapper shown in FIG. 7 of A/53, Annex D. The precoder 13, the trellis encoder 14 and the symbol mapper ROM 15 are operated in conformance with A/53, Annex D, §§4.2.5 titled "Trellis coding".

Alternatively, the precoder 13 may be a controlled precoder that requires an enabling control signal to generate $Z_2$ bits by adding modulo-2 the $X_2$ bits with those bits from twelve symbol epochs previous. When the controlled precoder receives a disabling control instead, it generates $Z_2$ bits that simply reproduce the $X_2$ bits. The controlled precoder is always disabled when the memory 5 supplies it with $X_2$ bits from pseudo-2VSB signals. Pseudo-2VSB signals are generated when the 1:N redundant coding apparatus 10 is a re-sampler of the type that generates $X_1$ bits by repeating immediately preceding $X_2$ bits, a procedure that constrains the 8VSB symbol alphabet to −7, −5, +5 and +7 normalized modulation levels. The precoder 13 has been used to accommodate simple comb filters being used in DTV receivers for suppression of NTSC interference. When NTSC broadcasting is officially ended, it is expected that the precoder 13 will be disabled and $Z_2$ bits will simply reproduce the $X_2$ bits.

The ROM 15 operates as a symbol mapper supplying 3-bit, 8-level symbols to a first-in/first-out buffer memory 16. The FIFO buffer memory 16 is operated to provide rate buffering and to open up intervals between 828-symbol groups in the symbol stream supplied to a symbol-code assembler 17, into which intervals the symbol-code assembler 17 inserts synchronizing signal symbols. Each of the successive data fields begins with a respective interval into which the symbol-code assembler 17 inserts symbol code descriptive of a data-segment-synchronization (DSS) sequence followed by symbol code descriptive of an initial data segment including an appropriate data-field-synchronization (DFS) sequence. Each data segment in the respective remainder of each data field is followed by a respective interval into which the symbol-code assembler 17 inserts symbol code descriptive of a respective DSS sequence. Apparatus 18 for inserting the offset to cause pilot is connected to receive assembled data fields from the symbol-code assembler 17. The apparatus 18 is simply a clocked digital adder that zero extends the number used as symbol code and adds a constant term thereto to generate a real-only modulating signal in digital form, supplied to a vestigial-sideband amplitude-modulation digital television transmitter 19 of conventional construction.

Figure 3:
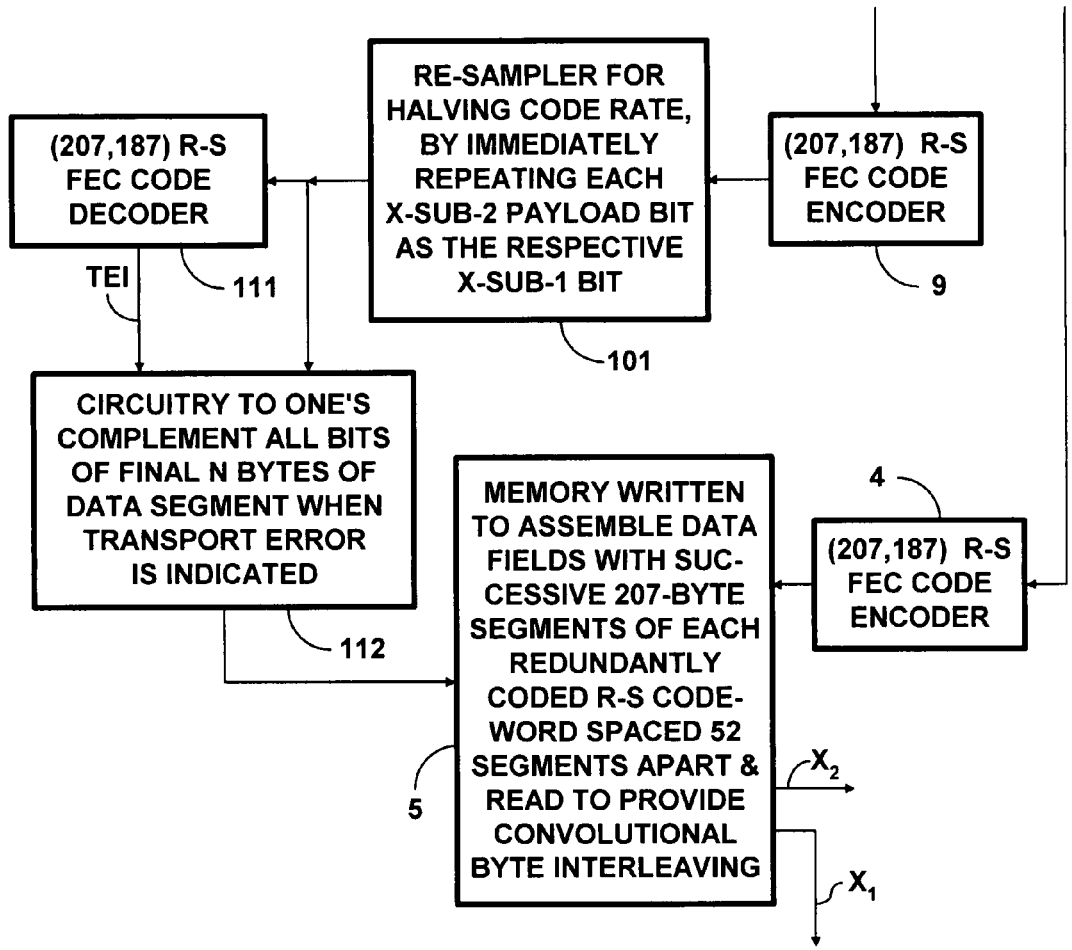
FIG. 3 is a schematic diagram showing in more detail a species of the FIG. 1 DTV transmitter apparatus that transmits pseudo-2VSB signals, which P2VSB signals in accordance with an aspect of the invention are provided with capability for overcoming burst errors as long as 1040 bytes.

FIG. 3 shows in more detail the construction of a species of the FIG. 1 DTV transmitter apparatus that transmits segments of pseudo-2VSB (P2VSB) signal in time-division multiplex with segments of ordinary 8VSB signal. FIG. 3 shows a re-sampler 101 that is a species of the 1:N redundant coding apparatus 10. The re-sampler 101 halves the code rate of its response by repeating each of the $X_2$ bits it receives from the encoder 9 as a respective $X_1$ bit inserted immediately thereafter. The re-sampler 101 is connected for supplying each data segment that it generates to a (207, 187) R-S FEC decoder 111 and to circuitry 112 that selectively one's complements all the bits in the final twenty bytes of the 207-byte segment that it supplies to the supplementary interleaver 12. The R-S FEC decoder 111 and circuitry 112 are connected to function as a species of the FIG. 1 circuitry 11, with the R-S FEC decoder 111 connected for supplying a transport error indication (TEI) signal to the circuitry 112. At times the R-S FEC decoder 111 fails to supply a TEI signal indicating that a legacy DTV receiver would find a current data segment to contain uncorrectable byte errors. Then, and only then, the circuitry 112 one's complements all the oddly occurring bits in the final twenty bytes of the 207-byte segment that it supplies to the second input port of the field-assembly memory 5. So, the $X_1$ bits in each 207-byte segment that the circuitry 112 supplies to the second input port of the memory 5 still repeat the respective $X_2$ bits immediately preceding them.

The precoder 13 is not used or is disabled when the field-assembly memory 5 supplies bytes of signal to be transmitted as P2VSB signal. So, the $X_2$ output bits supplied from the memory 5 are applied directly to the symbol mapper ROM 15 as the $Z_2$ input bits of a partial read address. The $X_1$ output bits supplied from the field-assembly memory 5 and applied as $Y_1$ input bits to the 12-phase ⅔ trellis encoder 14 are relayed without changes to the symbol mapper ROM 15 as the $Z_1$ input bits of a partial read address. So, the $Z_1$ input bits of the ROM 15 partial read address are the same as the $Z_2$ input bits they are concurrent with. This constrains the 8VSB symbol alphabet read from the ROM 15 to the normalized modulation levels of −7, −5, +5 and +7 that characterize P2VSB modulation.

Figure 4:
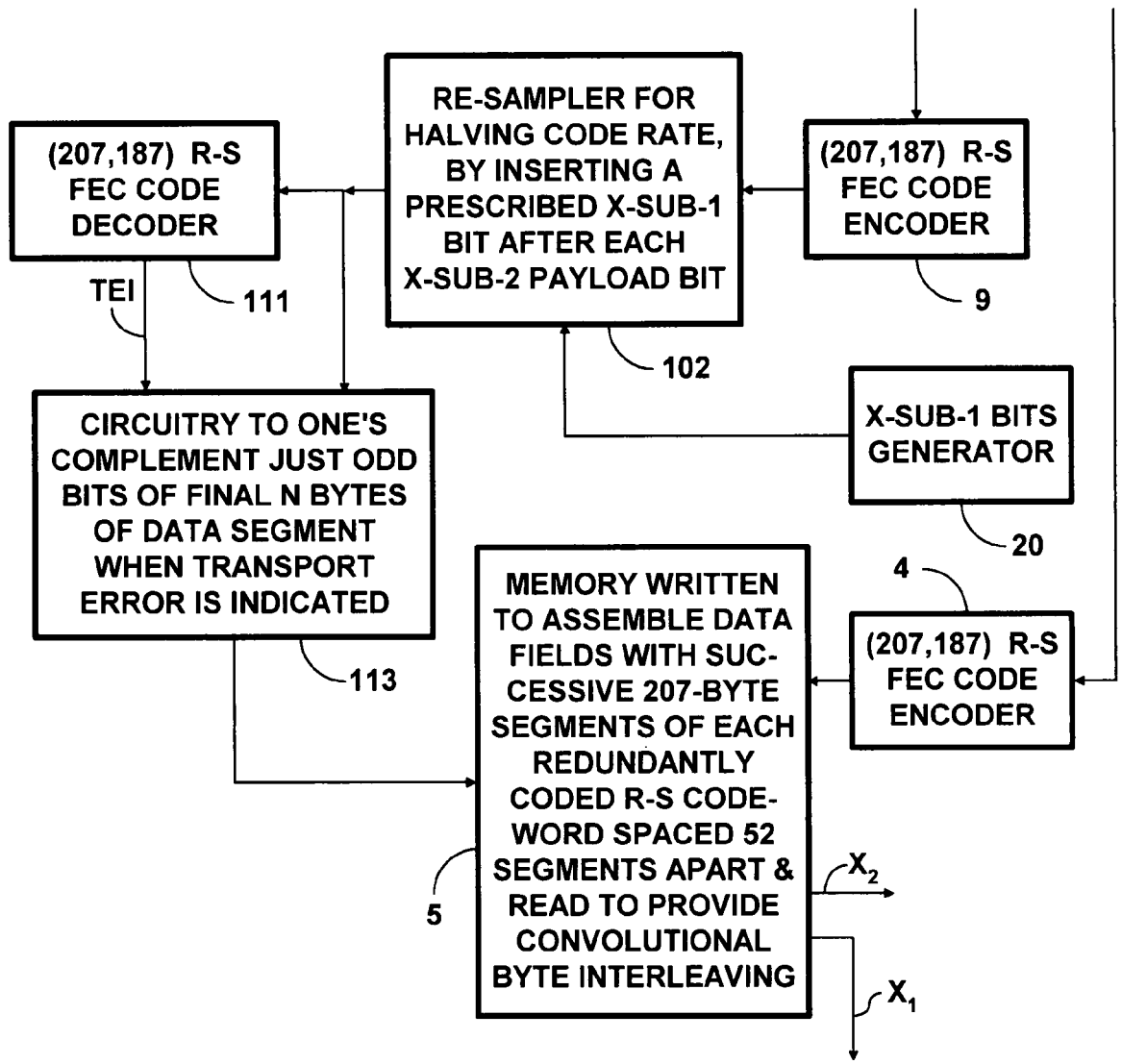
FIG. 4 is a schematic diagram showing in more detail a species of the FIG. 1 DTV transmitter apparatus that transmits prescribed-coset-pattern-modulation signals of a type previously shown and described in U.S. patent application Ser. No. 10/955,212, which PCPM signals in accordance with an aspect of the invention are provided with capability for overcoming burst errors as long as 1040 bytes.

FIG. 4 shows in more detail the construction of a species of the FIG. 1 DTV transmitter apparatus that transmits prescribed-coset-pattern-modulation (PCPM) signal of a type previously shown and described in U.S. patent application Ser. No. 10/955,212. FIG. 4 shows a re-sampler 102 that is a species of the 1:N redundant coding apparatus 10. The re-sampler 102 halves the code rate of its response by inserting a respective $X_1$ bit immediately after each of the $X_2$ bits it receives from the (207, 187) R-S FEC encoder 9. A generator 20 supplies the respective $X_1$ bits to the re-sampler 102 in accordance with a prescribed bit pattern. E.g., a modulo-2 count of the data bytes in the data field is used to generate the $X_1$ bits supplied to the re-sampler 102. The re-sampler 102 is connected for supplying each data segment that it generates to the (207, 187) R-S FEC decoder 111 and to circuitry 112 that selectively one's complements just the odd bits in the final twenty bytes of each data segment before supplying it to the second input port of the field-assembly memory 5. The R-S FEC decoder 111 and circuitry 112 are connected to function as a further species of the FIG. 1 circuitry 11, with the R-S FEC decoder 111 connected for supplying a transport error indication (TEI) signal to the circuitry 112. At times the R-S FEC decoder 111 fails to supply a TEI signal indicating that a legacy DTV receiver would find a current data segment to contain uncorrectable byte errors. Then, and only then, the circuitry 112 one's complements just the odd bits in the final twenty bytes of that segment as applied to the second input port of the field-assembly memory 5. So, the $X_1$ bits in each 207-byte segment that the circuitry 112 supplies to the second input port of the memory 5 still conform to the bit pattern supplied by the generator 20. N is made large enough to prevent any legacy DTV receiver apparatus mistaking the segment for a R-S FEC codeword that is correct or that can be corrected by the (207, 187) R-S FEC decoder that such legacy DTV receiver apparatus includes.

FIG. 5 shows details of a species of the FIG. 1 DTV transmitter apparatus that provides for the transmission of more robust signals of quartered code rate in time-division multiplex with ordinary 8VSB signals. FIG. 5 does not explicitly show the program source 6 supplying the ancillary transport stream, the FIFO buffer memory 7 and the data randomizer 8. The data randomizer 8 is operated for randomizing the bits in data packets read from the FIFO buffer memory 7 by exclusive-ORing them with the bits of the PRBS for the final one of the four data segments in the non-interleaved data field that will contain the encoded data packet. In accordance with an aspect of the invention, this final one of the four data segments appears 156 data segments after the initial one of the pair of data segments in the data field supplied for convolutional interleaving before trellis coding.

FIG. 5 shows the (207, 187) Reed-Solomon forward-error-correction encoder 9 connected for receiving randomized 187-byte data packets of the ancillary transport stream from the data randomizer 8. The (207, 187) R-S FEC encoder 9 converts these randomized 187-byte data packets to respective 207-byte segments of (207, 187) R-S FEC coding. In a preferred construction the encoder 9 breaks the twenty parity bytes into four 5-byte groups, each inserted after a respective quarter of the randomized 187-byte data packet, as shown in FIG. 6. FIG. 5 shows the (207, 187) R-S FEC encoder 9 connected for supplying its response as input signal to a block coding apparatus 21. The block coding apparatus 21 essentially halves code rate in its response.

U.S. patent application Ser. No. 11/119,662 describes the use of (24, 12) extended binary Golay code, (23, 12) binary Golay code, (16, 8) linear block code, (16, 8) linear block code or (8, 4) linear block code to reduce code rate and increase robustness in DTV signals. The (16, 8) and (8, 4) linear block codes are better suited to locating byte errors on behalf of a subsequent (207, 187) R-S FEC decoder than the longer Golay codes are. Also, the (16, 8) and (8, 4) linear block codes lend themselves to locating 160-bit groups of linear-block-coded parity bytes from a (207, 187) R-S FEC codeword at the ends of segments of robust data. This facilitates modification of any group of these coded parity bytes should legacy DTV receivers be apt not to disregard the segment of robust data concluding with that group of linear-block-coded parity bytes. The block coding apparatus 21 can also be of a type for performing non-linear block coding.

FIG. 5 shows the block coding apparatus 21 connected to supply block-coded quarter segments of data to a re-sampler 22 at half the code rate of ordinary 8VSB. The re-sampler 22 is connected for receiving that response as its input signal and halving it again, resulting in the re-sampler 22 response being essentially one-quarter the code rate of ordinary 8VSB signal. The re-sampler 22 is connected for supplying its response as input signal to the circuitry 11 for modifying selected ones of the bytes of that segment if and only if a legacy DTV receiver would mistake that 207-byte segment for a correct or correctable (207, 187) R-S FEC codeword.

In species of the FIG. 1 DTV transmitter apparatus the 1:N redundant coding apparatus 10 consists of or essentially consists of block coding apparatus. Species of particular interest are those in which the block coding apparatus employs (8, 4) or (16, 8) linear block coding to provide an inner code for locating errors for the outer (207, 187) R-S FEC code. This facilitates using an alternative decoding algorithm that does not locate byte errors in the outer (207, 187) R-S FEC code, but is capable of correcting up to twenty erroneous bytes. This provides capability for withstanding burst errors up to 2080 bytes in length.

When the block coding apparatus employs (8, 4) linear block coding, the assembly format remains similar to that shown in FIG. 2 since half-bytes can be linear block coded. Therefore, the circuitry 11 can selectively modify the last 160 bits of each data segment. When the block coding apparatus employs (16, 8) linear block coding, half-bytes cannot be linear block coded. A final half-byte in the initial half of a data segment and an initial half-byte in the final half of the same data segment are linear block coded using (16, 8) linear block code. An initial half of the resulting codeword concludes the initial one of a pair of data segments consecutively supplied from the block coding apparatus. The final half of the resulting codeword begins the final one of that pair of consecutively supplied data segments. In this case also the circuitry 11 can selectively modify the last 160 bits of each data segment if a legacy DTV receiver would mistake it for a (207, 187) R-S FEC codeword.

The FIG. 5 species of the FIG. 1 DTV transmitter apparatus can be modified to connect the output port of the block coding apparatus 21 directly to the input port of the circuitry 11, omitting the re-sampler 22 from the connection. This modification results in robust transmission at one-half the code rate of ordinary 8VSB.

Figure 7:
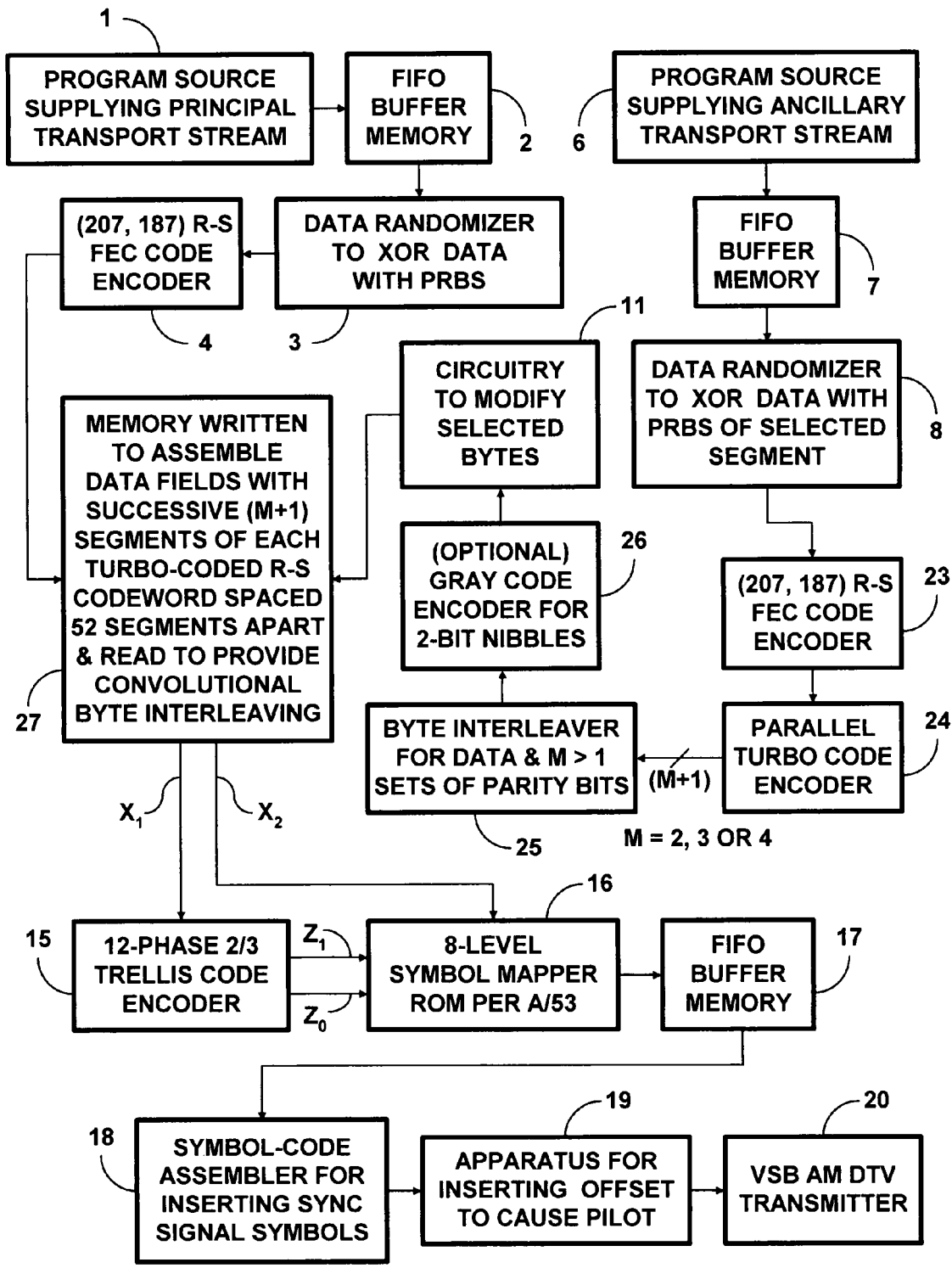
FIG. 7 is a generic schematic diagram of DTV transmitter apparatus that provides for the transmission of ordinary 8VSB signals in time-division multiplex with turbo coded signals using parallel turbo coding that has a code rate 1/N times that of ordinary 8VSB, which turbo coded signals in accordance with the invention are provided with capability for overcoming burst errors as long as N times 520 bytes, N being an integer more than one.

FIG. 7 shows DTV transmitter apparatus for transmitting ordinary 8VSB signals in time-division multiplex with more robust signals that employ systematic parallel turbo coding. The FIG. 7 DTV transmitter apparatus differs from the FIG. 1 generic DTV transmitter apparatus in the following respects.

FIG. 7 shows a (207, 187) Reed-Solomon forward-error-correction encoder 23 connected for receiving randomized 187-byte data packets of the ancillary transport stream from the data randomizer 8. The (207, 187) R-S FEC encoder 23 converts these randomized 187-byte data packets to respective 207-byte segments of (207, 187) R-S FEC coding. Each of these (207, 187) R-S FEC codewords is composed of a 187-byte MPEG-2-compliant data packet followed by twenty parity bytes. The encoder 23 is connected for supplying these (207, 187) R-S FEC codewords to a parallel turbo code encoder 24 for generating systematic parallel turbo coding comprising the (207, 187) R-S FEC codewords each accompanied by a plurality, M in number, of 207-byte segments. M is 2, 3 or 4. Each of the M accompanying 207-byte segments is composed of a respective set of parity bits from the convolutional codes employed for turbo coding. The turbo code encoder 24 is of a type similar to those employed in third-generation cellular telephony, although the bit interleaver(s) can be especially designed for DTV using known design procedures.

FIG. 7 shows a byte interleaver 25 connected for receiving each successive (207, 187) R-S FEC codeword and its M accompanying 207-byte segments of parity bits from the turbo code encoder 24. The byte interleaver 25 is of a design to reproduce in its response bytes cyclically selected from the (207, 187) R-S FEC codeword and its M accompanying 207-byte segments of parity bits, as currently received by the byte interleaver 25. This spreads the distance between bytes of the (207, 187) R-S FEC codeword to (M+1) intervals. This also spreads the distance between bytes of each of the M accompanying 207-byte segments of parity bits to (M+1) intervals. Ultimately, this initial byte interleaving will increase the capability of the (207, 187) R-S FEC coding to withstand burst errors by a factor of (M+1).

FIG. 7 shows a Gray code encoder 26 for 2-bit nibbles connected for receiving the response of the byte interleaver 25. The Gray code encoder 26 for 2-bit nibbles is constructed using read-only memory. The Gray code is selected so as to affect only the second bit in each nibble, leaving the first bit unchanged. This ROM is connected to read the re-coded byte interleaver 25 response to provide input signal to the circuitry 11 for modifying selected ones of the bytes of each successive 207-byte segment. The selected bytes are modified by the circuitry 11 if and only if a legacy DTV receiver would mistake the 207-byte segment for a correct or correctable (207, 187) R-S FEC codeword. The circuitry 11 is preferably of the type shown in FIG. 4 in which the odd bits, but not the even bits, in the bytes are complemented in the modifications. The use of the Gray code encoder 26 for 2-bit nibbles is optional. So, in some DTV transmitter apparatus similar to that shown in FIG. 7, the byte interleaver 25 response is applied without re-coding to the circuitry 11 as input signal thereto.

FIG. 7 shows a memory 27 connected to perform data field assembly and convolutional byte interleaving procedures performed by the memory 5 in the FIG. 1 generic DTV transmitter apparatus. The memory 27 is designed to be written so as to delay each succeeding one of the group of N data segments in the non-interleaved data field that contain a turbo coded (207, 187) R-S FEC codeword. The delays are such that each succeeding one of the group of (M+1) data segments appears fifty-two data segment intervals later than the preceding one of that group of (M+1) data segments in the data field before convolutional byte interleaving. The data stream read from the memory 27 comprises 2-bit nibbles each consisting of a respective $X_2$ bit and a respective $X_1$ bit. The memory 27 is designed to be read to supply the successive data segments of an interleaved data field using convolutional byte interleaving as prescribed by A/53, Annex D, §§4.2.4.

This convolutional byte interleaving spreads by an additional factor of 52 the successive bytes of each group of (M+1) data segments in the non-interleaved data field that contain a turbo coded data packet, which bytes are already spread (M+1) bytes apart. Parallel turbo coding in which each (207, 187) R-S FEC codeword is re-coded to occupy three data segments will be able to overcome burst errors up to 1560 bytes in duration. Parallel turbo coding in which each (207, 187) R-S FEC codeword is re-coded to occupy five data segments will be able to overcome burst errors up to 2600 bytes in duration. Intertwining the turbo coding of more than one (207, 187) R-S FEC codeword can also be done to increase the capabilities of the (207, 187) R-S FEC coding to overcome burst errors.

Figure 8:
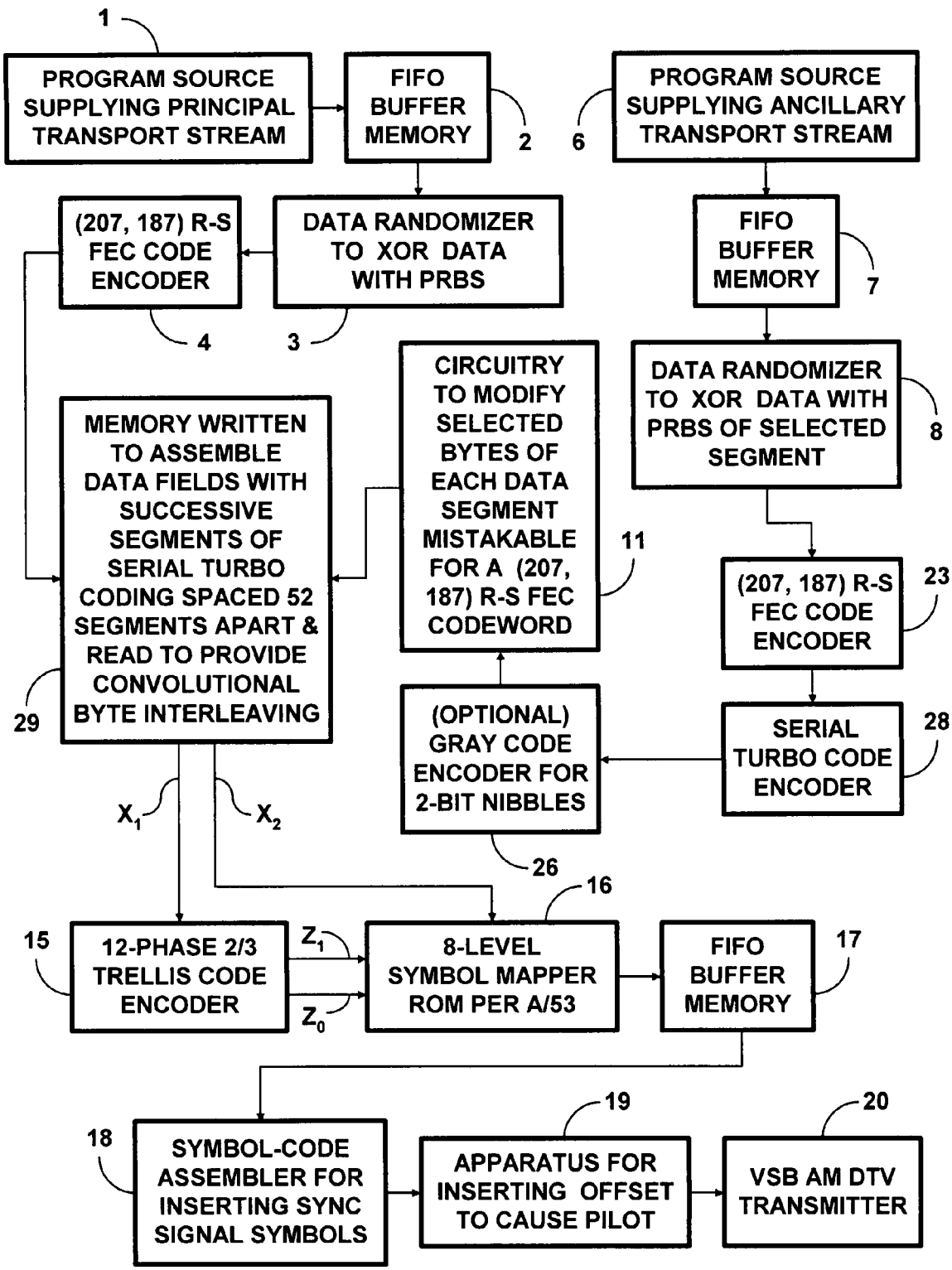
FIG. 8 is a generic schematic diagram of DTV transmitter apparatus that provides for the transmission of ordinary 8VSB signals in time-division multiplex with turbo coded signals using serial turbo coding that has a code rate 1/N times that of ordinary 8VSB, which turbo coded signals in accordance with the invention are provided with capability for overcoming burst errors as long as N times 520 bytes, N being an integer more than one.

FIG. 8 shows DTV transmitter apparatus for transmitting ordinary 8VSB signals in time-division multiplex with more robust signals that employ serial turbo coding similar to the halved-code-rate or quartered-code-rate A-VSB turbo coding. The FIG. 8 DTV transmitter apparatus differs from that of FIG. 7 in the following respects. The (207, 187) R-S FEC encoder 23 is connected for supplying these (207, 187) R-S FEC codewords to a serial turbo code encoder 28 for generating halved-code-rate or quartered-code-rate A-VSB turbo coding. FIG. 8 shows the Gray code encoder 26 for 2-bit nibbles connected for receiving this A-VSB turbo coding from the turbo code encoder 28. The Gray code is selected so as to affect only the second bit in each nibble, leaving the first bit unchanged. The ROM in the Gray code encoder 26 is connected to read the re-coded A-VSB turbo coding to provide input signal to the circuitry 11 for modifying selected ones of the bytes of each successive 207-byte segment of that coding. The selected bytes are modified by the circuitry 11 if and only if a legacy DTV receiver would mistake the 207-byte segment for a correct or correctable (207, 187) R-S FEC codeword. The circuitry 11 is of the type shown in FIG. 4 in which the odd bits but not the even bits in the bytes are complemented in the modifications. The use of the Gray code encoder 26 for 2-bit nibbles is optional. So, in some DTV transmitter apparatus similar to that shown in FIG. 8, the A-VSB turbo coding from the turbo code encoder 28 is applied without re-coding to the circuitry 11 as input signal thereto.

FIG. 8 shows a memory 29 connected to perform data field assembly and convolutional byte interleaving procedures performed by the memory 5 in the generic FIG. 1 DTV transmitter apparatus. The memory 29 is designed to be written so as to delay each succeeding data segment of turbo coding in the non-interleaved data field by fifty-two data segment intervals from the preceding data segment of turbo coding in the data field before convolutional byte interleaving. The data stream read from the memory 29 comprises 2-bit nibbles each consisting of a respective $X_2$ bit and a respective $X_1$ bit. The memory 29 is designed to be read to supply the successive data segments of an interleaved data field using convolutional byte interleaving as prescribed by A/53, Annex D, §§4.2.4. This convolutional byte interleaving in combination with the bit interleaving in the generation of the A-VSB serial turbo coding substantially increases the capability of the (207, 187) R-S FEC coding to overcome burst errors, as compared to the case with ordinary 8 VSB.

Figure 9:
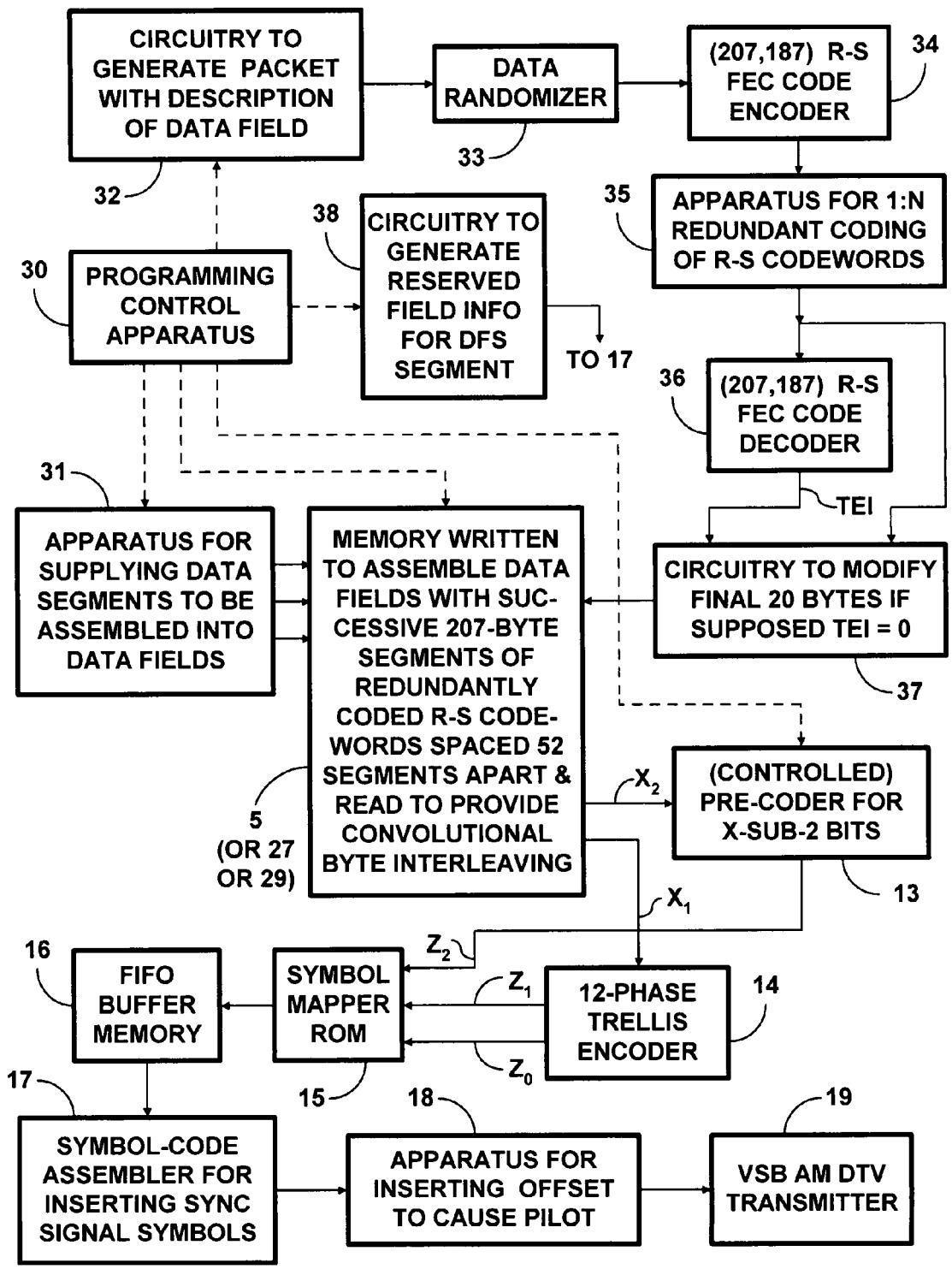
FIG. 9 is a schematic diagram of a modification made to DTV transmitter apparatus of the types shown in FIGS. 1 and 3, in FIGS. 1 and 4, in FIGS. 1 and 5, in FIG. 7 and in FIG. 8, which modification in accordance with an aspect of the invention provides for supplying DTV receivers with advance information concerning the nature of robust transmissions.

FIG. 9 shows a modification that can be made to DTV transmitter apparatuses as described supra, which modification provides for supplying DTV receivers with advance information concerning the nature of robust transmissions. Programming control apparatus 30 controls the operation of apparatus 31 for supplying data segments to be assembled into data fields, which apparatus 31 is, for example, of one of the types described in connection with FIGS. 1, 7 and 8. The programming control apparatus 30 also controls the assembly of data fields in the memory 5 (or the memory 27 in FIG. 7 or the memory 29 in FIG. 8).

The programming control apparatus 30 supplies information concerning its programming procedures to circuitry 32 for generating a respective 187-byte description of each data field, which description includes a listing of the type of coding employed in each successive data segment of that particular data field. A data randomizer 33 is connected for randomizing the data in each 187-byte description of a respective data field and supplying the randomized data to an encoder 34 for generating (207, 187) Reed-Solomon forward-error-correction codewords. The encoder 34 generates a respective 207-byte codeword responsive to each 187-byte description of a data field and is connected for supplying that codeword as input signal to apparatus 35 for 1:N redundant coding of (207, 187) R-S FEC codewords. Responsive to each 207-byte codeword the apparatus 35 generates a respective plurality, N in number, of 207-byte segments at a code rate 1/Nth of that of ordinary 8VSB. A decoder 36 for (207, 187) Reed-Solomon forward-error-correction codewords is connected for receiving the 207-byte segments that the apparatus 35 for 1:N redundant coding supplies. The R-S FEC decoder 36 ascertains whether each segment that the apparatus 35 supplies is a (207, 187) R-S FEC codeword as specified in A/53, Annex D, §§4.2.3. The R-S FEC decoder 36 attempts to correct the segment to be such a codeword if it is not already. The R-S FEC decoder 36 generates a transport error indicator (TEI) bit that is a ZERO if the segment is apparently a (207, 187) R-S FEC codeword that is correct or can be corrected by the decoders for such codewords in legacy DTV receivers. The R-S FEC decoder 36 generates a TEI bit that is a ONE if the segment is apparently incapable of correction.

One input port of the memory 5 (or 27 or 29) used to assemble data fields is connected for receiving 207-byte segments from circuitry 37, which is connected for receiving 207-byte segments from the apparatus 35 for 1:N redundant coding. When the TEI bit the circuitry 37 receives as a control signal from the R-S FEC decoder 36 is ONE, the circuitry 37 reproduces a 207-byte segment supplied thereto by the apparatus 35. When the TEI bit that the circuitry 37 receives as a control signal from the R-S FEC decoder 36 is ZERO, the circuitry 37 reproduces the initial 187 bytes of a 207-byte segment supplied by the apparatus 35. However, when that TEI bit is ZERO, the circuitry 37 modifies the final 20 bytes of the 207-byte segment that it supplies to the memory 5 (or 27 or 29). This prevents the segment being mistaken for a (207, 187) R-S FEC codeword that is correct or can be corrected by the decoders for such codewords in legacy DTV receivers.

FIG. 9 shows the programming control apparatus 30 connected for supplying control signal to the controlled pre-coder 13. This control signal disables pre-coding at least when bytes of P2VSB signal or turbo coding are to be transmitted. So long as NTSC analog television signals are being transmitted, the programming control apparatus 30 enables pre-coding by the controlled pre-coder 13 when bytes of ordinary 8VSB signal or bytes of PCPM signal are to be transmitted. After the cut-off date for transmitting NTSC analog television signals, it is expected that the pre-coding of $X_2$ payload bits will be discontinued.

FIG. 10 shows the response of a preferred construction of the (207, 187) LRS FEC encoder 34 for a randomized 187-byte description of a future data field supplied from the data randomizer 33, presuming this description is to be transmitted at one half the code rate of ordinary 8VSB. This 207-byte data segment response consists of two consecutive half segments of data. The initial one of these half segments of data begins with a link-level header that is three bytes long and signals that the remaining portion of the initial half segment will contain a set of first characteristics of the 312 data segments in a future data field. The final one of these half segments of data begins with a different header that is three bytes long and signals that the remaining portion of the final half segment will contain a set of second characteristics of the 312 data segments in a future data field. The headers of the initial and final half segments of data should be readily distinguishable from each other. The same packet identifier (PID) can be used for both headers, with the continuity count in the last four bits of each header being different in the two headers, for example. The link level header beginning the initial half segment is followed by twelve and a half bytes of auxiliary information. At least five and a half bytes of this auxiliary information are selected so as to prevent the initial half segment generating a correct or correctable (207, 187) LRS FEC codeword when re-sampled to halved code rate. This auxiliary information is followed by 312 2-bit nibbles each describing first characteristics of a respective segment of a future data field. The initial half segment of data concludes with the initial ten parity bytes of the (207, 187) LRS FEC coding.

The link level header beginning the final half segment is followed by twelve and a half bytes of auxiliary information, at least five and a half bytes of which are selected so as to prevent the final half segment generating a correct or correctable (207, 187) LRS FEC codeword when re-sampled to halved code rate. This auxiliary information is followed 312 2-bit nibbles each describing second characteristics of a respective segment of the future data field. The final half segment of data concludes with the final ten parity bytes for the (207, 187) LRS FEC coding.

It should be possible to code useful data into at least fourteen of the twenty-five bytes of auxiliary information. One example of useful auxiliary information is which of successive future data fields will use the pattern of robust transmission specified in the four-bit half-bytes describing the modulation scheme used in a respective data segment. This facilitates redundant transmission of information concerning the patterns of robust transmission. Another example of useful auxiliary information is an indication of when the next data segment map will appear.

FIG. 11 shows a representative format for the 312 2-bit nibbles in the initial half of the FIG. 10 data segment that describe first characteristics of respective data segments in a future data field. The initial bit of the nibble is a ONE if the described data segment was modified to avoid legacy DTV receivers mistaking it for a complete (207, 187) R-S FEC codeword. The initial bit of the nibble is otherwise a ZERO. The final bit of the nibble is a ZERO if the described data segment contains only a later portion of a (207, 187) R-S FEC codeword re-sampled to less than ⅔ code rate, which re-sampled codeword began in an earlier data segment. The final bit of the nibble is a ONE if the described data segment contains a complete (207, 187) R-S FEC codeword transmitted at ⅔ code rate or a beginning portion of a (207, 187) R-S FEC codeword re-sampled to less than ⅔ code rate.

FIG. 12 shows a representative format for the 312 2-bit nibbles in the final half of the FIG. 10 data segment that describe second characteristics of respective data segments in a future data field. Each of these nibbles indicates which one of four types of modulation is used in the respective data segment that the nibble characterizes. 00 indicates the full 8VSB alphabet is used without block encoding; 01 indicates the full 8VSB alphabet is used with prescribed block encoding; 10 indicates P2VSB is used; 11 indicates PCPM is used. P2VSB signal confines the symbol alphabet to −7, −5, +5 and +7 symbol values. The first-coset restricted symbol alphabet for PCPM signal excludes the −7, −5, +1 and +3 symbol values of the full 8VSB alphabet. The second-coset restricted symbol alphabet for PCPM signal excludes the −3, −1, +5 and +7 symbol values of the full 8VSB alphabet. The choice of whether the first-coset or the second-coset symbol alphabet is used in a current symbol depends upon the position of that symbol in the data field.

Figure 13:
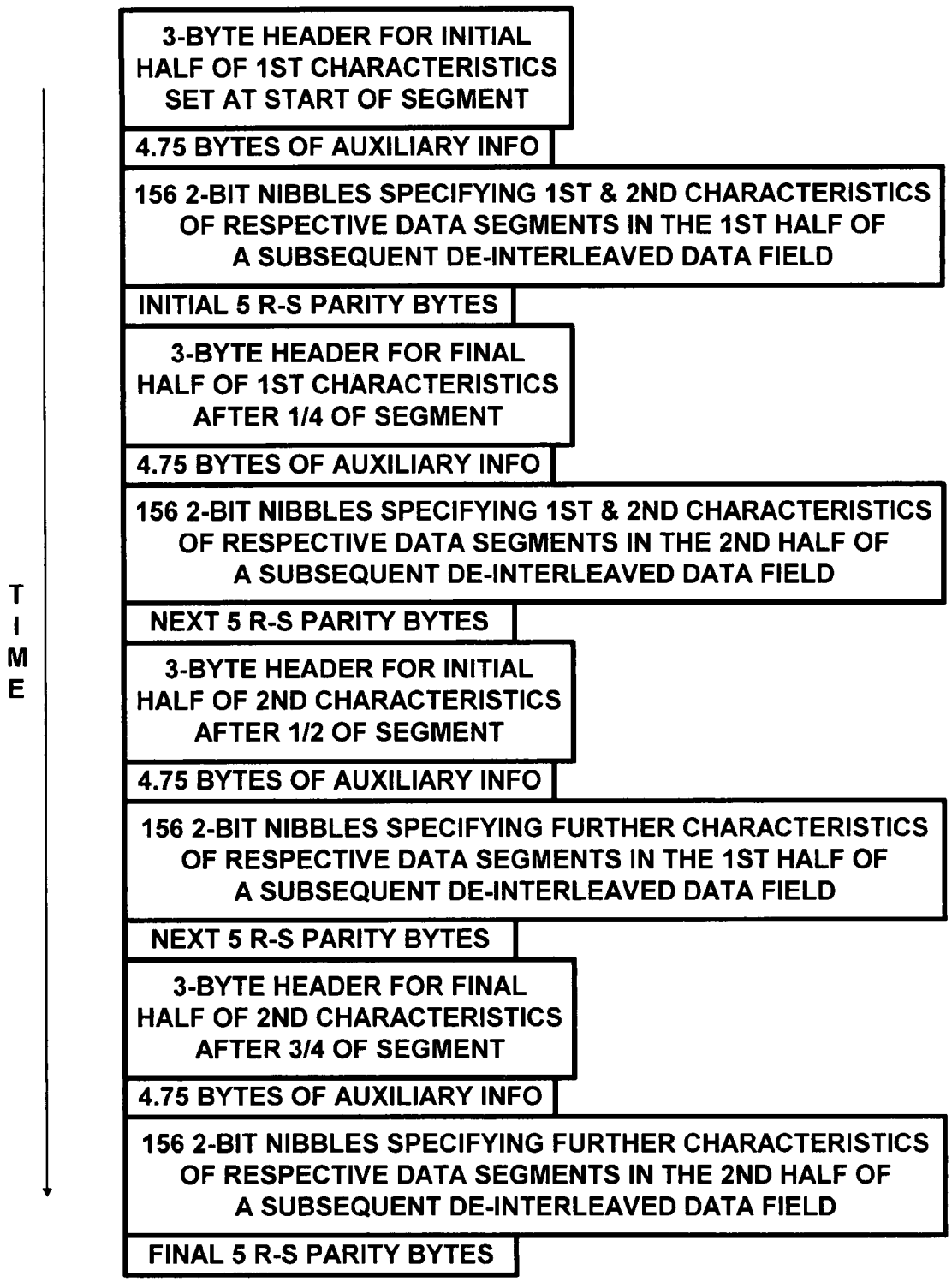
FIG. 13 is a depiction of a quartered-code-rate future-field-description signal that the FIG. 9 modification of DTV transmitter apparatus alternatively uses for supplying DTV receivers with advance information concerning the nature of robust transmissions.

FIG. 13 shows the response of the (207, 187) LRS FEC encoder 34 to a randomized 187-byte description of a future data field supplied from the data randomizer 33, presuming this description is to be transmitted at one quarter the code rate of ordinary 8VSB. This 207-byte data segment response consists of four consecutive quarter segments of data. The initial one of these quarter segments of data begins with a link-level header that is three bytes long, and the three successive ones of these quarter segments of data each begin with different link-level headers each of which is three bytes long. By way of explicit example, the four headers can use the same PID, but be distinguishable from each other based on the continuity count in the last four bits of each successive header. The PID used to identify descriptions of future data fields transmitted at one-quarter the code rate of ordinary 8VSB is preferably different from the PID used to identify descriptions of future data fields transmitted at one-half the code rate of ordinary 8VSB. Each header is followed by four and three-quarters bytes of auxiliary information, at least two and three-quarters bytes of which are selected so as to prevent the quarter segment generating a correct or correctable (207, 187) LRS FEC codeword when re-sampled to quartered code rate. The auxiliary information in each quarter segment of data is followed by 156 2-bit nibbles describing respective segments of a future half data field. The initial quarter segment of data concludes with the first five parity bytes of the (207, 187) LRS FEC codeword. The second quarter segment of data concludes with the next five parity bytes of the (207, 187) LRS FEC codeword. The third quarter segment of data concludes with the next five parity bytes of the (207, 187) LRS FEC codeword. The final quarter segment of data concludes with the last five parity bytes of the (207, 187) LRS FEC codeword.

FIGS. 10 and 13 split up the information concerning the first and second characteristics of respective data segments in a future data field so that it is possible to omit sending the information concerning the second set of data segment characteristics while still sending the information concerning their first characteristics. This can be done presuming a default condition in which all robust transmission uses the same coding as the data segment(s) transmitting the map of the first characteristics of respective data segments in a future data field. Alternatively, the type of modulation used in segments of robust data can be determined from analysis of the segments of robust data themselves.

Figure 14:
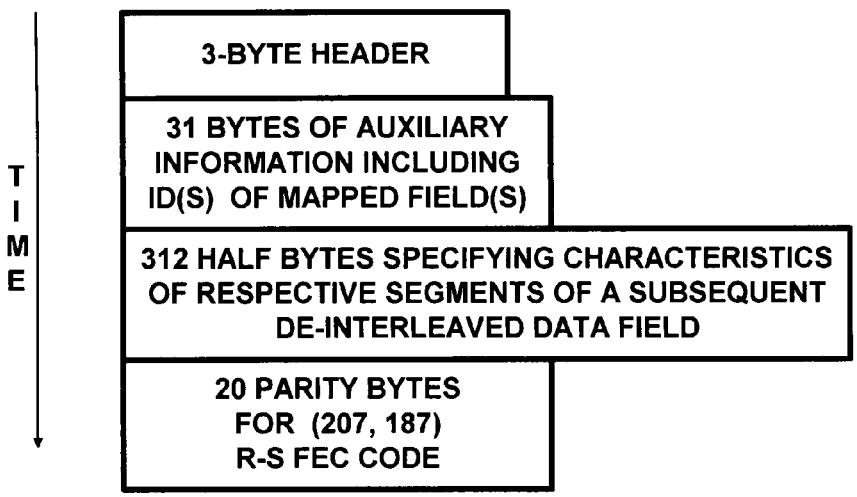
FIG. 14 is a depiction of a future-field-description signal that the FIG. 9 modification of the FIG. 7 or the FIG. 8 DTV transmitter apparatus uses for supplying DTV receivers with advance information concerning the nature of turbo coded robust transmissions.

FIG. 14 depicts the (207, 187) LRS FEC codeword that the encoder 34 generates in response to a randomized 187-byte description of a future data field supplied from the data randomizer 33, supposing the codeword is subsequently to be turbo coded by the apparatus 35 for 1:N redundant coding. The (207, 187) LRS FEC codeword begins with a link-level header that is three bytes long and signals that the remaining portion of the segment will contain a set of 312 half bytes descriptive of the characteristics of 312 respective data segments in a future data field. This header is immediately followed by 31 bytes of auxiliary information. The (207, 187) LRS FEC codeword concludes with twenty parity bytes for the (207, 187) LRS FEC coding.

Figure 15:
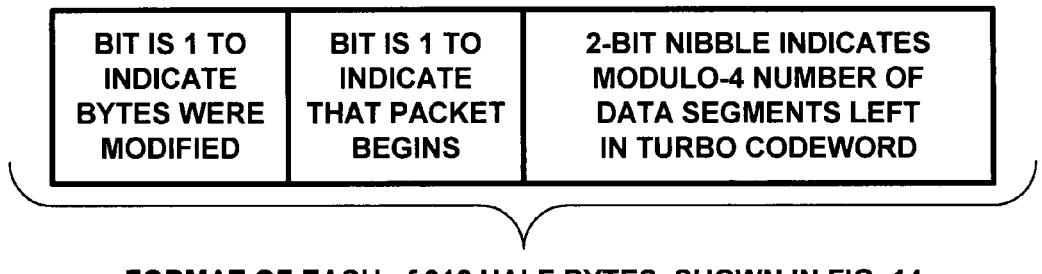
FIG. 15 is a depiction of the format of half bytes that future-field-description signals per FIG. 14 use for describing each of the 312 data segments in each future field of data.

FIG. 15 shows a representative format for the 312 half bytes in the FIG. 14 data segment that describe characteristics of respective data segments in a future data field. The initial bit of the half byte is a ONE if the described data segment was modified to avoid legacy DTV receivers mistaking it for a complete (207, 187) R-S FEC codeword. The initial bit of the half byte is otherwise a ZERO. The second bit of the half byte is a ZERO if the described data segment contains only a later portion of a (207, 187) R-S FEC codeword re-sampled to less than ⅔ code rate, which re-sampled codeword began in an earlier data segment. The second bit of the half byte is a ONE if the described data segment contains a complete (207, 187) R-S FEC codeword transmitted at ⅔ code rate or a beginning portion of a (207, 187) R-S FEC codeword re-sampled to less than ⅔ code rate. The third and fourth bits of the half byte are a modulo-4 number indicating the number of data segments after the current one in the turbo-coded (207, 187) R-S FEC codeword.

Figure 16:
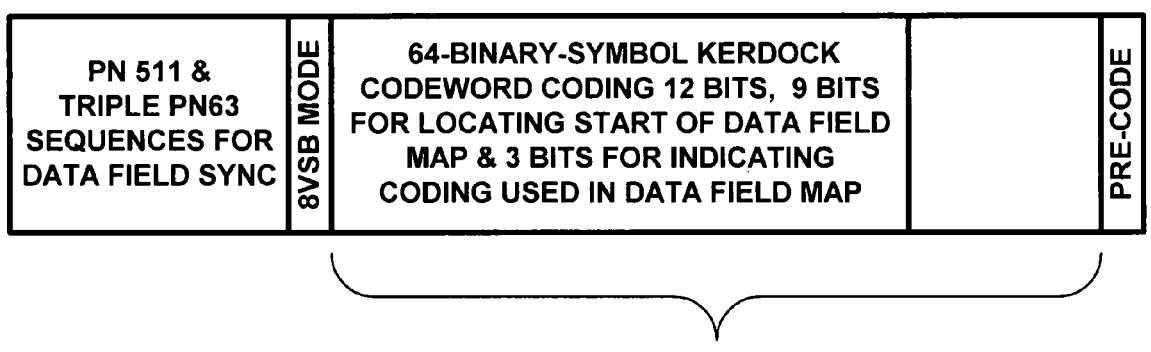
FIG. 16 is a depiction of the format of the initial one of 313 segments of a field of data, which initial data segment in accordance with an aspect of the invention includes coding that points to a later data segment in that field of data and indicates how that later data segment is coded.

FIG. 16 shows the format of the initial one of 313 segments of a field of data. That initial data segment begins with the conventional data field synchronizing (DFS) signal comprising one cycle of a PN511 sequence and three cycles of PN63 sequence. A 24-symbol VSB-mode code immediately follows this DFS signal. In accordance with an aspect of the invention the VSB-mode code is then immediately followed by coding that points to a later data segment in that field of data and indicates how that later data segment is coded. This later data segment is the first of one of a group of data segments spaced 52 data segment intervals apart, which group of data segments contains a map of the characteristics of the 312 data segments of a future data field. The initial data segment shown in FIG. 16 concludes with a 12-symbol precode. The 700-symbol DFS signal, the 24-symbol VSB-mode code and the 12-symbol precode conform to their specification in A/53.

FIG. 16 shows, by way of example, a 64-symbol Kerdock code used for the coding that points to a later data segment in that field of data and indicates how that later data segment is coded. The sixty-four binary symbols in the Kerdock code have respective normalized modulation levels of +5 or −5, and code twelve bits. The polarity of the Kerdock code is inverted in the alternate data fields in which the polarity of the middle PN63 sequence of the preceding DFS signal is inverted. Nine of the coded bits specify the number of the later data segment in the data field in which begins a map of the characteristics of the 312 data segments of a future data field. The other three of the coded bits specify the type of redundant coding, if any, applied to that map. If the nine coded bits that specify the number of a later data segment in the data field are not in the range two to 313, inclusive, the number specified by these bits may be considered to refer to a respective pre-established pattern of robust transmissions within the next data field after the current one. E.g., the number zero may be considered to specify that no robust transmissions begin in the next data field, and the number one may be considered to specify that the pattern of robust transmissions in the next data field continues that in the current data field. The numbers above 313 could then identify specific robust transmission patterns in which varying percentages of the data field are occupied by robust data.

The information in the initial segment of a data field concerning the location and the coding of the map of data segments facilitates DTV receivers of new design being able to begin the decoding of maps of data segment characteristics. Preferably, after the decoding of these maps is begun, some of the auxiliary information in each map backs up the information contained in the initial segment of a subsequent data field. This reduces the possibility of burst noise causing this information to be lost or contaminated. Preferably, the auxiliary information in each map also specifies the location of the start of the future field the 312 data segments of which are characterized in the map. This frees the map from having to be located entirely within one data field. Variants of the maps are possible which map slightly more than one data field, so as to use up code space not required for auxiliary information.

Figure 17A:
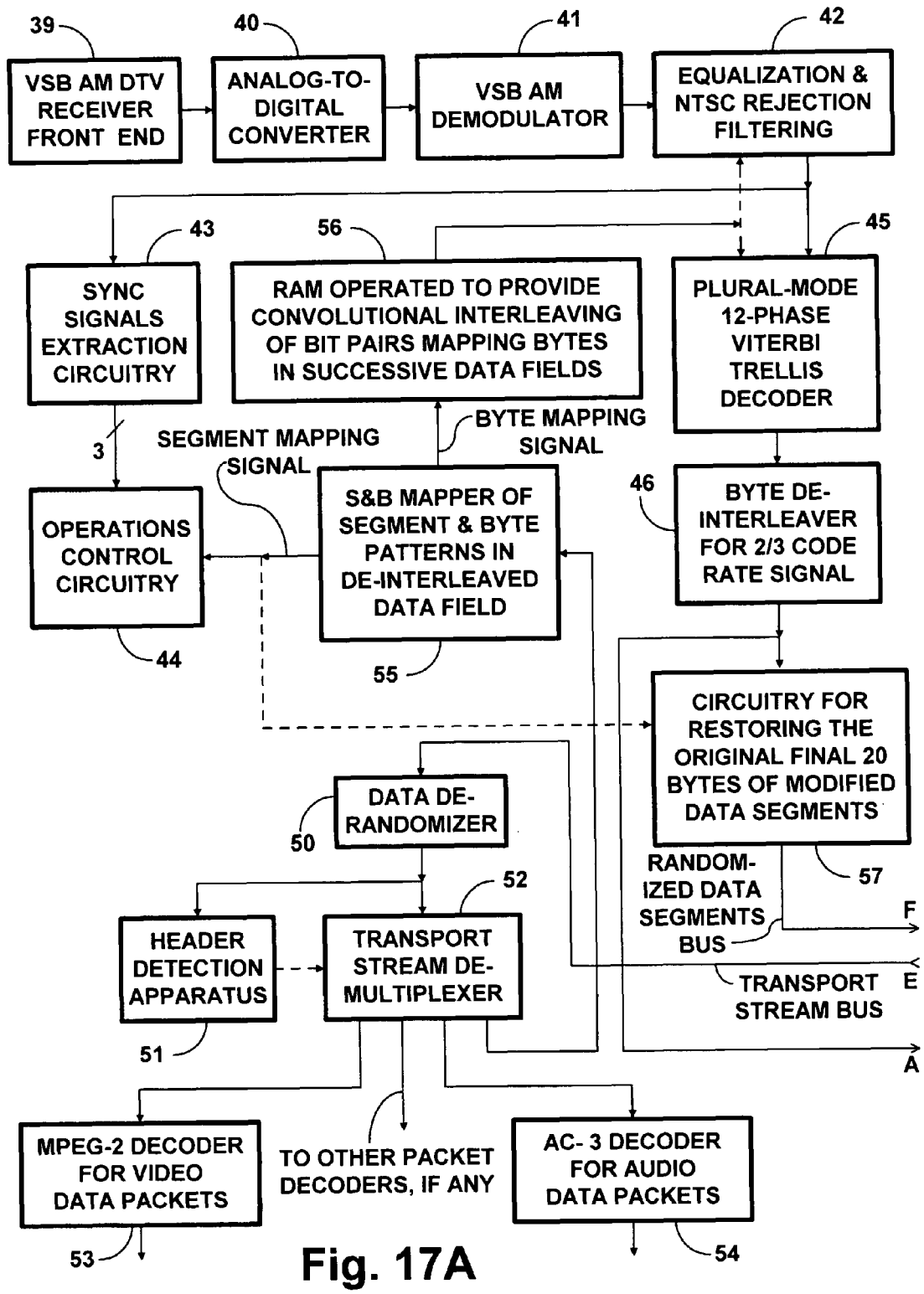
FIGS. 17A, 17B, 17C, 17D and 17E combine to form a schematic diagram of FIG. 17 DTV receiver apparatus embodying an aspect of the invention, which DTV receiver apparatus can receive DTV signals as transmitted by species of the generic DTV transmitter apparatus of FIG. 1, which species are of the sorts shown in FIGS. 3, 4 and 5.

FIGS. 17A, 17B, 17C, 17D and 17E show respective portions, respectively, of FIG. 17 DTV receiver apparatus for receiving DTV signals from any DTV transmitter of the generic type shown in FIG. 1 that does not employ turbo coding. This FIG. 17 DTV receiver apparatus utilizes the information concerning the patterns of robust transmission that is received from DTV transmitter apparatus modified per FIG. 9. The FIG. 17A receiver apparatus includes a vestigial-sideband amplitude-modulation (VSB AM) DTV receiver front-end 39 for selecting a radio-frequency DTV signal for reception, converting the selected RF DTV signal to an intermediate-frequency DTV signal, and for amplifying the IF DTV signal. An analog-to-digital converter 40 is connected for digitizing the amplified IF DTV signal supplied from the DTV receiver front-end 39. A demodulator 41 is connected for demodulating the digitized VSB AM IF DTV signal to generate a digitized baseband DTV signal, which is supplied to digital filtering 42 for equalization of channel response and for rejection of co-channel interfering NTSC signal. Synchronization-signals-extraction circuitry 43 is connected for receiving the digital filtering 42 response. Responsive to data-field-synchronization (DFS) signals, the sync-signals-extraction circuitry 43 detects the beginnings of data frames and fields. Responsive to data-segment-synchronization (DSS) signals, the sync-signals-extraction circuitry 43 detects the beginnings of data segments. FIG. 17A shows operations control circuitry 44 for controlling operations within the FIG. 17 DTV receiver apparatus being connected for receiving DFS signal, DSS signal and clocking signal at an even multiple of symbol rate via respective connections from the sync-signals-extraction circuitry 43. These signals are provided with respective delays by means not explicitly shown, which delays compensate for latent delays accumulated in the FIG. 17 circuitry.

A plural-mode 12-phase trellis decoder 45 of Viterbi type is connected for receiving the digital filtering 42 response and performing symbol-decoding procedures to recover bytes of data. These symbol-coding procedures are carried out in the manner prescribed by 2-bit nibble that the trellis decoder 45 receives as a mode selection signal. Reception of the nibble 00 as its mode selection signal indicates to the plural-mode 12-phase trellis decoder 45 that it is currently receiving symbols describing a byte of ordinary 8VSB signal. Accordingly, the ranges of decision that the trellis decoder 45 uses in decoding the trellis coding are the conventional ones for receiving A/53 DTV broadcasts, and the decision tree in the trellis decoder 45 is not pruned. Reception of the nibble 01 as its mode selection signal indicates to the trellis decoder 45 that it is currently receiving symbols describing a byte of block-coded 8VSB signal. The ranges of decision that trellis decoder 45 uses in decoding the trellis coding are the conventional ones for receiving A/53 DTV broadcasts, and the decision tree in the trellis decoder 45 is not pruned. Reception of the nibble 10 as its mode selection signal indicates to the trellis decoder 45 that it is currently receiving symbols describing a byte of P2VSB signal. The decision tree is pruned in the trellis decoder 45 so as to preclude −3, −1, +1 and +3 symbol decisions, and the ranges of decision in the trellis decoder 45 are adjusted to suit. Reception of the nibble 11 as its mode selection signal indicates to the trellis decoder 45 that it is currently receiving symbols describing a byte of PCPM signal. The decision tree is pruned in the trellis decoder 45 decision so as to preclude −7, −5, +1 and +3 symbol decisions when the $X_1$ bit should be ONE, and the ranges of decision in the trellis decoder 45 are adjusted accordingly. The decision tree is pruned in the trellis decoder 45 so as to preclude −3, −1, +5 and +7 symbol decisions when the $X_1$ bit should be ZERO, and the ranges of decision in the trellis decoder 45 are adjusted accordingly.

The trellis decoder 45 is connected to supply eight-bit bytes of data to a byte de-interleaver 46 that complements the convolutional byte interleaving in the memory 5 of the FIG. 1 DTV transmitter apparatus. The byte de-interleaver 46 is connected for supplying de-interleaved segments of data via an interconnection A to clocked delay circuitry 47 shown in FIG. 17B. The clocked delay circuitry 47 reproduces the de-interleaved data segments after a delay of 157 data-segment intervals. This compensates for delay in decoding signals transmitted at one-quarter the code rate of ordinary 8VSB, so data packets transmitted at different code rates can be de-randomized by the same circuitry. The clocked delay circuitry 47 is connected for supplying the de-interleaved segments of data, as delayed 157 data-segment intervals, to a decoder 48 for (207, 187) Reed-Solomon forward-error-correction codewords. Tri-state circuitry 49 is connected for asserting on a TRANSPORT STREAM BUS any 187-byte MPEG-2-compliant data packet free from uncorrected byte errors, which packet is supplied by the decoder 48. The TRANSPORT STREAM BUS begins in FIG. 17E, continues into FIG. 17D through an interconnection B, continues into FIG. 17C through an interconnection C, thence into FIG. 17B through an interconnection D, and finally into FIG. 17A through an interconnection E.

The R-S-FEC-code decoder 48 is connected for supplying supposedly MPEG-2-compliant data packets to the tri-state circuitry 49 as input signal thereto. The R-S-FEC-code decoder 48 is connected for supplying the tri-state circuitry 49 with a control signal conditioning the tri-state circuitry 49 to reproduce its input signal as an output signal therefrom when the decoder 48 finds no uncorrected byte errors in that signal. The tri-state circuitry 49 supplies that output signal from source impedance so low that that output signal can be asserted on the TRANSPORT STREAM BUS. Note that this condition will obtain only when the packet is from ordinary 8VSB signal without block coding to reduce its code rate. Otherwise, the data segment will have been modified at or before the DTV transmitter so that the decoders for (207, 187) R-S FEC code in legacy DTV receivers will not mistake the data segment for a correct or correctable (207, 187) R-S FEC codeword. This modification will cause the R-S-FEC-code decoder 48 to find the data segment to contain uncorrectable byte error and to supply the tri-state circuitry 49 with control signal conditioning it to exhibit high source impedance to the TRANSPORT STREAM BUS.

FIG. 17A shows a de-randomizer 50 connected for providing de-randomized response to 187-byte MPEG-2-compliant data packets asserted on the TRANSPORT STREAM BUS. The de-randomizer 50 is connected for supplying this de-randomized response to header detection apparatus 51 and to a transport stream de-multiplexer 52 controlled by response from the header detection apparatus 51. The transport stream de-multiplexer 52 responds to the header detection apparatus 51 detecting selected PIDs in certain types of the de-randomized data packets from the data de-randomizer 50 for sorting those types of de-randomized data packets to appropriate packet decoders. For example, video data packets are sorted to an MPEG-2 decoder 53, and audio data packets are sorted to an AC-3 decoder 54. The data de-randomizer 50 will convert to a ONE the toggled TEI bit in a data packet indicating that it still contains byte errors. The MPEG-2 decoder 53 responds to the TEI bit in a packet of de-randomized data being ONE by not using the packet and by instituting measures to mask the effects of the packet not being used. AC-3 decoders known in the art respond to the TEI bit in packet of de-randomized data being ONE by not using the packet and by instituting measures to mask the effects of the packet not being used.

The FIG. 17 DTV receiver as thusfar described operates very much like a legacy DTV receiver. It differs from a legacy DTV receiver in that it incorporates the 157-data-segment clocked digital delay circuitry 47, which is used to avoid more than one data packet being asserted on the TRANSPORT STREAM BUS during any data segment interval. The FIG. 17 DTV receiver differs from a legacy DTV receiver in that the Viterbi trellis decoder 45 operates in one of a plurality of modes, depending on the nature of the DTV signal currently being received. More particularly, the FIG. 17 DTV receiver is constructed based on a presumption that the DTV transmitter transmits descriptions of a future data field at either one-half or one-quarter the code rate of ordinary 8VSB signal. The data packets containing descriptions of a future data field are asserted on the TRANSPORT STREAM BUS and are subsequently de-randomized by the data de-randomizer 50 for application to the header detection apparatus 51 and to the transport stream de-multiplexer 52 as respective input signals for them. When the header detection apparatus 51 detects the header of a data packet containing descriptions of a future data field, it supplies the transport stream de-multiplexer 52 with control signal conditioning the de-multiplexer 52 to reproduce that data packet at a particular one of its output ports. This output port is connected for supplying the reproduced data packet to a segment-and-byte mapper 55 as input signal thereto.

The S&B mapper 55 operates to map the pattern of the segments in the de-interleaved data fields and to map the pattern of the bytes within each segment. The S&B mapper 55 includes two small random-access memories, each used as a cache memory for the temporary storage of 2-bit nibbles extracted from de-randomized data packets received from the data de-randomizer 50 via the de-multiplexer 52. The storage locations in each cache memory are addressed by the number of the segment in the data frame(s) to which the temporarily stored nibble corresponds. One of the cache memories temporarily stores the nibbles that describe the first characteristics of respective segments of future data fields. The other of the cache memories temporarily stores the nibbles that describe the second characteristics of respective segments of future data fields. At a suitable time the S&B mapper 55 extends each of the nibbles temporarily stored in the latter cache memory by repeating it 206 times. This is done to map the 207 bytes of a segment of non-interleaved data field as a row of 207 nibbles for writing to a random-access memory 56. These nibbles specify whether data segments contain ordinary 8VSB signal, block-coded 8VSB signal, P2VSB signal or PCPM signal. For example, these nibbles are read from their cache memory to load the stages of a parallel-in/serial-out register within the S&B mapper 55, which PISO register is operated as a shift register for writing to the RAM 56.

The RAM 56 is read so as to provide convolutional interleaving, generating a pattern of nibbles that map signal characteristics of each byte in the interleaved data field of the baseband DTV signal that the digital filtering 42 supplies to the trellis decoder 45. Because of trellis coding, there are twelve bits in each byte of the interleaved baseband DTV signal supplied to the trellis decoder 45. These twelve-bit bytes give rise to respective eight-bit bytes in the trellis decoder 45 response. When the nibbles read from the RAM 56 indicate the full alphabet of 8VSB symbols is currently being supplied to the plural-mode trellis decoder 45, the decision tree in the trellis decoding is left unpruned and decision ranges are similar to those used in legacy DTV receivers. When the nibbles read from the RAM 56 indicate restricted-alphabet symbols are currently being supplied to the plural-mode trellis decoder 45, the decision tree in the trellis decoding is selectively pruned and the decision ranges are adjusted accordingly. This pruning excludes decisions that currently received symbols have normalized modulation levels excluded from the restricted alphabet of 8VSB symbols currently in use. Supposing that the digital filtering 42 for equalization of channel response and for rejection of co-channel interfering NTSC signal uses decision-feedback equalization, the bit pairs read from the RAM 56 can be used to adjust a "smart" data slicer used to make the feedback decisions. This procedure will be explained in more detail further on in the specification, with reference to FIG. 19 of the drawing.

The byte de-interleaver 46 is connected for supplying de-interleaved segments of data to data-segment-restoration circuitry 57 for restoring the original final bytes of those segments of robust data that were modified so as not to be mistaken by legacy DTV receivers for correct or correctable (207, 187) R-S FEC codewords. The S&B mapper 55 is connected for supplying the pattern of the segments in the de-interleaved data fields to the data-segment-restoration circuitry 57 for controlling the restoration processes. The circuitry 57 is connected for supplying de-interleaved segments of data to a RANDOMIZED DATA SEGMENT BUS which continues into FIG. 17B through an interconnection F, thence into FIG. 17C through an interconnection G, into FIG. 17D through an interconnection H and finally into FIG. 17E through an interconnection I.

Figure 17B:
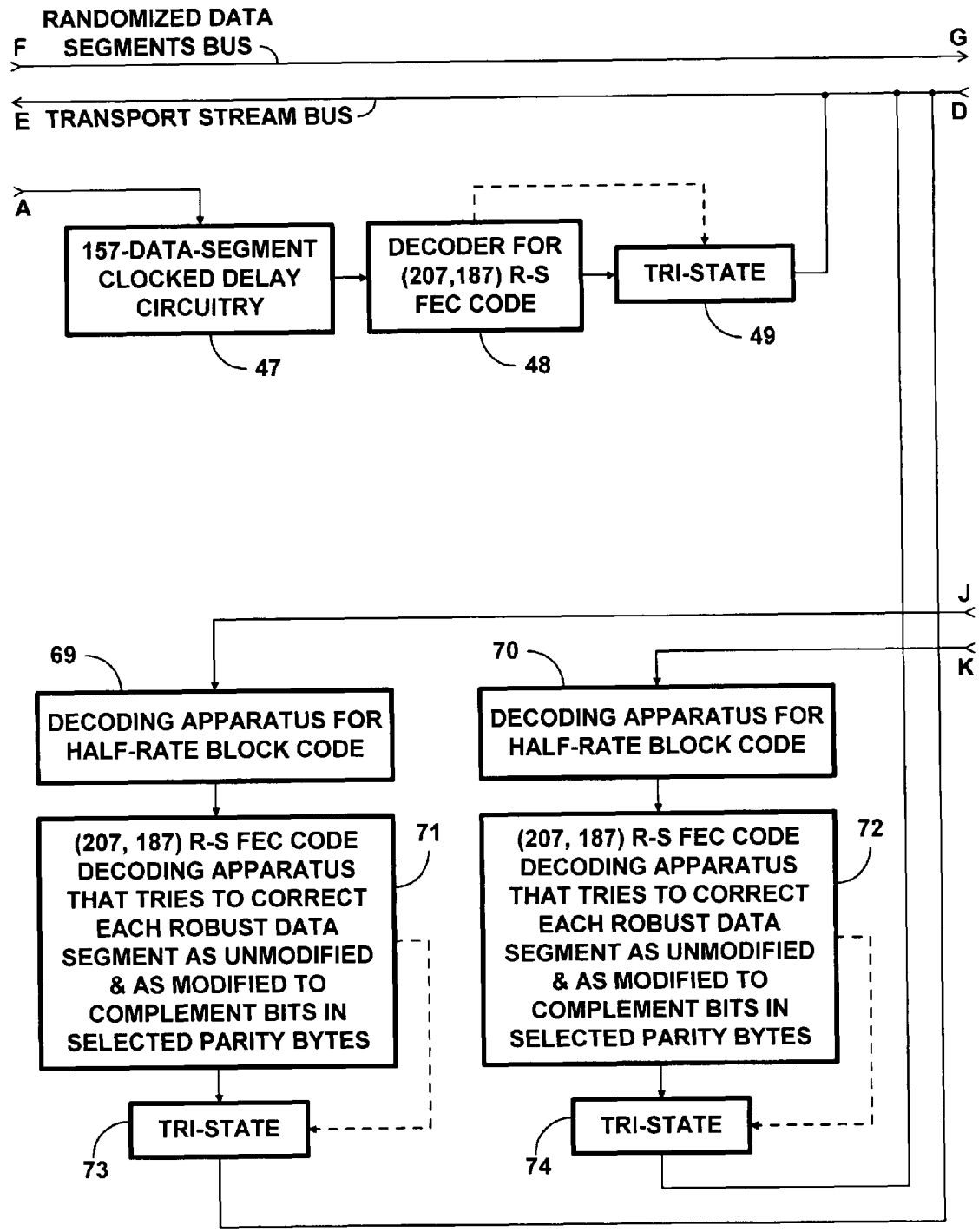
Figure 17C:
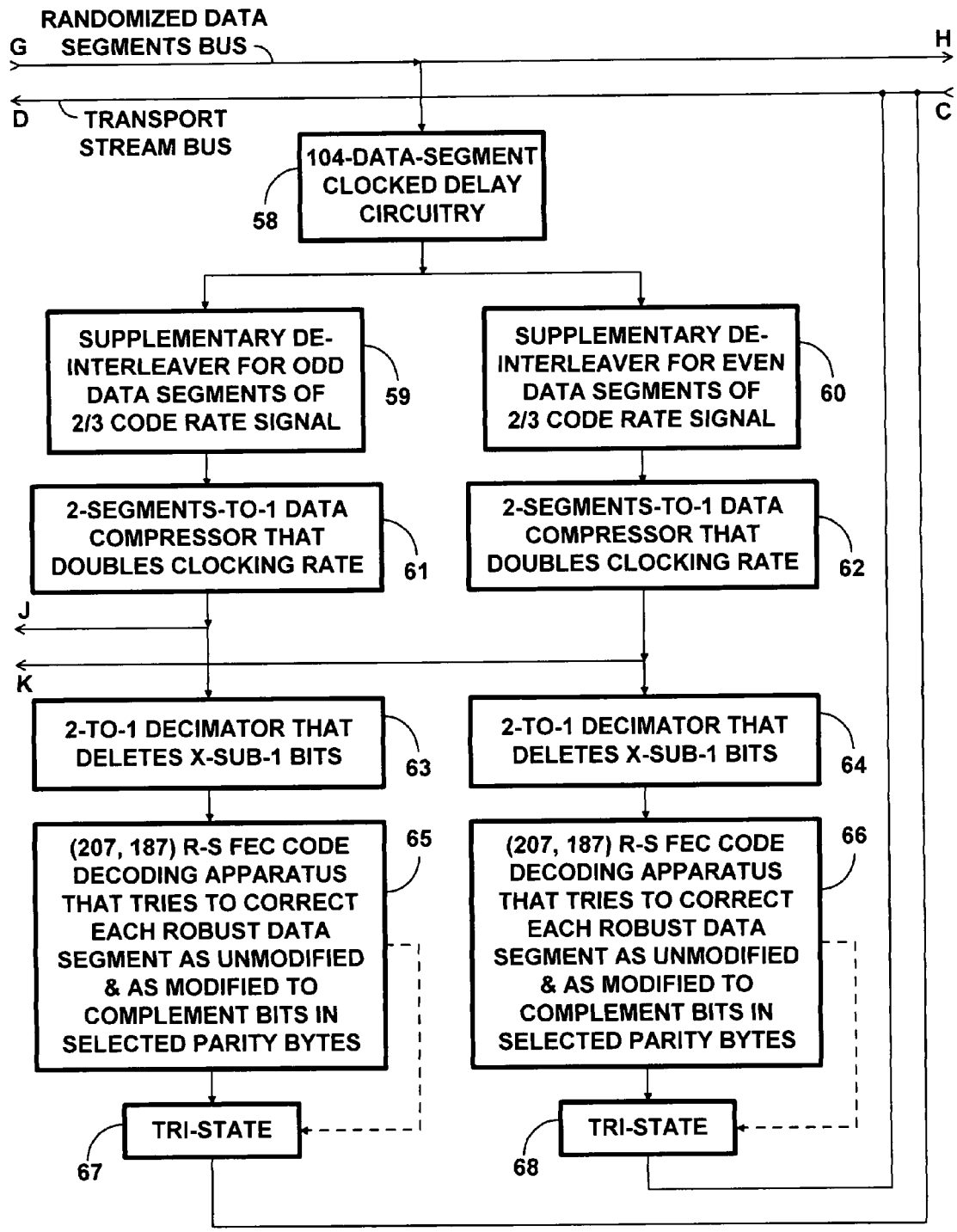
Figure 17D:
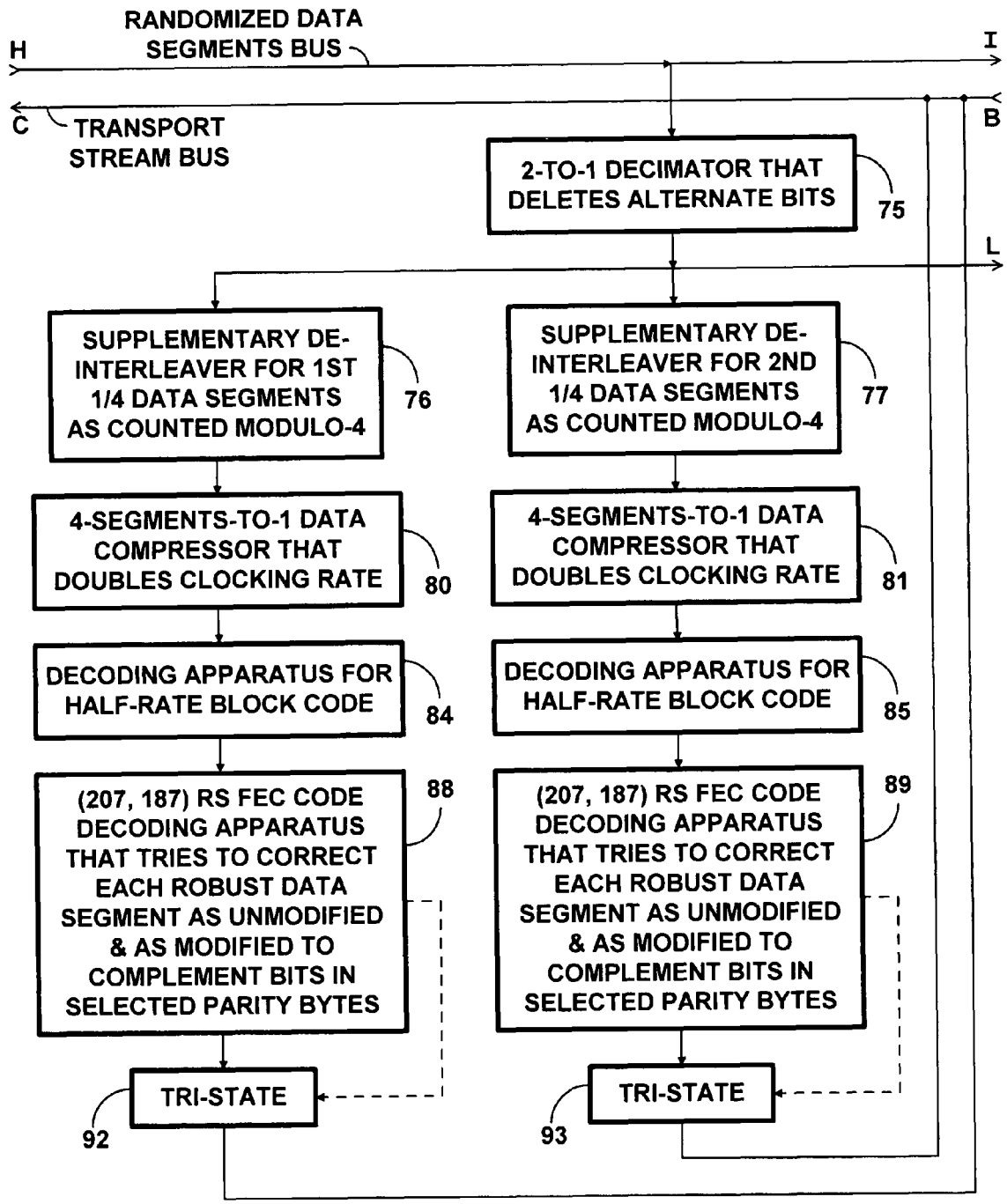
Figure 17E:
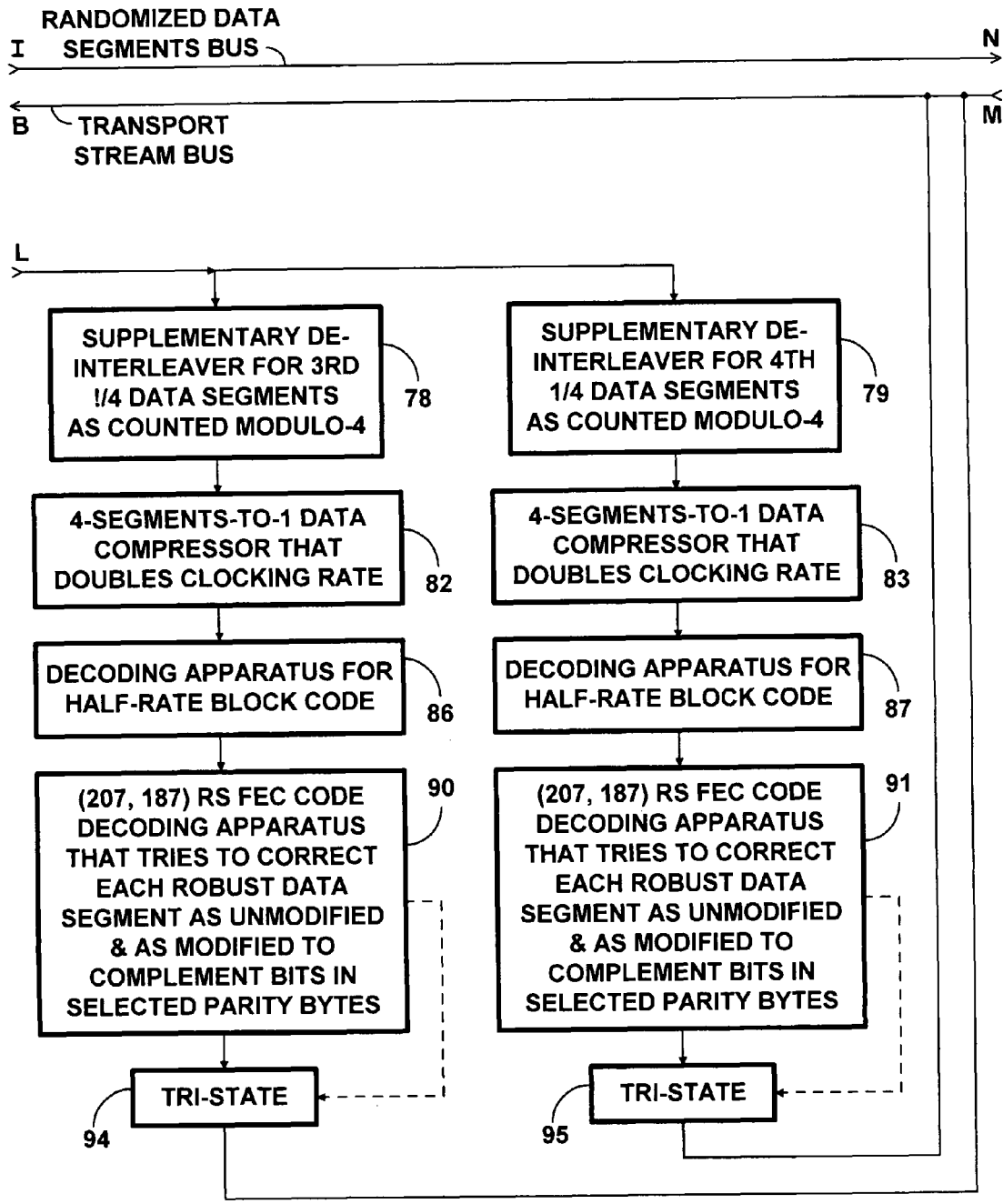

FIG. 17C shows circuitry used for decoding P2VSB or PCPM signals transmitted at one-half the code rate of ordinary 8VSB signal. FIG. 17C shows the input port of clocked delay circuitry 58 connected to the RANDOMIZED DATA SEGMENT BUS for receiving de-interleaved and restored data segments from the data-segment-restoration circuitry 57. The clocked delay circuitry 58 is connected for reproducing the resulting segments of data after a delay of 104 data-segment intervals, for application to the respective input ports of supplementary de-interleavers 59 and 60. The clocked delay circuitry 58 compensates for delay in decoding signals transmitted at one-quarter the code rate of ordinary 8VSB, so data packets transmitted at different code rates can be de-randomized by the same data de-randomizer 50 of FIG. 17A.

The odd-occurring segments of de-interleaved data fields that the clocked delay circuitry 58 supplies to the supplementary de-interleaver 59 as input signal are immediately reproduced in its output signal. The supplementary de-interleaver 59 comprises first-in/first-out memory for delaying each of those odd-occurring data segments for fifty-one data segment intervals before it is reproduced a second and last time in the output signal from the de-interleaver 59. The output signal from the supplementary de-interleaver 59 is composed of successive non-overlapping pairs of odd-occurring segments of de-interleaved data fields and is applied to a 2-segments-to-1 data compressor 61 as its input signal. The data compressor 61 re-samples each successive pair of odd-occurring segments of de-interleaved data fields so as to double its clock rate and to fit it within a window that is a single data segment interval in length. The data compressor 61 typically comprises a serial-in/parallel-out (SIPO) shift register capable of storing 414 bytes and a parallel-in/serial-out (PISO) shift register also capable of storing 414 bytes. The SIPO shift register receives input signal serially from the supplementary de-interleaver 59, a data segment at a time, and then transfers its contents in parallel to the PISO shift register to be read out serially at doubled clock rate. The connections for the parallel transfer are made in such fashion that the R-S-FEC-code parity bytes are restored to the conclusion of the possible (207, 187) R-S REC codeword.

The even-occurring segments of de-interleaved data fields that the clocked delay circuitry 58 supplies to the supplementary de-interleaver 60 as input signal are immediately reproduced in its output signal. The supplementary de-interleaver 60 comprises first-in/first-out memory for delaying each of those even-occurring data segments for fifty-one data segment intervals before it is reproduced a second and last time in the output signal from the de-interleaver 60. The output signal from the supplementary de-interleaver 60 is composed of successive non-overlapping pairs of even-occurring segments of de-interleaved data fields and is applied to a 2-segments-to-1 data compressor 62 as its input signal. The data compressor 62 re-samples each successive pair of even-occurring segments of de-interleaved data fields so as to double its clock rate and to fit it within a window that is a single data segment interval in length. The data compressor 62 has a structure similar to that of the data compressor 61 and restores the R-S-FEC-code parity bytes to the conclusion of each possible (207, 187) R-S REC codeword.

The 2-segments-to-1 data compressors 61 and 62 are connected for supplying their output signals to a 2-to-1 decimator 63 and to a 2-to-1 decimator 64, respectively. The 2-to-1 decimators 63 and 64 will decode P2VSB and PCPM modulated signals that are transmitted without linear block coding and at one-half the code rate of ordinary 8VSB signals. Decoding apparatuses 65 and 66 for type one (207, 187) R-S FEC codewords are respectively connected for receiving possibly correct or correctable (207, 187) R-S FEC codewords from the 2-to-1 decimator 63 and from the 2-to-1 decimator 64. The R-S-FEC-code decoding apparatus 65 is connected for supplying supposedly MPEG-2-compliant data packets to tri-state circuitry 67 as input signal thereto. The R-S-FEC-code decoding apparatus 66 is connected for supplying supposedly MPEG-2-compliant data packets to tri-state circuitry 68 as input signal thereto. The tri-state circuitry 67 and the tri-state circuitry 68 are each connected for applying its output signal to the TRANSPORT STREAM BUS.

The R-S-FEC-code decoding apparatus 65 is connected for supplying the tri-state circuitry 67 with a control signal conditioning the tri-state circuitry 67 to reproduce its input signal as an output signal therefrom when the decoding apparatus 65 finds no uncorrected byte errors in that signal. The tri-state circuitry 67 supplies that output signal from source impedance so low that that output signal can be asserted on the TRANSPORT STREAM BUS. When the decoding apparatus 65 finds the purported (207, 187) R-S FEC codeword to contain uncorrectable byte error, the decoding apparatus supplies the tri-state circuitry 67 with control signal conditioning it to exhibit high source impedance to the TRANSPORT STREAM BUS. So, the tri-state circuitry 67 is rendered unable to assert its output signal on that bus.

The R-S-FEC-code decoding apparatus 66 is connected for supplying the tri-state circuitry 68 with a control signal conditioning the tri-state circuitry 68 to reproduce its input signal as an output signal therefrom when the decoding apparatus 66 finds no uncorrected byte errors in that signal. The tri-state circuitry 68 supplies that output signal from source impedance so low that that output signal can be asserted on the TRANSPORT STREAM BUS. When the decoding apparatus 66 finds the purported (207, 187) R-S FEC codeword to contain uncorrectable byte error, the decoding apparatus supplies the tri-state circuitry 68 with control signal conditioning it to exhibit high source impedance to the TRANSPORT STREAM BUS. So, the tri-state circuitry 68 is rendered unable to assert its output signal on that bus.

In addition to showing the circuitry for decoding trellis-coded ordinary 8VSB signal, FIG. 17B shows circuitry for decoding trellis-coded 8VSB signal that uses a block code to reduce its effective code rate to one-half that of ordinary 8VSB. The 2-segments-to-1 data compressors 61 and 62 in FIG. 17C are connected for supplying their output signals via respective interconnections J and K to a block-code decoding apparatus 69 and to a block-code decoding apparatus 70, respectively, in FIG. 17B. The block-code decoding apparatuses 69 and 70 are similar in construction and are of a type for decoding a particular block code that halves code rate. Each of the decoding apparatuses 69 and 70 attempts to decode the signal supplied to thereto during each successive data segment interval for generating a possibly correct or correctable (207, 187) R-S FEC codeword. Decoding apparatuses 71 and 72 for (207, 187) R-S FEC codewords are respectively connected for receiving possibly correct or correctable (207, 187) R-S FEC codewords from the block-code decoding apparatus 69 and from the block-code decoding apparatus 70. The R-S-FEC-code decoding apparatus 71 is connected for supplying supposedly MPEG-2-compliant data packets to tri-state circuitry 73 as input signal thereto. The decoding apparatus 72 is connected for supplying supposedly MPEG-2-compliant data packets to tri-state circuitry 74 as input signal thereto. The tri-state circuitry 73 and the tri-state circuitry 74 are each connected for applying its output signal to the TRANSPORT STREAM BUS.

The R-S-FEC-code decoding apparatus 71 is connected for supplying the tri-state circuitry 73 with a control signal conditioning the tri-state circuitry 73 to reproduce its input signal as an output signal therefrom when the decoding apparatus 71 finds no uncorrected byte errors in that signal. The tri-state circuitry 73 supplies that output signal from source impedance so low that that output signal can be asserted on the TRANSPORT STREAM BUS. When the decoding apparatus 71 finds the purported (207, 187) R-S FEC codeword to contain uncorrectable byte error, the decoding apparatus supplies the tri-state circuitry 73 with control signal conditioning it to exhibit high source impedance to the TRANSPORT STREAM BUS. So, the tri-state circuitry 73 is rendered unable to assert its output signal on that bus.

The R-S-FEC-code decoding apparatus 72 is connected for supplying the tri-state circuitry 74 with a control signal conditioning the tri-state circuitry 74 to reproduce its input signal as an output signal therefrom when the decoding apparatus 72 finds no uncorrected byte errors in that signal. The tri-state circuitry 74 supplies that output signal from source impedance so low that that output signal can be asserted on the TRANSPORT STREAM BUS. When the decoding apparatus 72 finds the purported (207, 187) R-S FEC codeword to contain uncorrectable byte error, the decoding apparatus supplies the tri-state circuitry 74 with control signal conditioning it to exhibit high source impedance to the TRANSPORT STREAM BUS. So, the tri-state circuitry 74 is rendered unable to assert its output signal on that bus.

FIGS. 18D and 18E show circuitry used for decoding linear-block-coded P2VSB or PCPM signals that are transmitted at one-quarter or so of the code rate of ordinary 8VSB signal. The input port of a 2-to-1 decimator 75 is connected to the RANDOMIZED DATA SEGMENT BUS for receiving de-interleaved and restored data segments from the data-segment-restoration circuitry 57. The 2-to-1 decimator 75 reproduces in its output signal only the $X_2$ bits of the de-interleaved and restored data segments it receives, deleting the alternate $X_1$ bits. In effect, this decodes the PCPM or P2VSB modulation. The data-segment intervals in a de-interleaved data field are counted by a segment counter in the operations control circuitry 44. The modulo-4 portion of that count is relied on by supplementary de-interleavers 76, 77, 78 and 79 for selecting their respective input signals from the output signal of the 2-to-1 decimator 75. Respective chunks of de-interleaved data appear in the output signal of the 2-to-1 decimator 75 in each of these data-segment intervals.

Each of the chunks of de-interleaved data that the 2-to-1 decimator 75 supplies during first data-segment intervals, as counted modulo-4, is selected by the supplementary de-interleaver 76 as its input signal and is immediately reproduced in its output signal. The supplementary de-interleaver 76 comprises a cascade connection of first, second and third successive first-in/first-out memories. The first FIFO memory delays each of the chunks of de-interleaved data for fifty-one data segment intervals before it is reproduced a second time in the output signal from the de-interleaver 76. The first and second FIFO memories together delay each of the chunks of de-interleaved data for 102 data segment intervals before it is reproduced a third time in the output signal from the de-interleaver 76. The first, second and third FIFO memories together delay each of the chunks of de-interleaved data for 153 data segment intervals before it is reproduced a fourth and last time in the output signal from the de-interleaver 76. The output signal from the supplementary de-interleaver 76 is composed of successive non-overlapping sets of four chunks of de-interleaved data, each of which sets occupies four successive data-segment intervals. The supplementary de-interleaver 76 is connected for supplying its output signal to a 4-segments-to-1 data compressor 80 as input signal thereto. The data compressor 80 re-samples each one of successive overlapping sets of four chunks of de-interleaved data re-samples so as to double its clock rate and to fit it within a window that is a single data segment interval in length. The data compressor 80 typically comprises a SIPO shift register capable of storing 414 bytes and a PISO shift register also capable of storing 414 bytes. The SIPO shift register receives input signal serially from the supplementary de-interleaver 76, a segment of decimated data at a time, and then transfers its contents in parallel to the PISO shift register to be read out serially at doubled clock rate. The connections for the parallel transfer are made in such fashion that the R-S-FEC-code parity bytes are restored to the conclusion of the possible (207, 187) R-S REC codeword.

Each of the chunks of de-interleaved data that the 2-to-1 decimator 75 supplies during second data-segment intervals, as counted modulo-4, is selected by the supplementary de-interleaver 77 as its input signal and is immediately reproduced in its output signal. The supplementary de-interleaver 77 comprises a cascade connection of first, second and third successive first-in/first-out memories operated for also reproducing that chunk 51, 102 and 153 successive data-segment intervals later. The supplementary de-interleaver 77 output signal comprises successive non-overlapping sets of four chunks of de-interleaved data, each of which sets occupies four successive data-segment intervals. The supplementary de-interleaver 77 is connected for supplying its output signal to a 4-segments-to-1 data compressor 81 as input signal thereto. The data compressor 81 re-samples each one of successive overlapping sets of four chunks of de-interleaved data re-samples so as to double its clock rate and to fit it within a window that is a single data segment interval in length. The data compressor 81 has a structure similar to that of the data compressor 80 and restores the R-S-FEC-code parity bytes to the conclusion of each possible (207, 187) R-S REC codeword.

Each of the chunks of de-interleaved data that the 2-to-1 decimator 75 supplies during third data-segment intervals, as counted modulo-4, is selected by the supplementary de-interleaver 78 as its input signal and is immediately reproduced in its output signal. The supplementary de-interleaver 78 comprises a cascade connection of first, second and third successive first-in/first-out memories operated for also reproducing that chunk 51, 102 and 153 successive data-segment intervals later. The supplementary de-interleaver 78 output signal comprises successive non-overlapping sets of four chunks of de-interleaved data, each of which sets occupies four successive data-segment intervals. The supplementary de-interleaver 78 is connected for supplying its output signal to a 4-segments-to-1 data compressor 82 as input signal thereto. The data compressor 82 re-samples each one of successive overlapping sets of four chunks of de-interleaved data re-samples so as to double its clock rate and to fit it within a window that is a single data segment interval in length. The data compressor 82 has a structure similar to that of the data compressor 80 and restores the R-S-FEC-code parity bytes to the conclusion of each possible (207, 187) R-S REC codeword.

Each of the chunks of de-interleaved data that the 2-to-1 decimator 75 supplies during fourth (or zeroeth) data-segment intervals, as counted modulo-4, is selected by the supplementary de-interleaver 79 as its input signal and is immediately reproduced in its output signal. The supplementary de-interleaver 79 comprises a cascade connection of first, second and third successive first-in/first-out memories operated for also reproducing that chunk 51, 102 and 153 successive data-segment intervals later. The supplementary de-interleaver 79 output signal comprises successive non-overlapping sets of four chunks of de-interleaved data, each of which sets occupies four successive data-segment intervals. The supplementary de-interleaver 79 is connected for supplying its output signal to a 4-segments-to-1 data compressor 83 as input signal thereto. The data compressor 83 re-samples each one of successive overlapping sets of four chunks of de-interleaved data re-samples so as to double its clock rate and to fit it within a window that is a single data segment interval in length. The data compressor 83 has a structure similar to that of the data compressor 80 and restores the R-S-FEC-code parity bytes to the conclusion of each possible (207, 187) R-S REC codeword.

The data compressors 80, 81, 82 and 83 are connected for supplying their respective output signals for application to block-code decoding apparatuses 84, 85, 86 and 87, respectively, as their respective input signals. Each of the block-code decoding apparatuses 84, 85, 86 and 87 attempts to decode the signal supplied to thereto during each successive window at the beginning of a four-data-segment-long interval, thereby generating a possibly correct or correctable (207, 187) R-S FEC codeword. Decoding apparatuses 88, 89, 90 and 91 for (207, 187) R-S FEC codewords are respectively connected for receiving possibly correct or correctable (207, 187) R-S FEC codewords from the block-code decoding apparatuses 84, 85, 86 and 87, respectively.

The R-S-FEC-code decoding apparatus 88 is connected for supplying supposedly MPEG-2-compliant data packets to tri-state circuitry 92 as input signal thereto. The R-S-FEC-code decoding apparatus 89 is connected for supplying supposedly MPEG-2-compliant data packets to tri-state circuitry 93 as input signal thereto. The R-S-FEC-code decoding apparatus 90 is connected for supplying supposedly MPEG-2-compliant data packets to tri-state circuitry 94 as input signal thereto. The R-S-FEC-code decoding apparatus 91 is connected for supplying supposedly MPEG-2-compliant data packets to tri-state circuitry 95 as input signal thereto. The tri-state circuitry 92, the tri-state circuitry 93, the tri-state circuitry 94 and the tri-state circuitry 95 are each connected for applying its output signal to the TRANSPORT STREAM BUS.

The R-S-FEC-code decoding apparatus 88 is connected for supplying the tri-state circuitry 92 with a control signal conditioning the tri-state circuitry 92 to assert on the TRANSPORT STREAM BUS any data packet in which the decoding apparatus 88 finds no uncorrected byte errors. The R-S-FEC-code decoding apparatus 89 is connected for supplying the tri-state circuitry 93 with a control signal conditioning the tri-state circuitry 93 to assert on the TRANSPORT STREAM BUS any data packet in which the decoding apparatus 89 finds no uncorrected byte errors. The R-S-FEC-code decoding apparatus 90 is connected for supplying the tri-state circuitry 94 with a control signal conditioning the tri-state circuitry 94 to assert on the TRANSPORT STREAM BUS any data packet in which the decoding apparatus 90 finds no uncorrected byte errors. The R-S-FEC-code decoding apparatus 91 is connected for supplying the tri-state circuitry 91 with a control signal conditioning the tri-state circuitry 95 to assert on the TRANSPORT STREAM BUS any data packet in which the decoding apparatus 91 finds no uncorrected byte errors.

Figure 18:
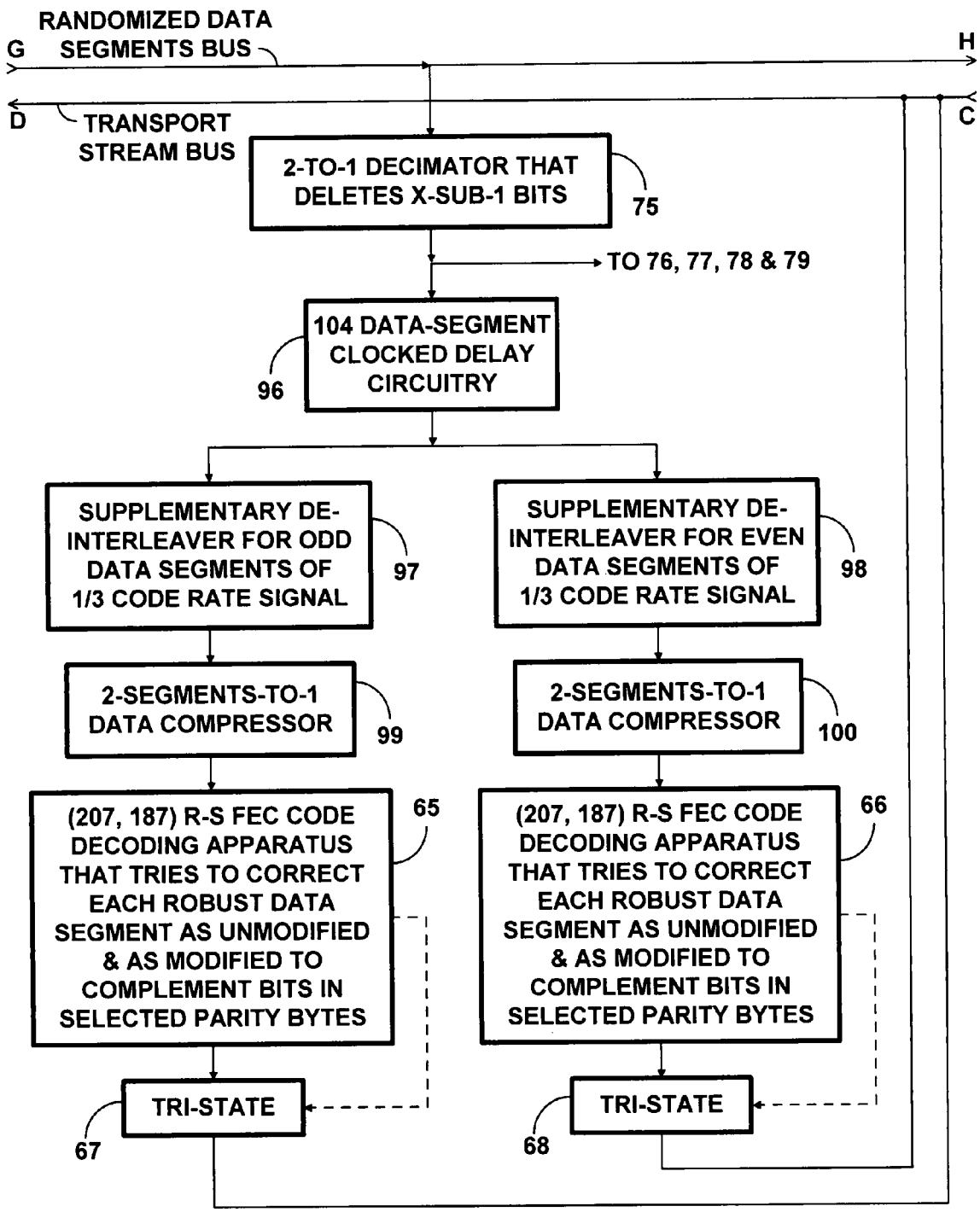
FIG. 18 is a schematic diagram of a modification of the FIG. 17 DTV receiver apparatus.

FIG. 18 shows a modification of the FIG. 17 DTV receiver apparatus providing an alternative way to decode signals transmitted at one-half the code rate of ordinary 8VSB using PCPM or P2VSB modulation. This alternative can provide a saving in memory if DTV broadcasting using half-rate block coding of 8VSB signals is not undertaken. The 2-to-1 decimator 75 that supplies segments of decimated data to the supplementary de-interleavers 76, 77, 78 and 79 also supplies segments of decimated data to a 104-segment clocked delay circuitry 96. Supplementary de-interleavers 97 and 98 are connected for receiving delayed segments of decimated data from the output port of the 104-segment clocked delay circuitry 96 as their respective input signals. The 2-to-1 decimation by the decimator 75 essentially halves the required storage capacity in the clocked delay circuitry 96 and in supplementary de-interleavers 97 and 98, as compared to the required storage capacity in the clocked delay circuitry 58 and in the supplementary de-interleavers 59 and 60. In effect, the 2-to-1 decimation by the decimator 74 decodes the P2VSB or PCPM modulation.

The output signal from the supplementary de-interleaver 97 is composed of successive non-overlapping pairs of odd-occurring segments of de-interleaved data fields and is applied to a 2-segments-to-1 data compressor 99 as its input signal. The data compressor 99 re-samples each successive overlapping pair of odd-occurring segments of de-interleaved data fields so as to double its clock rate and to fit it within a window that is a single data segment interval in length.

The output signal from the supplementary de-interleaver 98 is composed of successive non-overlapping pairs of even-occurring segments of de-interleaved data fields and is applied to a 2-segments-to-1 data compressor 100 as its input signal. The data compressor 100 re-samples each successive overlapping pair of even-occurring segments of de-interleaved data fields so as to double its clock rate and to fit it within a window that is a single data segment interval in length.

Decoding apparatuses 65 and 66 for (207, 187) R-S FEC codewords are respectively connected for receiving possibly correct or correctable (207, 187) R-S FEC codewords from the 2-segments-to-1 data compressor 99 and from the 2-segments-to-1 data compressor 100. The R-S-FEC-code decoding apparatus 65 is connected for supplying supposedly MPEG-2-compliant data packets to tri-state circuitry 67 as input signal thereto. The R-S-FEC-code decoding apparatus 66 is connected for supplying supposedly MPEG-2-compliant data packets to tri-state circuitry 68 as input signal thereto. The tri-state circuitry 67 and the tri-state circuitry 68 are each connected for applying its output signal to the TRANSPORT STREAM BUS.

The data-segment-restoration circuitry 57 operates such that the decoding apparatuses 65, 66, 71, 72, 88, 89, 90 and 91 are usually able to decode a possible (207, 187) R-S FEC codeword without having to attempt to modify selected groups of parity bytes. However, the proper operation of the data-segment-restoration circuitry 57 depends on the future-field-description signal being transmitted. It also depends on a transmitted future-field-description signal not being subsequently corrupted to cause erroneous indication of which data segments have been modified so that legacy DTV receivers will disregard them. The decoding apparatuses 65, 66, 71 and 72, which decode possible (207, 187) R-S FEC codewords transmitted at halved code rate, have to check three more possible codewords if the initial attempt to decode fails to provide a corrected data packet. The decoding apparatuses 88, 89, 90 and 91, which decode possible (207, 187) R-S FEC codewords transmitted at halved code rate, have to check fifteen more possible codewords if the initial attempt to decode fails to provide a corrected data packet.

There are tricks that can be used to reduce the number of possible codewords that ever need to be checked. In one such trick, the final twenty bytes in each data segment that the byte de-interleaver 46 supplies are modified so as to complement all the bits therein. This generates a hypothetical original data segment that had to be modified so that legacy DTV receivers would not mistake it for a (207, 187) R-S FEC codeword. Then, a (207, 187) R-S-FEC-decoder evaluates whether the hypothetical original data segment would indeed have had to be so modified so that legacy DTV receivers would not mistake it for a (207, 187) R-S FEC codeword. If not, the possibility such modification was made does not needed to be checked or is checked after other possibilities are eliminated. If the hypothetical original data segment would have had to be so modified so that legacy DTV receivers would not mistake it for a (207, 187) R-S FEC codeword, this possibility should be checked sooner by the decoding apparatuses 71 and 72 and by the decoding apparatuses 88, 89, 90 and 91.

In another such trick, the final twenty bytes in each data segment that the byte de-interleaver 46 supplies are modified so as to complement all the odd-occurring bits therein, but none of the even-occurring bits. This generates another hypothetical original data segment that had to be modified so that legacy DTV receivers would not mistake it for a (207, 187) R-S FEC codeword. Then, a (207, 187) R-S-FEC-decoder evaluates whether this other hypothetical original data segment would indeed have had to be so modified so that legacy DTV receivers would not mistake it for a (207, 187) R-S FEC codeword. If not, the possibility such modification was made does not needed to be checked or is checked after other possibilities are eliminated. If the hypothetical original data segment would have had to be so modified so that legacy DTV receivers would not mistake it for a (207, 187) R-S FEC codeword, this possibility should be checked sooner by the decoding apparatuses 65 and 66 and by the decoding apparatuses 88, 89, 90 and 91.

Complementing bits in the parity bytes of robustly transmitted (207, 187) R-S FEC codewords, rather than bits in the data bytes, is preferred for causing legacy DTV receivers to disregard portions of those codewords that might otherwise be mistaken for ordinary 8VSB signals. This is because dividing the known generator polynomial into the polynomial defined by the data generates a remainder that can sometimes give the DTV receiver a basis for determining which parity bytes were modified.

Using four decoding apparatuses 88, 89, 90 and 91 to decode possible (207,187) R-S FEC codewords on a four-phase basis, rather than on a single-phase basis, lengthens the time for processing each possible codeword from one data-segment interval to four data-segment intervals. If the increased time proves to still be insufficient in a practical design, the decoding of the (207, 187) R-S FEC codewords transmitted at one-quarter the rate of ordinary 8VSB signal can be done on an M-phase basis where M is more than four (and less than 52, of course). Using two decoding apparatuses 65 and 66 (or 71 and 72) to decode possible (207, 187) R-S FEC codewords on a two-phase basis, rather than on a single-phase basis, lengthens the time for processing each possible codeword from one data-segment interval to two data-segment intervals. Generally, the decoding of the (207, 187) R-S FEC codewords transmitted at one-half the rate of ordinary 8VSB signal can be done satisfactorily on no more than two-phase basis. However, if necessary, this decoding can also be done using more phases. The delay incurred in decoding the (207, 187) R-S FEC codewords transmitted at one-quarter the rate of ordinary 8VSB signal, when decoding on a plural-phase basis, has to be taken into account when performing data de-randomization. The data de-randomizer 50 uses the PRBS associated with the final one of the group of four data segments used to transmit a (207, 187) R-S FEC codeword at one-quarter the rate of ordinary 8VSB signal. This is delayed one data-segment interval owing to the action of the 4-segment-to-1 data compressor 80, 81, 82 or 82. The clocked delay circuit 47 shown in FIG. 17B introduces a delay of 157 data-segment intervals needed to delay data packets recovered from 8VSB signals using the complete symbol alphabet, so those data packets will reach the data de-randomizer 50 at the correct times. Two-phase decoding of a (207, 187) R-S FEC codeword transmitted at one-half the rate of ordinary 8VSB signal suffers 104 data-segment intervals less delay than four-phase decoding of a (207, 187) R-S FEC codeword transmitted at one-quarter the rate of ordinary 8VSB signal. The clocked delay circuits 58 and 96 shown in FIGS. 17C and 19 introduce the delay of 104 data-segment intervals that is needed so the data packets recovered from (207, 187) R-S FEC codewords transmitted at one-half the rate of ordinary 8VSB signal will reach the data de-randomizer 50 at the correct times.

If half-bytes of data are subjected to (8, 4) linear block coding, codewords in which bit errors are detected can be used to locate byte errors for the (207, 187) R-S-FEC-code decoding apparatus(es). This facilitates using known (207, 187) R-S-FEC-code decoding algorithms that can correct up to twenty erroneous bytes in a codeword, providing that the location of those bytes within the codeword is previously known.

If the future-field-description signal is received without corruption, the bits indicating which data segments contain the beginnings of data packets can be used to eliminate from consideration half of possible (207, 187) R-S FEC codewords transmitted at one half the code rate of ordinary 8VSB. The bits indicating which data segments contain the beginnings of data packets can be used to eliminate from consideration three-quarters of possible (207, 187) R-S FEC codewords transmitted at one quarter the code rate of ordinary 8VSB. This can save some of the power otherwise consumed in the decoding of possible (207, 187) R-S FEC codewords.

The decoding apparatuses 65 and 66 only have to be operated when receiving PCPM signals transmitted at one half the code rate of ordinary 8VSB. The decoding apparatuses 71 and 72 only have to be operated when receiving block coded 8VSB signals transmitted at one half the code rate of ordinary 8VSB. The two types of transmission can be distinguished from each other, whether or not future-field-description signal is received. So, a single decoding apparatus can be arranged with appropriate switching to perform the functions of the decoding apparatuses 65 and 71; and another single decoding apparatus can be arranged with appropriate switching to perform the functions of the decoding apparatuses 66 and 72.

The trellis decoder 45 can be designed to supply an extension to each byte it supplies, which extension comprises one or more additional bits indicative of the confidence level that the byte is correct. The de-interleaver 46, the data-segment-restoration circuitry 57, and elements 58-64, 69 and 70 can then be designed to preserve those byte extensions in their responses, so those byte extensions are available to help locate byte errors in R-S-FEC-code decoding procedures. The de-interleaver 46, the data-segment-restoration circuitry 57, and ensuing circuitry can be designed to process data on a serial-byte, parallel-bit basis. Alternatively, the de-interleaver 46 can be designed to supply data in single-bitstream format, and the data-segment-restoration circuitry 57 and ensuing circuitry are then designed to process data on a serial-bit basis. The design aspects of these processing alternatives are within the ordinary skill of digital circuit designers.

Figure 19:
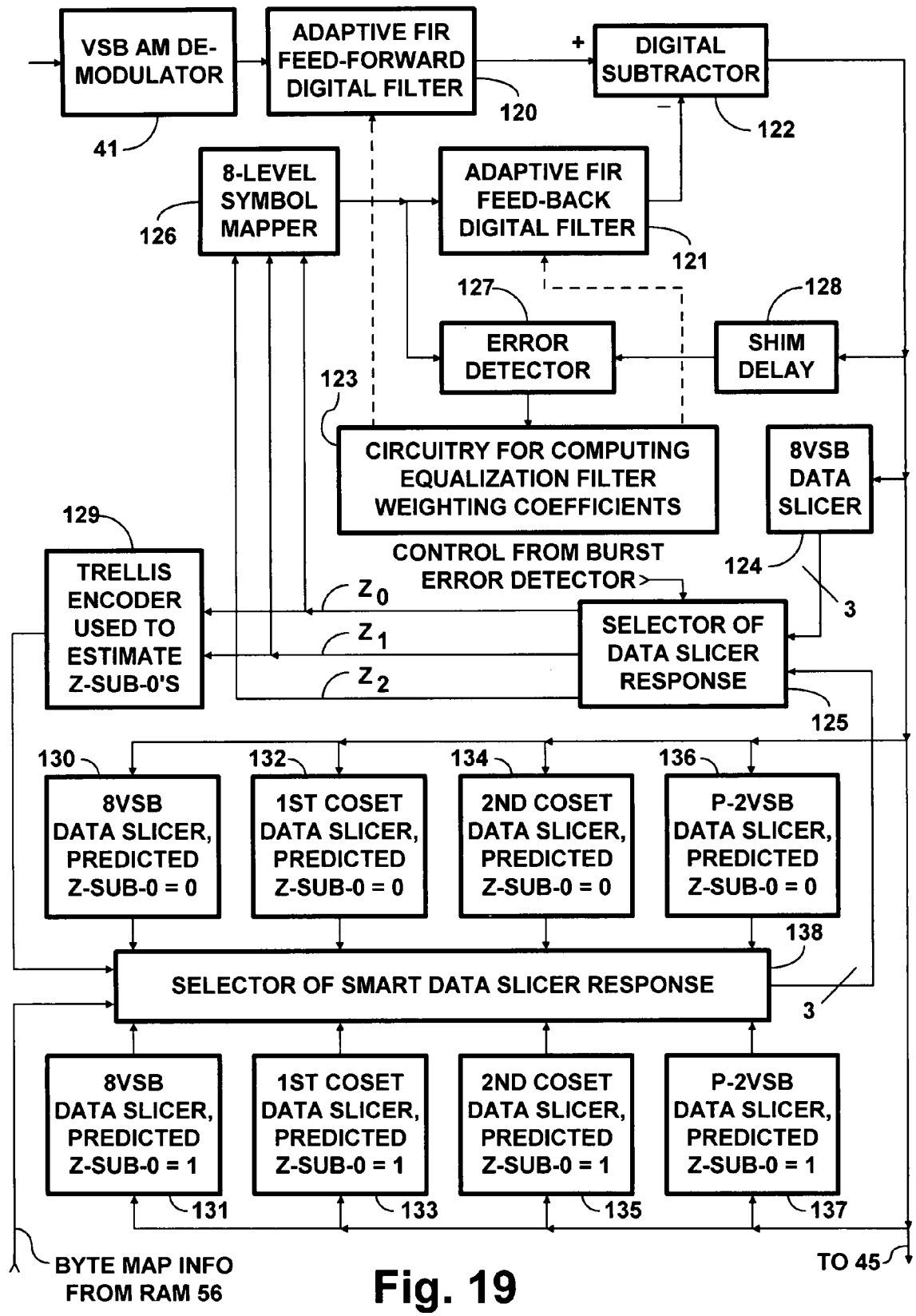
FIG. 19 is a schematic diagram showing in detail how "smart" data slicing is implemented in preferred decision channel-equalization filtering in the FIG. 17A portion of the FIG. 17 DTV receiver apparatus.

FIG. 19 illustrates one way of constructing decision-feedback equalization (DFE) filtering for inclusion in the digital filtering 42 of the FIG. 18 DTV receiver. The DFE filtering comprises a feed-forward filter 120, a feedback filter 121 and a digital subtractor 122 connected for receiving the responses of filters 120 and 121 as its minuend and its subtrahend input signals, respectively. Both of the filters 120 and 121 are adaptive finite-impulse-response (FIR) digital filters kernels that are adjustable responsive to circuitry 123 for computing equalization filter weighting coefficients. The feed-forward filter 120 is connected for receiving as its input signal a digitized baseband DTV signal recovered by the VSB AM demodulator 41. The output signal from the subtractor 122 provides the response of the DFE filtering, which response is forwarded to the Viterbi trellis decoder 45 as its input signal. This response is supplied to a "simple" 8VSB data slicer 124 of conventional design, which recovers the respective $Z_0$, $Z_1$ and $Z_2$ bits encoded in each successive 8VSB symbol and supplies them to a selector 125 of data slicer response. The selector 125 supplies an 8-level symbol mapper 126 with $Z_0$, $Z_1$ and $Z_2$ bits reproducing those supplied to the selector 125 either from the "simple" 8VSB data slicer 124 or from a "smart" data slicer still to be described. The 8-level symbol mapper 126 is of the type shown in FIG. 7 of Annex D of ATSC Document A/53, the ATSC DIGITAL TELEVISION STANDARD. The response of the 8-level symbol mapper 126 is the decision feedback signal applied to the feedback filter 121 as its input signal. This signal is an estimate of the actual symbol sent by the DTV transmitter. An error detector 127 is connected for comparing this estimate to the symbol actually received as supplied in the DFE filtering response from the subtractor 122 as delayed by shim delay 128. The error detector 127 is connected to supply the differences of the received symbols from the estimates of the symbols actually transmitted to the circuitry 123 for computing equalization filter weighting coefficients. The circuitry 123 uses these differences as the basis for computing, in accordance with known technique or techniques, adjustments of the weighting coefficients in the kernels of the adaptive digital filters 120 and 121.

A 12-phase trellis encoder 129 is connected for responding to the $Z_1$ bits supplied from the selector 125 to predict the $Z_0$ bits the selector 125 should next receive, which predictions are used in novel "smart" data slicing procedures. The DFE filtering response supplied as output signal from the subtractor 122 is applied as input signal to data slicers 124, 130, 131, 132, 133, 134, 135, 136 and 137. A selector 138 selects the response of one of the data slicers 124, 130, 131, 132, 133, 134, 135, 136 and 137 to be applied as smart data slicer response to the selector 125 of data slicer response applied to the 8-level symbol mapper 126. Selection by the selector 138 is controlled in part by a bit pair read from the RAM 56 indicating the type of amplitude modulation used in the current byte. Selection by the selector 138 is controlled in further part by the $Z_0$ bits that trellis decoder 129 predicts for the symbols in the current byte.

Suppose a bit pair read from the RAM 56 indicates that the current byte uses 8VSB modulation. Then, if the $Z_0$ bit predicted for a current symbol is a ZERO, the selector 138 selects the response of the data slicer 130 to be smart data slicer response. The data slicer 130 is designed for quantizing the symbol to −7, −3, +1 or +5 normalized modulation level. However, if the $Z_0$ bit predicted for a current symbol is a ONE, the selector 138 selects the response of the data slicer 131 to be smart data slicer response. The data slicer 131 is designed for quantizing the symbol to −5, −1, +3 or +7 normalized modulation level.

Suppose a bit pair read from the RAM 56 indicates that the current byte uses PCPM modulation restricted to the first coset of 8VSB symbols. Then, if the $Z_0$ bit predicted for a current symbol is a ZERO, the selector 138 selects the response of the data slicer 132 to be smart data slicer response. The data slicer 132 is designed for quantizing the symbol to either −3 or +5 normalized modulation level. However, if the $Z_0$ bit predicted for a current symbol is a ONE, the selector 138 selects the response of the data slicer 133 to be smart data slicer response. The data slicer 133 is designed for quantizing the symbol to either −1 or +7 normalized modulation level.

Suppose a bit pair read from the RAM 56 indicates that the current byte uses PCPM modulation restricted to the second coset of 8VSB symbols. Then, if the $Z_0$ bit predicted for a current symbol is a ZERO, the selector 138 selects the response of the data slicer 134 to be smart data slicer response. The data slicer 134 is designed for quantizing the symbol to either −7 or +1 normalized modulation. However, if the $Z_0$ bit predicted for a current symbol is a ONE, the selector 138 selects the response of the data slicer 135 to be smart data slicer response. The data slicer 135 is designed for quantizing the symbol to either −5 or +3 normalized modulation level.

Suppose a bit pair read from the RAM 56 indicates that the current byte uses P2VSB modulation. Then, if the $Z_0$ bit predicted for a current symbol is a ZERO, the selector 138 selects the response of the data slicer 136 to be smart data slicer response. The data slicer 136 is designed for quantizing the symbol to −7 or +5 normalized modulation level. However, if the $Z_0$ bit predicted for a current symbol is a ONE, the selector 138 selects the response of the data slicer 137 to be smart data slicer response. The data slicer 137 is designed for quantizing the symbol to either −5 or +7 normalized modulation level.

The selector 125 of data slicer response is connected for receiving a control signal from a burst error detector not explicitly shown in the drawing. The smart data slicer response supplied to the selector 125 as one of its input signal is prone to running error after protracted bursts of noise in the received DTV signal. So, the burst error detector conditions the selector 125 to reproduce the response of the simple 8VSB data slicer 124 for a few symbol epochs following a burst error being detected. When power is applied to the DTV receiver after a time that power has been withheld from the DTV receiver, the control signal supplied from the burst error detector conditions the selector 125 to reproduce for a few symbol epochs the response of the simple 8VSB data slicer 124.

Figure 20:
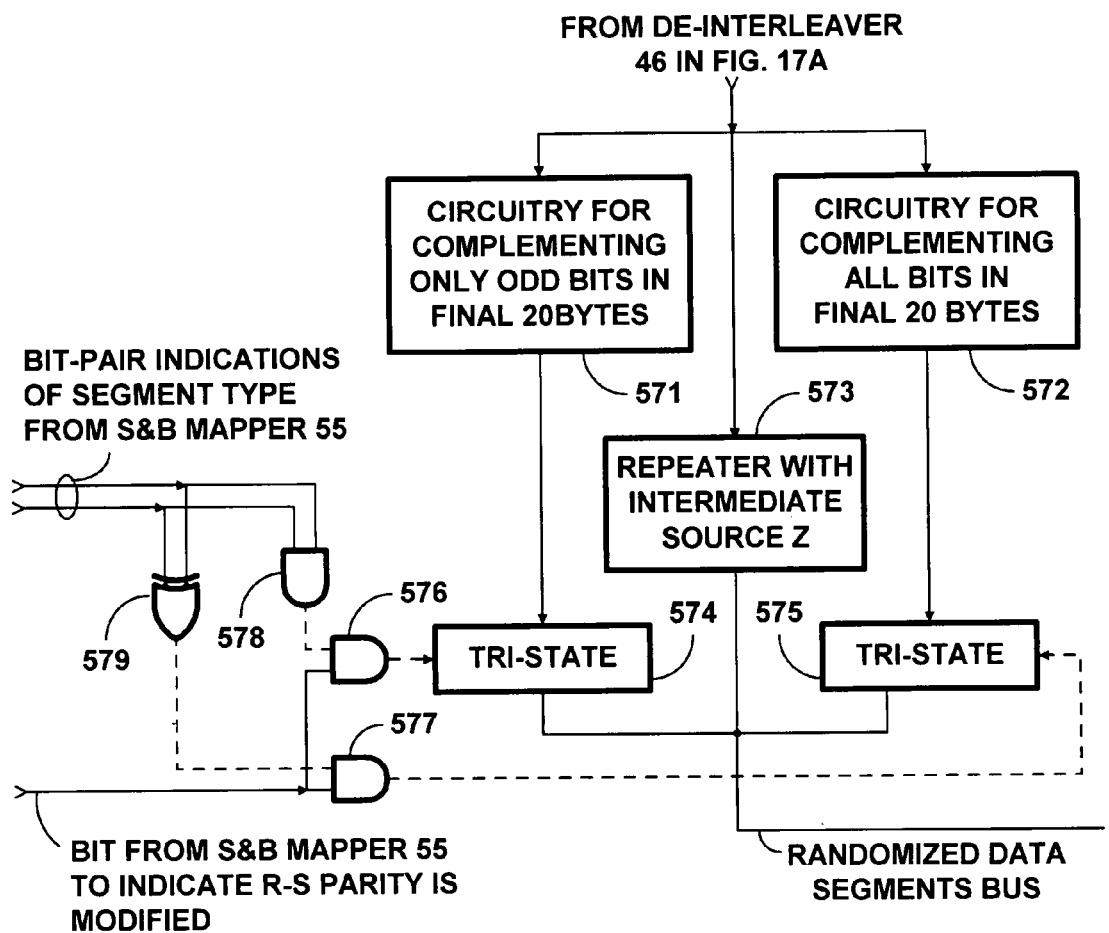
FIG. 20 is a schematic diagram showing in detail a particular construction of circuitry for restoring the original final twenty bytes of data segments that were modified before transmission so that legacy DTV receivers would not mistake them for ordinary 8VSB data segments.

FIG. 20 shows in detail a particular construction of the circuitry 57 for restoring the original final twenty bytes of data segments that were modified before transmission so that legacy DTV receivers would not mistake them for ordinary 8VSB data segments. Circuitry 571 for complementing only the odd bits in the final twenty bytes of data segments, circuitry 572 for complementing all the bits in the final twenty bytes of data segments, and a repeater 573 are connected for receiving de-interleaved data segments from the de-interleaver 46 as their input signals. The repeater 573, tri-state circuitry 574 and tri-state circuitry 575 have respective output connections to the RANDOMIZED DATA SEGMENTS BUS, so as to form a data-segment multiplexer for assembling fields of de-interleaved and restored data segments. The de-interleaver 46 output signal is reproduced by the repeater 573 from an intermediate-value source impedance that is appreciably lower than the source impedances exhibited by the tri-state circuitry 574 and the tri-state circuitry 575 when they are not conditioned by their control signals to exhibit low source impedance. Accordingly, the repeater 573 is able to assert the de-interleaver 46 output signal on the RANDOMIZED DATA SEGMENTS BUS so long as neither the tri-state circuitry 574 nor the tri-state circuitry 575 is conditioned by its control signal to exhibit low source impedance.

Two-input AND gates 576 and 577 are connected for applying their respective responses to the tri-state circuitry 574 and to the tri-state circuitry 575, respectively, as control signals. The AND gates 576 and 577 are each connected for receiving, as a first one of its two input signals, a bit from the S&B mapper 55 that indicates whether or not some bits in the data segment supplied by the de-interleaver 46 were complemented before transmission. If this indicator bit is a ONE, this indicates some bits in the data segment supplied by the de-interleaver 46 were complemented before transmission so legacy DTV receivers would disregard the data segment. If this indicator bit is a ZERO, indicating that the data segment supplied by the de-interleaver 46 was not so modified before transmission, the responses of the AND gates 576 and 577 are ZEROes. These ZEROes condition the tri-state circuitry 574 and the tri-state circuitry 575 both to exhibit relatively high source impedances at their output connections to the RANDOMIZED DATA SEGMENTS BUS, permitting the repeater 573 to assert reproduced de-interleaver 46 output signal on that bus. If the AND gates 576 and 577 receive a ONE indicator bit from the S&B mapper 55 as first ones of their respective input signals, their responses will repeat the second other ones of their respective input signals. A two-input AND gate 578 and a two-input exclusive-OR gate 579 are each connected for receiving as the two input signals thereof the bit pair supplied from the S&B mapper 55 indicative of the type of modulation used in each data segment.

The AND gate 577 is connected to supply its response to the two-input AND gate 576 as its second input signal. The AND gate 578 response is ONE, only when the bit pair indicative of the type of modulation used in each data segment is 11 indicating PCPM. If both input signals of the two-input AND gate 576 are ONES, its response is a ONE. This ONE applied as control signal to the tri-state circuitry 574 conditions the tri-state circuitry 574 to assert reproduced circuitry 571 output signal from a low source impedance on the RANDOMIZED DATA SEGMENTS BUS.

The exclusive-OR gate 579 is connected to supply its response to the two-input AND gate 577 as its second input signal. The XOR gate 579 response is ONE only when the bit pair for indicating the type of modulation used in each data segment is either 10 indicating P2VSB modulation, or is 01 indicating linear-block-coded 8VSB modulation. If both input signals of the two-input AND gate 577 are ONES, its response is a ONE. This ONE applied as control signal to the tri-state circuitry 575 conditions the tri-state circuitry 575 to assert reproduced circuitry 572 output signal from a low source impedance on the RANDOMIZED DATA SEGMENTS BUS.

Figure 21:
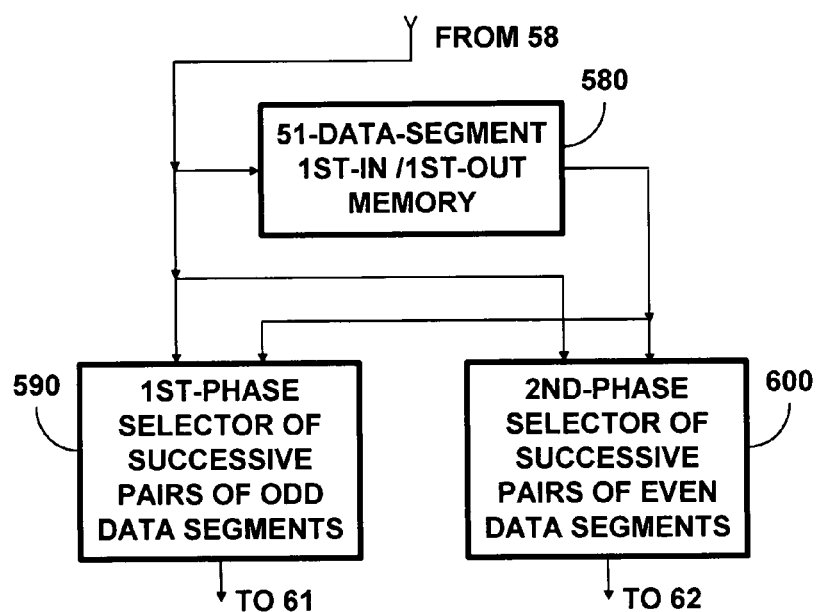
FIG. 21 is a schematic diagram showing in detail a particular construction of a supplementary de-interleaver for signals with code rate one-half that of ordinary 8VSB signal.

FIG. 21 shows in detail one way to construct the supplementary de-interleavers 59 and 60 for signals with code rate one-half that of ordinary 8VSB signal. Data segments supplied by the clocked digital delay circuitry 58 are written into a first-in/first-out memory 580 to be read out fifty-one data segment intervals later. The FIFO memory 580 is a shared component of both the two supplementary de-interleavers 59 and 60. Besides the shared FIFO memory 580, the supplementary de-interleaver 59 comprises a selector 590 for alternately reproducing delayed odd data segments from the FIFO memory 580 and reproducing odd data segments supplied by the clocked digital delay circuitry 58 for writing into the FIFO memory 580. Successive pairs of odd data segments in the output signal from the selector 590 define possible (207, 187) R-S FEC codewords transmitted at one-half the code rate for ordinary 8VSB signal. Besides the shared FIFO memory 580, the supplementary de-interleaver 60 comprises a selector 600 for alternately reproducing delayed even data segments from the FIFO memory 580 and reproducing even data segments supplied by the clocked digital delay circuitry 58 for writing into the FIFO memory 580. Successive pairs of even data segments in the output signal from the selector 600 define possible (207, 187) R-S FEC codewords transmitted at one-half the code rate for ordinary 8VSB signal.

Figure 22:
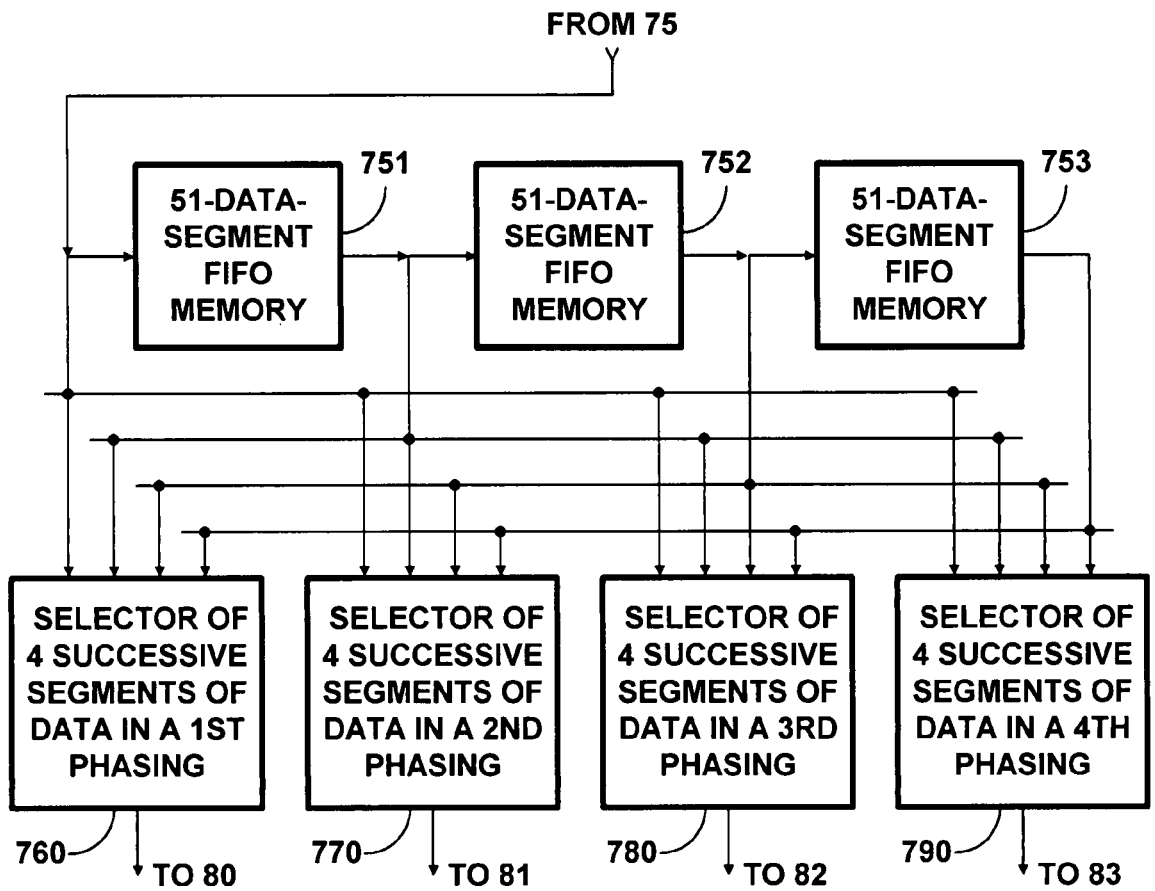
FIG. 22 is a schematic diagram showing in detail a particular construction of a supplementary de-interleaver for signals with code rate one-quarter that of ordinary 8VSB signal.

FIG. 22 shows in detail one way to construct the supplementary de-interleavers 76, 77, 78 and 79 for signals with code rate one-quarter that of ordinary 8VSB signal. Data segments supplied by the two-to-one decimator 75 are written to cascaded first first-in/first-out memories 751, 752 and 753 to be read out 51, 102 and 153 data segment intervals later from respective ones of those FIFO memories. The FIFO memories 751, 752 and 753 are shared components of all the supplementary de-interleavers 76, 77, 78 and 79. The de-interleaver 76 further comprises a selector 760 connected for cyclically reproducing first data segments as delayed 153, 102, 53 and no data segment intervals. The de-interleaver 77 further comprises a selector 770 connected for cyclically reproducing second data segments as delayed 153, 102, 53 and no data segment intervals. The de-interleaver 78 further comprises a selector 780 connected for cyclically reproducing third data segments as delayed 153, 102, 53 and no data segment intervals. The de-interleaver 79 further comprises a selector 790 connected for cyclically reproducing zeroeth (fourth) data segments as delayed 153, 102, 53 and no data segment intervals.

Figure 23:
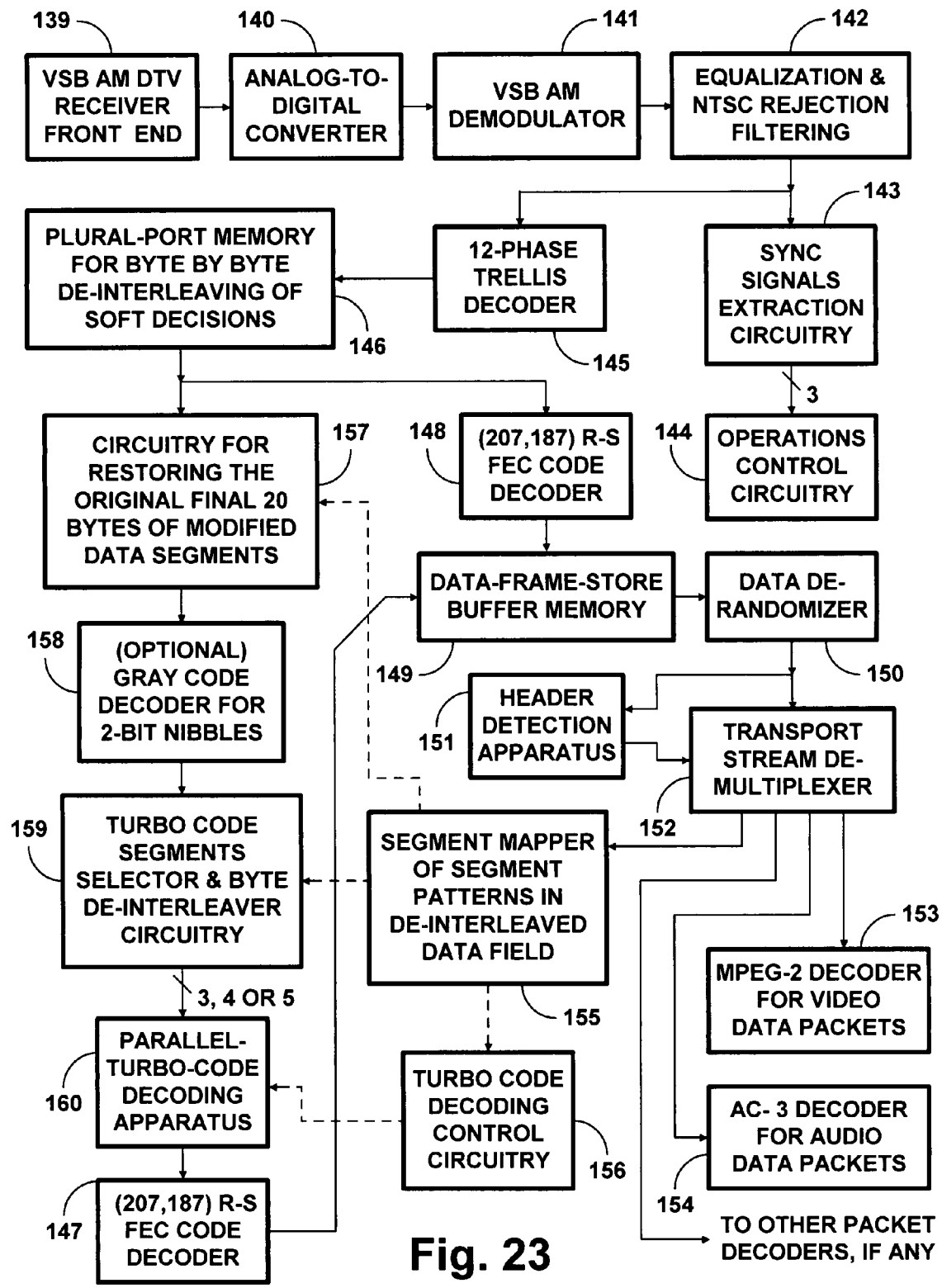
FIG. 23 is a schematic diagram of DTV receiver apparatus embodying an aspect of the invention, which receiver apparatus can receive DTV signals that at least sometimes employ turbo coding of a type transmitted by the DTV transmitter apparatus of FIG. 7.

FIG. 23 shows DTV receiver apparatus capable of usefully receiving DTV signals that at least sometimes employ turbo coding, as transmitted by the DTV transmitter apparatus of FIG. 7. This FIG. 23 DTV receiver apparatus utilizes the information concerning the patterns of robust transmission that is received from DTV transmitter apparatus modified per FIG. 9. The FIG. 23 DTV receiver apparatus includes a VSB AM DTV receiver front-end 139 for selecting a radio-frequency DTV signal for reception, converting the selected RF DTV signal to an intermediate-frequency DTV signal, and for amplifying the IF DTV signal. An analog-to-digital converter 140 is connected for digitizing the amplified IF DTV signal supplied from the DTV receiver front-end 139. A demodulator 141 is connected for demodulating the digitized VSB AM IF DTV signal to generate a digitized baseband DTV signal, which is supplied to digital filtering 142 for equalization of channel response and for rejection of co-channel interfering NTSC signal. Synchronization-signals-extraction circuitry 143 is connected for receiving the digital filtering 142 response. Responsive to DFS signals, the sync-signals-extraction circuitry 143 detects the beginnings of data frames and fields. Responsive to DSS signals, the sync-signals-extraction circuitry 143 detects the beginnings of data segments. FIG. 23 shows operations control circuitry 144 for controlling operations within the DTV receiver apparatus being connected for receiving DFS signal, DSS signal and clocking signal at an even multiple of symbol rate via respective connections from the sync-signals-extraction circuitry 143. These signals are provided with respective delays by means not explicitly shown, which delays compensate for latent delays accumulated in the FIG. 23 circuitry.

A 12-phase trellis decoder 145 is connected for receiving the digital filtering 142 response and performing symbol-decoding procedures to recover bytes of data. The trellis decoder 145 is connected to supply eight-bit bytes of hard-decision data and accompanying soft-decision data to a plural-port memory 146 operated so as to provide byte de-interleaving. This byte de-interleaving complements the convolutional byte interleaving in the memory 27 of the FIG. 7 DTV transmitter apparatus. The memory 146 is connected for reading de-interleaved eight-bit bytes of hard-decision data to a decoder 148 for (207, 187) Reed-Solomon forward-error-correction codewords. The decoder 148 is connected for writing MPEG-2-compliant data packets to a data-frame-store buffer memory 149. Writing is done on a hand-shake basis to avoid collision with data packets from another decoder 147 for (207, 187) Reed-Solomon forward-error-correction codewords. Each MPEG-2-compliant data packet is written from the decoder 148 to a segment of the data-frame-store buffer memory 149 corresponding to the final one of the group of data segments encoding the turbo code fragment that is read from the memory 146 to the decoder 148. This can be implemented by attaching a 10-bit prefix to the final one of the group of data segments encoding the turbo code fragment that is read from the memory 146. The 10-bit prefix designates segment addresses in both of the memories 146 and 149.

The data-frame-store buffer memory 149 is connected for reading MPEG-2-compliant data packets to a data de-randomizer 150 complementary to the data randomizers 3 and 8 in the FIG. 7 DTV transmitter apparatus. The de-randomizer 150 is connected for supplying this de-randomized response to header detection apparatus 151 and to a transport stream de-multiplexer 152 controlled by response from the header detection apparatus 151. The transport stream de-multiplexer 152 responds to the header detection apparatus 51 detecting selected PIDs in certain types of the de-randomized data packets from the data de-randomizer 150 for sorting those types of de-randomized data packets to appropriate packet decoders. For example, video data packets are sorted to an MPEG-2 decoder 153, and audio data packets are sorted to an AC-3 decoder 154.

When the header detection apparatus 151 detects the header of a data packet containing descriptions of a future data field, it supplies the transport stream de-multiplexer 152 with control signal conditioning the de-multiplexer 152 to reproduce that data packet at a particular one of its output ports. This output port is connected for supplying the reproduced data packet to a segment mapper 155 as input signal thereto. The segment mapper 155 operates to map the pattern of the segments in the de-interleaved data fields and to map the pattern of the bytes within each segment. The segment mapper 155 includes two small random-access memories, each used as a cache memory for the temporary storage of information extracted from de-randomized data packets received from the data de-randomizer 150 via the de-multiplexer 152. The storage locations in each cache memory are addressed by the number of the segment in the data frame(s) to which the temporarily stored nibble corresponds. One of the cache memories temporarily stores the 3-bit specifications as to how respective segments of future data fields fit into groups of data segments defining fragments of turbo code. This cache memory is connected for reading these 3-bit specifications to turbo code decoding control circuitry 156.

The other of the cache memories in the segment mapper 155 temporarily stores the bits that describe whether respective segments of future data fields are modified to avoid being mistaken for (207, 187) R-S FEC codewords. This other cache memory is connected for reading ones of these bits to circuitry 157 for restoring the original twenty bytes of modified data segments. The circuitry 157 is connected for receiving soft-decision information read from the memory 146 concerning the content of de-interleaved data segment. Bits supplied to the circuitry 157 from this other cache memory in the segment mapper 155 control the circuitry 157 in its selection of which of the data segments it receives are reproduced without modification and which are reproduced with modification designed to restore them to original form.

FIG. 23 shows the circuitry 157 connected for supplying the reproduced data segments, whether they are modified or not, to a Gray code decoder 158 for 2-bit nibbles in those reproduced data segments. The Gray code decoder 158 is easily implemented using read-only memory, and its decoding complements the Gray code coding of the coder 26 in the FIG. 7 DTV transmitter apparatus. The Gray code decoder 158 is connected for supplying its response as input signal for circuitry 159 comprising turbo code segments selector and byte de-interleaver circuitry. If the FIG. 7 DTV transmitter apparatus does not use the optional Gray code coder 26, the Gray code decoder 158 is omitted, and the circuitry 157 is connected for supplying its reproduced data segments directly to the circuitry 159.

Turbo code decoding apparatus 160 is connected for receiving the three, four or five data steams of turbo coding generated by the turbo code segments selector and byte de-interleaver circuitry 159. The turbo code decoding apparatus 160 is connected for supplying its response to the decoder 147 for (207, 187) R-S FEC codewords as input signal. If the decoder 147 is able to extract a correct MPEG-2-compliant data packet from the turbo code decoding apparatus 160 response before a specified number of decoding trials is reached, that packet is written to the data-frame-store buffer memory 149 without toggling the TEI bit in that packet. If the decoder 147 is unable to extract a correct MPEG-2-compliant data packet from the turbo code decoding apparatus 160 response within a specified number of decoding trials, that packet is then written to the data-frame-store buffer memory 149 after toggling the TEI bit in that packet. This writing is done on a hand-shake basis, being done as soon as permitted so as to avoid collision with data packets from the decoder 148 for (207, 187) R-S FEC codewords; and the turbo code decoding apparatus 160 is readied for decoding a following fragment of turbo code. Each MPEG-2-compliant data packet is written from the decoder 148 to a segment of the data-frame-store buffer memory 149 that contained the initial data segment of the turbo coding fragment generating that packet. This can be implemented by utilizing the 10-bit prefixes attached to data segments read from the memory 146.

Figure 24:
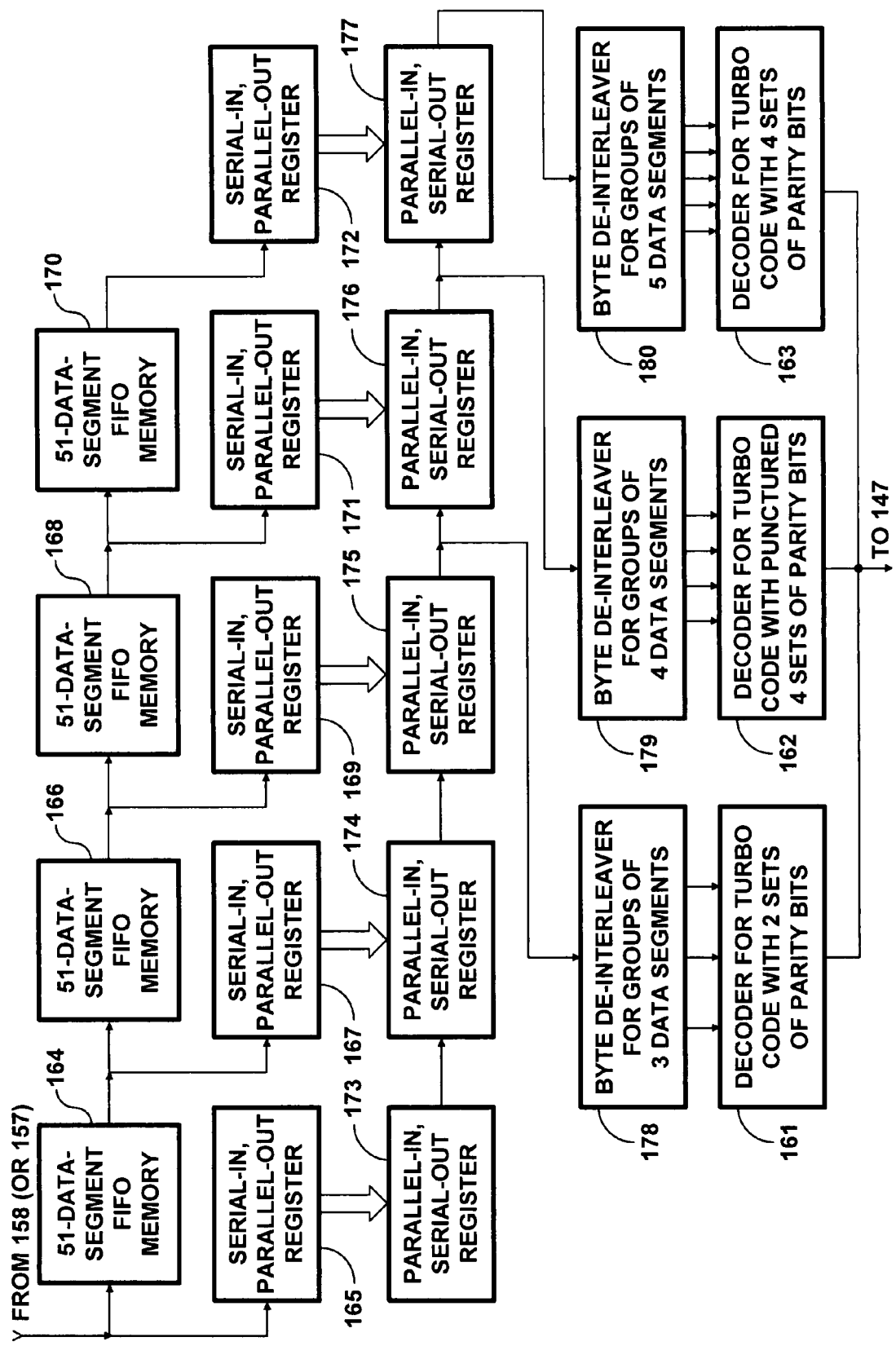
FIG. 24 is a schematic diagram showing in detail a particular construction of the turbo code segments selector and byte de-interleaver circuitry in the FIG. 23 DTV receiver apparatus.

FIG. 24 shows details of one particular construction of the turbo code segments selector and byte de-interleaver circuitry 159 in the FIG. 23 DTV receiver apparatus. This particular construction accommodates turbo code decoding apparatus 160 including component turbo code decoding apparatuses 161, 162 and 163 for types of parallel turbo coding that reduce code rate by factors of 2, 3 and 4, respectively.

A 51-data segment first-in, first-out buffer memory 164 and a serial-in, parallel-out shift register 165 are connected to receive as their respective input signals soft-decision information concerning successive segments of a de-interleaved data field. This soft-decision information is supplied from the Gray code decoder 158 (or from the circuitry 157 if the decoder 158 is omitted). A 51-data segment first-in, first-out buffer memory 166 and a serial-in, parallel-out shift register 167 are connected to receive as their respective input signals the response of the FIFO buffer memory 164. A 51-data segment first-in, first-out buffer memory 168 and a serial-in, parallel-out shift register 169 are connected to receive as their respective input signals the response of the FIFO buffer memory 166. A 51-data segment first-in, first-out buffer memory 170 and a serial-in, parallel-out shift register 171 are connected to receive as their respective input signals the response of the FIFO buffer memory 168. A serial-in, parallel-out shift register 172 is connected to receive as its input signal the response of the FIFO buffer memory 170. Each of the SIPO shift registers 165, 167, 169, 171 and 172 can store soft-decision information concerning a complete 828-symbol data segment. At the conclusion of each data segment interval, the SIPO shift registers 172, 171, 169, 167 and 165 together contain soft-decision information concerning five data segments occurring at 52-data-segment intervals in the de-interleaved data field.

The serial-in, parallel-out shift registers 165, 167, 169, 171 and 172 are connected to permit parallel transfer of their respective contents to parallel-in, serial-out shift registers 173, 174, 175, 176 and 177, respectively. The PISO shift registers 173, 174, 175, 176 and 177 are connected in cascade for serial transfer which occurs at a clock rate sufficiently high to transfer the soft-decision information concerning five data segments from those shift registers within one data segment interval. The 3-bit specifications concerning how each segment fits or does not fit into a group of data segments defining a fragment of turbo code are read from cache memory in the segment mapper 155 at the conclusion of each data segment interval. The 3-bit specifications are used to control parallel transfers from the SIPO shift registers 165, 167, 169, 171 and 172 to respective ones of the PISO shift registers 173, 174, 175, 176 and 177 during DSS intervals.

When the information drawn from the 3-bit specifications indicates that the SIPO shift registers 165, 167 and 169 have just been serially loaded with a group of three segments containing a complete fragment of turbo coding, the contents of the SIPO shift registers 165, 167 and 169 are transferred in parallel to the PISO shift registers 173, 174 and 175, respectively. During the next data segment interval the entire contents of the cascaded PSO shift registers 173, 174 and 175 are shifted out serially at an accelerated clock rate to a byte de-interleaver 178. The de-interleaver 178 undoes the byte interleaving of three data segments performed by the byte interleaver 25 in the FIG. 7 DTV transmitter apparatus. The byte de-interleaver 178 polls the bytes shifted out of the cascaded PISO shift registers 173, 174 and 175 separating them into data and two sets of parity bits for application as input signals to the turbo code decoding apparatus 161. The turbo code decoding control circuitry 156 also responds to the information directing the parallel transfer of contents from the SIPO shift registers 165, 167 and 169. The turbo code decoding control circuitry 156 responds by activating the turbo code decoding apparatus 161 and de-activating the turbo code decoding apparatuses 162 and 163. Activation of the turbo code decoding apparatus 161 enables it to assert its response on the input connection to the decoder 147 for (207, 187) R-S FEC codewords.

When the information drawn from the 3-bit specifications indicates that the SIPO shift registers 165, 167, 169 and 171 have just been serially loaded with a group of four segments containing a complete fragment of turbo coding, the contents of the SIPO shift registers 165, 167, 169 and 171 are transferred in parallel to the PISO shift registers 173, 174, 175 and 176, respectively. During the next data segment interval the entire contents of the cascaded PISO shift registers 173, 174, 175 and 176 are shifted out serially at an accelerated clock rate to a byte de-interleaver 179. The de-interleaver 179 undoes the byte interleaving of four data segments performed by the byte interleaver 25 in the FIG. 7 DTV transmitter apparatus. The byte de-interleaver 179 polls the bytes shifted out of the cascaded PISO shift registers 173, 174, 175 and 176 separating them into data and three sets of punctured parity bits for application as input signals to the turbo code decoding apparatus 162. The turbo code decoding control circuitry 156 also responds to the information directing the parallel transfer of contents from the SIPO shift registers 165, 167, 169 and 171. The turbo code decoding control circuitry 156 responds by activating the turbo code decoding apparatus 162 and de-activating the turbo code decoding apparatuses 161 and 163. Activation of the turbo code decoding apparatus 162 enables it to assert its response on the input connection to the decoder 147 for (207, 187) R-S FEC codewords.

When the information drawn from the 3-bit specifications indicates that the SIPO shift registers 165, 167, 169, 171 and 172 have just been serially loaded with a group of five segments containing a complete fragment of turbo coding, the contents of the SIPO shift registers 165, 167, 169, 171 and 172 are transferred in parallel to the PISO shift registers 173, 174, 175, 176 and 177, respectively. During the next data segment interval the entire contents of the cascaded PISO shift registers 173, 174, 175, 176 and 177 are shifted out serially at an accelerated clock rate to a byte de-interleaver 180. The de-interleaver 180 undoes the byte interleaving of five data segments performed by the byte interleaver 25 in the FIG. 7 DTV transmitter apparatus. The byte de-interleaver 180 polls the bytes shifted out of the cascaded PISO shift registers 173, 174, 175, 176 and 177 separating them into data and four sets of parity bits for application as input signals to the turbo code decoding apparatus 163. The turbo code decoding control circuitry 156 also responds to the information directing the parallel transfer of contents from the SIPO shift registers 165, 167, 169, 171 and 172. The turbo code decoding control circuitry 156 responds by activating the turbo code decoding apparatus 163 and de-activating the turbo code decoding apparatuses 161 and 162. Activation of the turbo code decoding apparatus 163 enables it to assert its response on the input connection to the decoder 147 for (207, 187) R-S FEC codewords.

Figure 25:
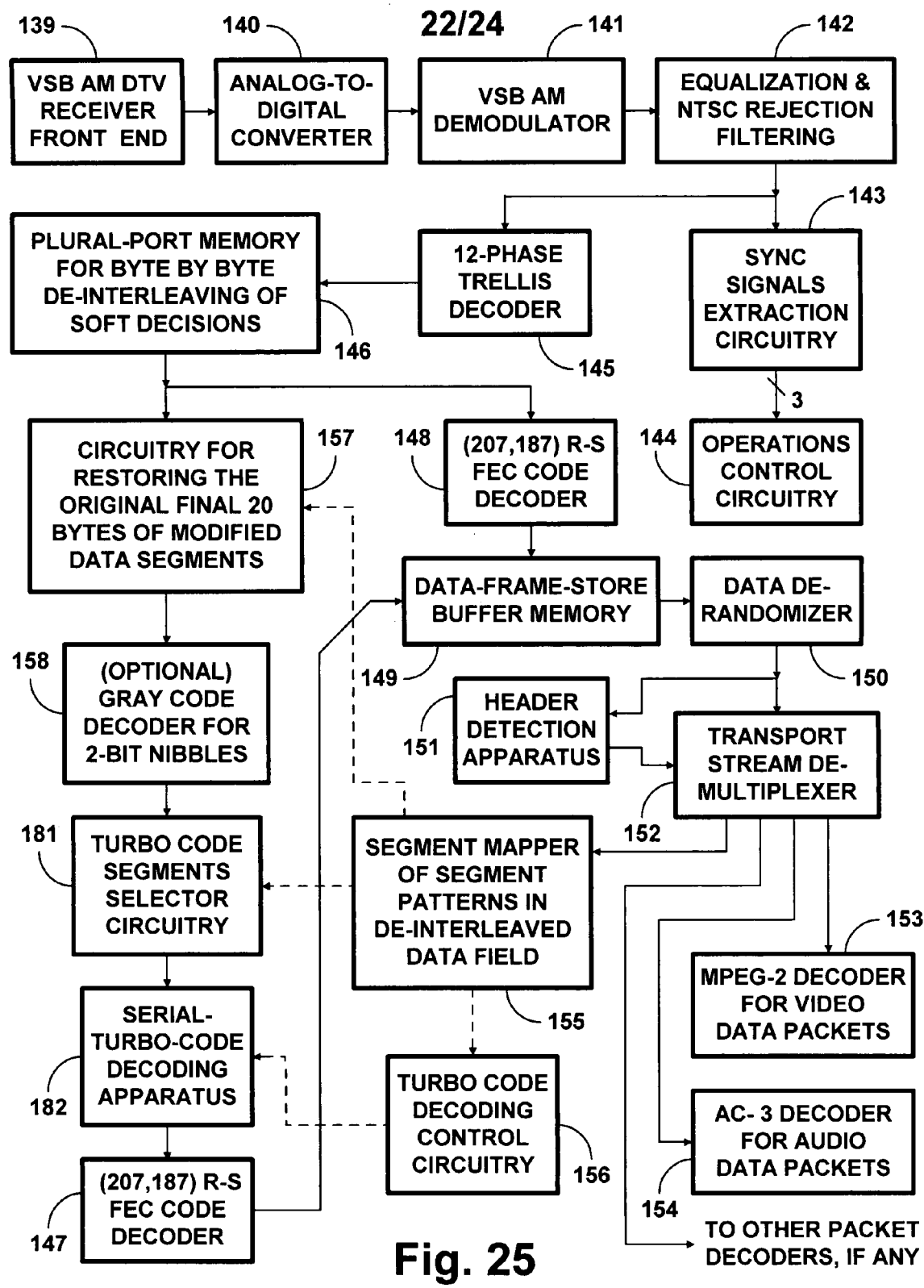
FIG. 25 is a schematic diagram of DTV receiver apparatus embodying an aspect of the invention, which receiver apparatus can receive DTV signals that at least sometimes employ turbo coding of a type transmitted by the DTV transmitter apparatus of FIG. 8.

FIG. 25 shows DTV receiver apparatus capable of usefully receiving DTV signals that at least sometimes employ turbo coding of a type transmitted by the DTV transmitter apparatus of FIG. 8. This FIG. 25 DTV receiver apparatus utilizes the information concerning the patterns of robust transmission that is received from DTV transmitter apparatus modified per FIG. 9. The FIG. 25 DTV receiver apparatus differs from the FIG. 23 DTV receiver apparatus in the following ways. The turbo code segments selector and byte de-interleaver circuitry 159 of the FIG. 25 DTV receiver apparatus is replaced in the FIG. 23 DTV receiver apparatus by turbo code segments selector circuitry 181 that does not provide for byte de-interleaving. The apparatus 160 for decoding parallel turbo code in the FIG. 25 DTV receiver apparatus is replaced in the FIG. 23 DTV receiver apparatus by apparatus 182 for decoding serial turbo code as used in the A-VSB proposal by Samsung engineers.

Figure 26:
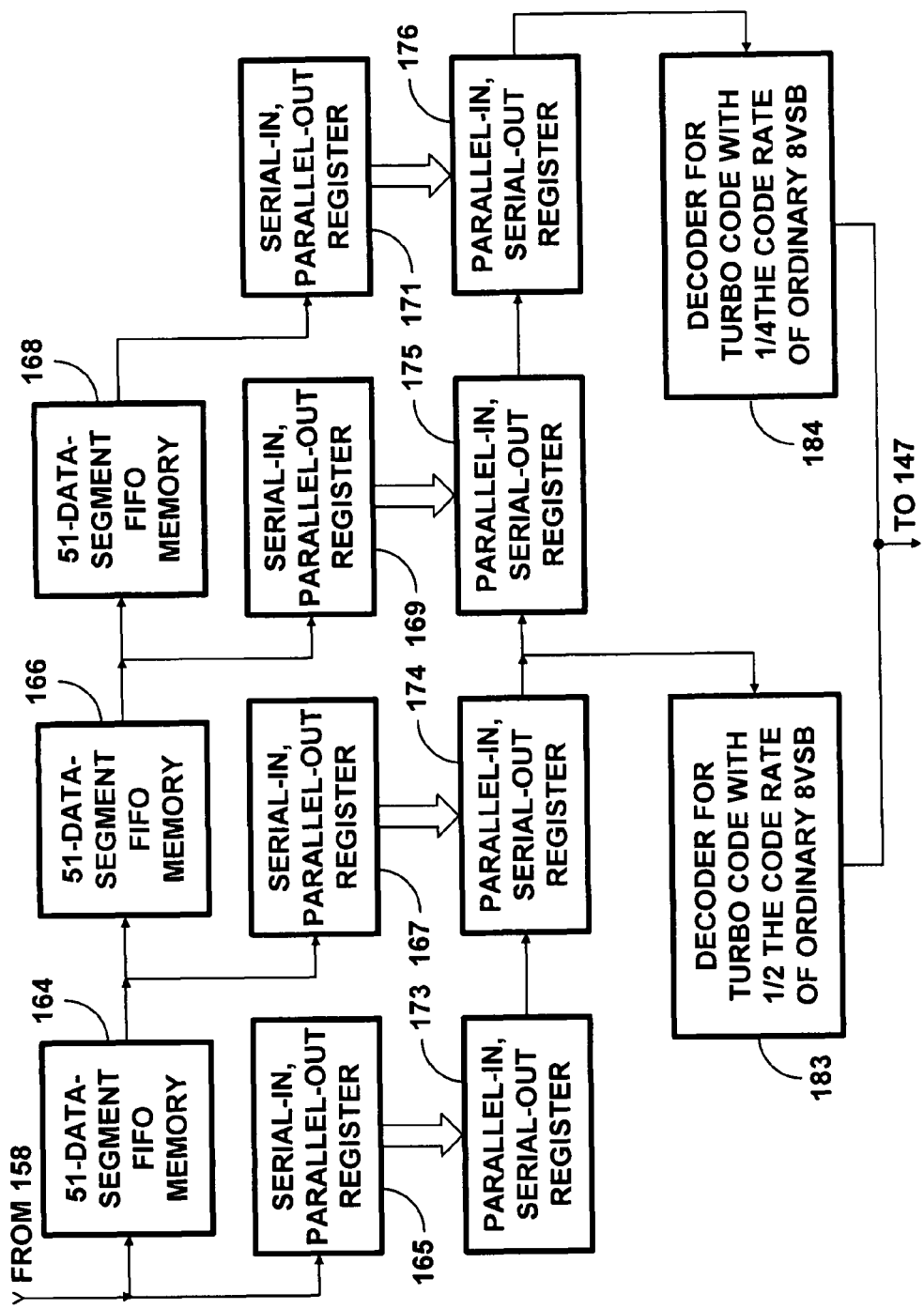
FIG. 26 is a schematic diagram showing in detail a particular construction of the turbo code segments selector circuitry in the FIG. 25 DTV receiver apparatus.

FIG. 26 shows details of one particular construction of the turbo code segments selector circuitry 181 in the FIG. 25 DTV receiver apparatus. This particular construction accommodates turbo code decoding apparatus 182 including component turbo code decoding apparatuses 183 and 184 for types of serial turbo coding that reduce code rate by factors of 2 and 4, respectively. The turbo code segments selector circuitry 181 particularly shown in FIG. 26 differs structurally from the turbo code segments selector and byte de-interleaver circuitry 159 particularly shown in FIG. 24 in that the FIFO buffer memory 170, the shift registers 172 and 177, and the byte de-interleavers 178, 179 and 180 are omitted. The serial-output port of the PISO shift register 174 connects directly to the input port of apparatus 183 for decoding serial turbo coding that halves code rate. The serial-output port of the PISO shift register 176 connects directly to the input port of apparatus 184 for decoding serial turbo coding that quarters code rate.

When the information drawn from the 3-bit specifications indicates that the SIPO shift registers 165 and 167 have just been serially loaded with a pair of segments containing a complete fragment of turbo coding, the contents of the SIPO shift registers 165 and 167 are transferred in parallel to the PISO shift registers 173 and 174, respectively. During the next data segment interval the entire contents of the cascaded PISO shift registers 173 and 1754 are shifted out serially at an accelerated clock rate to the turbo code decoding apparatus 183. The turbo code decoding control circuitry 156 also responds to the information directing the parallel transfer of contents from the SIPO shift registers 165 and 167. The turbo code decoding control circuitry 156 responds by activating the turbo code decoding apparatus 183 and de-activating the turbo code decoding apparatuses 184. Activation of the turbo code decoding apparatus 183 enables it to assert its response on the input connection to the decoder 147 for (207, 187) R-S FEC codewords.

When the information drawn from the 3-bit specifications indicates that the SIPO shift registers 165, 167, 169 and 171 have just been serially loaded with a group of four segments containing a complete fragment of turbo coding, the contents of the SIPO shift registers 165, 167, 169 and 171 are transferred in parallel to the PISO shift registers 173, 174, 175 and 176, respectively. During the next data segment interval the entire contents of the cascaded PISO shift registers 173, 174, 175 and 176 are shifted out serially at an accelerated clock rate to the turbo code decoding apparatus 184. The turbo code decoding control circuitry 156 also responds to the information directing the parallel transfer of contents from the SIPO shift registers 165, 167, 169 and 171. The turbo code decoding control circuitry 156 responds by activating the turbo code decoding apparatus 184 and de-activating the turbo code decoding apparatuses 183. Activation of the turbo code decoding apparatus 184 enables it to assert its response on the input connection to the decoder 147 for (207, 187) R-S FEC codewords.

FIGS. 23, 24, 25 and 26 together with the foregoing description of those drawing figures will enable one who is skilled in the art of designing DTV receiver apparatus to design DTV receivers that can receive both parallel turbo coding and serial turbo coding. Such designs will be readily generated without need for appreciable experimentation or exercise of inventive skill.

A further part of the A-VSB proposal of Samsung Electronics Company, Ltd. for robust DTV transmissions concerns the insertion of prescribed symbols into specified portions of the consecutive segments of the data fields supplied for convolutional byte interleaving and trellis coding within the DTV transmitter apparatus. These prescribed symbols are inserted as training signals to help adaptive channel equalization in DTV receivers. The portions of the consecutive data segments containing these prescribed symbols are located within the adaptation fields of the MPEG-2-compliant packets contained within those segments. The prescribed symbols are so located in order that legacy DTV receivers will disregard them. The blocks of prescribed symbols each begin with three bytes bits of which are apt to be altered during the trellis coding procedures so that the trellis coding of the later bytes in those blocks is of prescribed nature that new DTV receivers can rely on during adaptive channel equalization.

These blocks of prescribed symbols referred to as "supplemental reference sequences" or "SRS". The alteration of the initial 24 symbols in the supplemental reference sequences is referred to as "determined trellis reset" or "DTR". SRS speeds up certain types of adaptive channel equalization when dynamic multipath conditions hamper reception, but reduces effective code rate.

Although the inventor prefers not using SRS when turbo coding is done over complete data segments, the inventor has considered how to accommodate SRS into such turbo coding. The (207, 187) R-S FEC coding is performed on a data packet that is MPEG-2-compliant and that includes an adaptation field header followed by three placeholder bytes for DTR and then the SRS block. The turbo coding is performed on the data omitting the SRS block and the three preceding placeholder bytes for DTR. The data segments including the turbo coding components each have the SRS block and the three preceding placeholder bytes for DTR inserted into them, positioned as it would be if they were located in an adaptation field. In the DTR receiver the turbo decoding is performed, omitting the SRS blocks and the preceding placeholder bytes. The SRS block and preceding placeholder bytes are then inserted back into the turbo coding results to reproduce (207, 187) R-S FEC codewords for further decoding.

Figure 27:
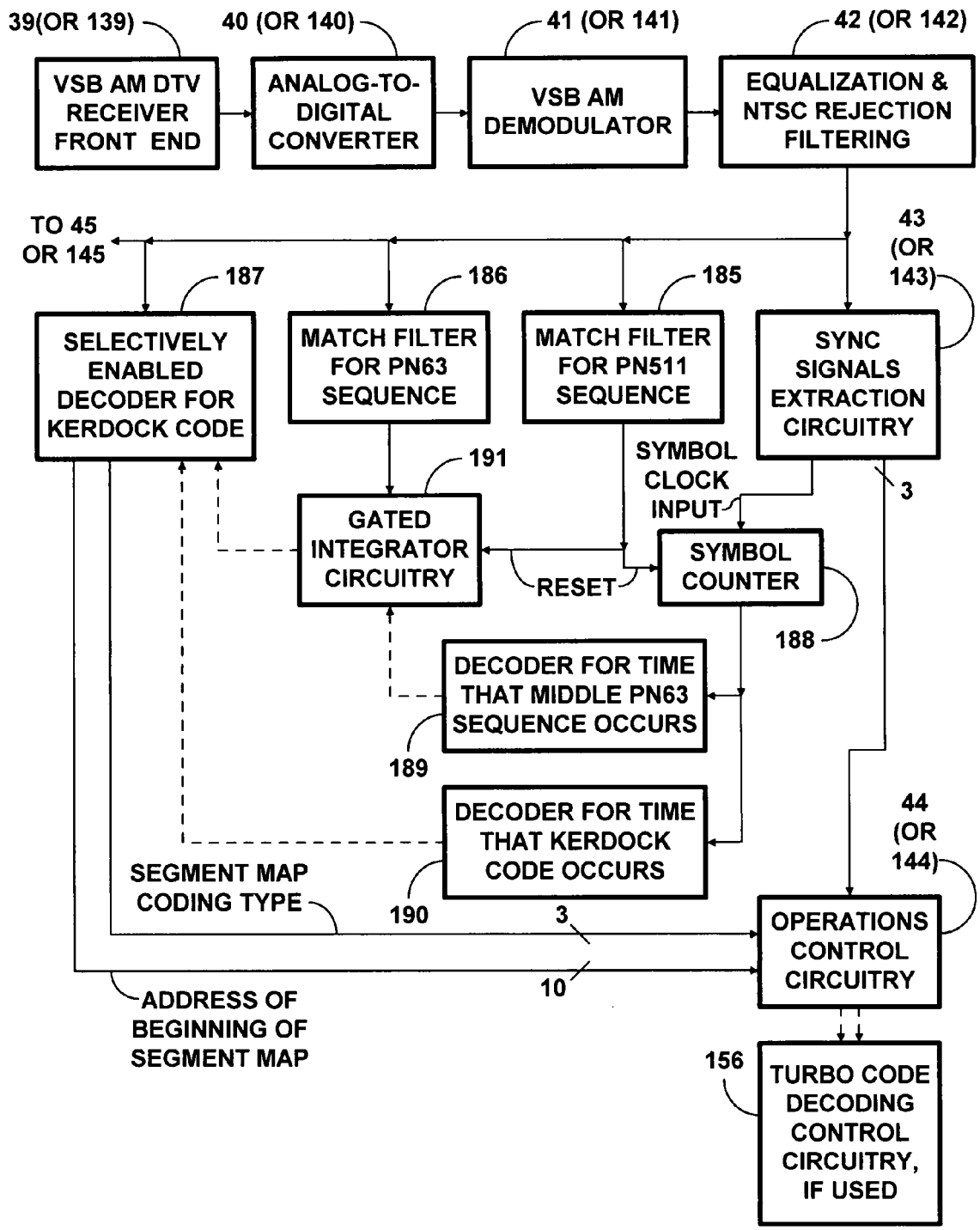
FIG. 27 is a schematic diagram of circuitry that can be used in DTV receiver apparatus for retrieving advance information concerning the nature of robust transmissions, as sent by the FIG. 9 modification of DTV transmitter apparatus of the types shown in FIGS. 1 and 3, in FIGS. 1 and 4, in FIGS. 1 and 5, in FIG. 7 and in FIG. 8.

FIG. 27 shows further DTV receiver circuitry capable of retrieving advance information concerning the nature of robust transmissions, as sent by DTV transmitter apparatus modified per FIG. 9. This further DTV receiver circuitry can be included in the DTV receiver apparatus of FIG. 17, of FIG. 23 or of FIG. 25. FIG. 27 shows the equalization and NTSC rejection filtering 42 of FIG. 17 (or 142 of FIGS. 23 and 25) connected for supplying baseband DTV signal to a match filter 185 for the PN511 sequence in the DFS signal, to a match filter 186 for PN63 sequences in the DFS signal, and to a selectively enabled decoder 187 for Kerdock code in the DFS signal.

FIG. 27 shows a symbol counter 188 connected for receiving symbol clock signal from the sync signals extraction circuitry 43 of FIG. 17 (or 143 of FIGS. 23 and 25) as a count input signal. The symbol counter 188 is connected to have its symbol count periodically reset responsive to the pulse response of the match filter 185 to the PN511 sequence in the DFS signal occurring soon after the beginning of each data field. The symbol counter 188 is connected for supplying its symbol count as input signal to a decoder 189 for indicating when the middle one of the three cycles of PN63 sequence in the DFS signal should occur. The symbol counter 188 is further connected for supplying its symbol count as input signal to a decoder 190 for indicating when the Kerdock code interval should occur, if at all, immediately following the twenty-four VSB mode symbols in the DFS signal.

Gated integrator circuitry 191 is connected to receive, as input signal thereto, the response of the match filter 186 for PN63 sequences in the DFS signal. The gated integrator circuitry 191 is connected to be periodically reset to zero output signal condition responsive to the pulse response of the match filter 185 to the PN511 sequence in the DFS signal occurring soon after the beginning of each data field. The decoder 189 is connected for supplying its indication that the middle one of the three cycles of PN63 sequence in the DFS signal should be occurring to the gated integrator circuitry 191 as gating signal. The output signal from the gated integrator circuitry 191 remains at zero until that indication is furnished and then peak detects the response of the match filter 186 to the middle PN63 sequence. The gated integrator circuitry 191 is connected to supply this peak detection response to the decoder 187 for Kerdock code; and the polarity of this response controls inversion of the polarity of the received Kerdock code in alternate data fields. These further inversions restore the original Kerdock codes, compensating against the inversions of Kerdock code polarity in alternate data fields that were done at the DTV transmitter.

The decoder 187 for Kerdock code is connected for supplying the operations control circuitry 44 of FIG. 17 (or 144 of FIGS. 23 and 25) a 10-bit address of the initial data segment of a map of data segment characteristics and a 3-bit indication of the type of coding used to convey the map information. The data segment map is generated by the FIG. 9 DTV transmitter modification, for example. Nine bits of the 10-bit "map" address are obtained from decoding the Kerdock code, as are the three bits indicative of map coding type. The further bit of the 10-bit "map" address, which indicates whether the data field is odd or is even, is generated within the decoder 187 responsive to the peak detection response of the gated integrator circuitry 191. In the DTV receiver apparatuses of FIGS. 23 and 25 the operations control circuitry 144 is connected to relay the 10-bit "map" address and the 3-bit indication of map coding type to the turbo code decoding control circuitry 156.

In the claims which follow, the definite article "the" is used for grammatical purposes other than for indicating antecedence. Where antecedence is intended in a claim, it is indicated by the adjective "said".

What is claimed is:

1. A receiver comprising:
a processor and memory, wherein the receiver receives, under control of the processor, an electromagnetic signal for transmitting television and other information, an amplitude of which said electromagnetic signal is modulated in accordance with a digital signal generated by convolutional byte interleaving and trellis coding of segments of successive data fields, said segments of said successive data fields each containing a prescribed number of bytes, and wherein respective coded portions of a Reed-Solomon forward-error-correction (RS FEC) codeword are transmitted in respective ones of a plurality of said segments of said successive data fields, said respective ones of said plurality of said segments being separated from each other within said successive data fields;
a demodulator which demodulates said electromagnetic signal so as to generate an equalized digital signal that comprises trellis-coded data;
a trellis decoder connected for receiving said trellis-coded data and supplying a trellis decoder response responsive to said trellis-coded data;
a de-interleaving circuitry which de-interleaves said trellis decoder response to generate successive segments of a field of de-interleaved data;
an RS FEC decoder which decodes each said coded RS FEC codeword to regenerate a respective regenerated RS FEC codeword; and
a decoder which decodes each said regenerated RS FEC codeword to obtain a respective packet of data therefrom,
wherein said RS FEC codeword encodes information concerning block coding being used in ones of said segments of at least one of said successive data fields.

2. The electromagnetic signal of claim 1, wherein said plurality of said segments consists of two said segments of said successive data fields.

3. The electromagnetic signal of claim 2, wherein first and second ones of said plurality of said segments are separated by fifty-one intervening segments of said successive data fields, not counting segments of data field synchronizing signal; and
wherein said RS FEC codeword has 187 information bytes and twenty parity bytes, only some of which parity bytes are located in an initial half of said RS FEC codeword and remaining ones of which parity bytes are located in a final half of said RS FEC codeword.

4. The electromagnetic signal of claim 2, wherein each of the bits of an initial half of said RS FEC codeword is immediately repeated one time to generate a first of said coded portions of said RS FEC codeword, and each of the bits of a final half of said RS FEC codeword is immediately repeated one time to generate a second of said coded portions of said RS FEC codeword.

5. The electromagnetic signal of claim 2, wherein each of the bits of an initial half of said RS FEC codeword is immediately followed by a ONE or a ZERO bit according to a prescribed pattern to generate a first of said coded portions of said RS FEC codeword, and each of the bits of a final half of said RS FEC codeword is immediately followed by a ONE or a ZERO bit according to said prescribed pattern to generate a second of said coded portions of said RS FEC codeword.

6. The electromagnetic signal of claim 2, wherein the bits of said RS FEC codeword are encoded in a succession of block codes, for generating said two segments in said plurality of said segments of said successive data fields.

7. The electromagnetic signal of claim 2, wherein the bits of said RS FEC codeword are encoded in a succession of block codes, wherein the parity bits of said succession of said block codes are separated for generating an earlier one of said two segments in said plurality of said segments of said successive data fields, and wherein the information bits of said succession of said block codes are separated for generating a later one of said two segments in said plurality of said segments of said successive data fields.

8. The electromagnetic signal of claim 1 wherein said plurality of said segments consists of four said segments of said successive data fields.

9. The electromagnetic signal of claim 8, wherein successive ones of first and second and third and fourth ones of said plurality of said segments are separated by fifty-one intervening segments of said successive data fields, not counting segments of data field synchronizing signal; and wherein said RS FEC codeword has 187 information bytes and twenty parity bytes, a respective five of said twenty parity bytes being located in each of first, second, third and fourth quarters of said RS FEC codeword as subsequently coded.

10. The electromagnetic signal of claim 8, wherein the bits of said RS FEC codeword are encoded in a succession of block codes, wherein each of the bits of said succession of said block codes is immediately repeated one time, for generating said four segments in said plurality of said segments of said successive data fields.

11. The electromagnetic signal of claim 8, wherein the bits of said RS FEC codeword are encoded in a succession of block codes, wherein each of the bits of said succession of said linear block codes is immediately followed by a ONE or a ZERO bit according to a prescribed pattern, for generating said four segments in said plurality of said segments of said successive data fields.

12. The electromagnetic signal of claim 1 wherein said RS FEC codeword is coded by a turbo coding procedure.

13. The electromagnetic signal of claim 1 wherein said RS FEC codeword is coded by a turbo coding procedure that generates a segment corresponding to said RS FEC codeword and a plurality of segments of parity bits, then cyclically interleaves the bytes of the segments generated by said turbo coding procedure to complete the generation of said coded portions of said RS FEC codeword.

14. The electromagnetic signal of claim 1, wherein said RS FEC codeword encodes information concerning the type of modulation used in ones of said segments of at least one of said successive data fields.

15. The electromagnetic signal of claim 1, wherein said RS FEC codeword encodes information concerning the parsing of robust data contained in said segments of at least one of said successive data fields.

16. The electromagnetic signal of claim 1, wherein said RS FEC codeword encodes information concerning whether or not robust data contained in said segments of at least one of said successive data fields was modified to prevent legacy receivers mistaking said robust data for ordinary data.

17. A receiver comprising:
a processor and memory, wherein the receiver, under control of the processor, usefully receives an electromagnetic signal for transmitting television and other information, an amplitude of which said electromagnetic signal is modulated in accordance with a digital signal generated by convolutional byte interleaving and trellis coding of segments of successive data fields, said segments of said successive data fields each containing a prescribed number of bytes, wherein respective coded portions of a Reed-Solomon forward-error-correction (RS FEC) codeword are transmitted in respective ones of a plurality of said segments of said successive data fields, said respective ones of said plurality of said segments being separated from each other within said successive data fields, and wherein said RS FEC codeword encodes information concerning whether or not robust data contained in said segments of at least one of said successive data fields was modified to prevent legacy receivers mistaking said robust data for ordinary data;

a demodulator which demodulates said electromagnetic signal so as to generate an equalized digital signal that comprises trellis-coded data;

a trellis decoder connected for receiving said trellis-coded data and supplying a trellis decoder response responsive to said trellis-coded data;

a de-interleaving circuitry which de-interleaves said trellis decoder response to generate successive segments of a field of de-interleaved data;

a circuitry which restores said successive segments of de-interleaved data to their respective original conditions responsive to said information concerning whether or not robust data contained in said segments of at least one of said successive data fields was modified to prevent legacy receivers mistaking said robust data for ordinary data;

an RS FEC decoder which decodes each said coded RS-FEC codeword to regenerate a respective regenerated RS-FEC; and a decoder which decodes each said regenerated RS-FEC to obtain a respective packet of data therefrom.

18. A receiver comprising:
a processor and memory, wherein the receiver, under control of the processor, usefully receives an electromagnetic signal for transmitting television and other information, an amplitude of which said electromagnetic signal is modulated in accordance with a digital signal generated by convolutional byte interleaving and trellis coding of segments of successive data fields, said segments of said successive data fields each containing a prescribed number of bytes, wherein respective coded portions of a Reed-Solomon forward-error-correction (RS FEC) codeword are transmitted in respective ones of a plurality of said segments of said successive data fields, said respective ones of said plurality of said segments being separated from each other within said successive data fields, and wherein said RS FEC codeword is coded by a turbo coding procedure that generates a segment corresponding to said RS FEC codeword and a plurality of segments of parity bits, then cyclically interleaves the bytes of the segments generated by said turbo coding procedure to complete the generation of said coded portions of said RS FEC codeword;

a demodulator which demodulates said electromagnetic signal so as to generate an equalized digital signal that comprises trellis-coded data;

a trellis decoder connected for receiving said trellis-coded data and supplying a trellis decoder response responsive to said trellis-coded data;

a de-interleaving circuitry which de-interleaves said trellis decoder response to generate successive segments of a field of de-interleaved data;

a circuitry which selects respective coded portions of each coded RS FEC codeword from said field of de-interleaved data;

an RS FEC decoder which decodes said respective de-interleaved coded portions of each coded RS FEC codeword to regenerate a respective regenerated RS FEC codeword; and a decoder which decodes each said regenerated RS FEC codeword to obtain a respective packet of data therefrom.

* * * * *